(12) United States Patent
Hughes

(10) Patent No.: US 6,892,196 B1
(45) Date of Patent: May 10, 2005

(54) SYSTEM, METHOD AND ARTICLE OF MANUFACTURE FOR A USER PROGRAMMABLE DIARY INTERFACE LINK

(75) Inventor: Lucian P. Hughes, Montara, CA (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/469,400

(22) Filed: Dec. 22, 1999

(51) Int. Cl.$^7$ ............................ G06F 17/30; G06F 7/00
(52) U.S. Cl. ............................................. 707/4; 707/3
(58) Field of Search ................................ 707/3, 4, 5, 1, 707/10

(56) References Cited

U.S. PATENT DOCUMENTS

| | | | |
|---|---|---|---|
| 5,241,671 A | | 8/1993 | Reed et al. |
| 5,717,914 A | | 2/1998 | Husick et al. |
| 5,752,242 A | | 5/1998 | Havens |
| 5,877,759 A | | 3/1999 | Bauer |
| 5,890,172 A | | 3/1999 | Borman et al. |
| 5,999,924 A | | 12/1999 | Bair et al. |
| 6,005,565 A | * | 12/1999 | Legall et al. ............... 345/721 |
| 6,009,459 A | | 12/1999 | Belifiore et al. |
| 6,014,662 A | | 1/2000 | Moran et al. |
| 6,018,733 A | * | 1/2000 | Kirsch et al. ................ 707/3 |
| 6,029,164 A | | 2/2000 | Birrell et al. |
| 6,078,924 A | * | 6/2000 | Ainsbury et al. .......... 707/101 |
| 6,085,186 A | | 7/2000 | Christianson et al. |
| 6,144,958 A | | 11/2000 | Ortega et al. |
| 6,173,316 B1 | | 1/2001 | De Boor et al. |
| 6,185,556 B1 | | 2/2001 | Snodgrass et al. |
| 6,185,558 B1 | | 2/2001 | Bowman et al. |
| 6,195,651 B1 | * | 2/2001 | Handel et al. ................ 707/2 |
| 6,199,099 B1 | | 3/2001 | Gershman et al. |
| 6,202,062 B1 | | 3/2001 | Cameron et al. |
| 6,219,670 B1 | * | 4/2001 | Mocek et al. .............. 707/102 |
| 6,256,623 B1 | | 7/2001 | Jones |
| 6,263,364 B1 | * | 7/2001 | Najork et al. ............... 709/217 |
| 6,269,361 B1 | | 7/2001 | Davis et al. |
| 6,285,889 B1 | | 9/2001 | Nykanen et al. |
| 6,292,796 B1 | * | 9/2001 | Drucker et al. ................ 707/5 |
| 6,297,819 B1 | | 10/2001 | Furst |
| 6,304,864 B1 | | 10/2001 | Liddy et al. |
| 6,308,175 B1 | | 10/2001 | Lang et al. |
| 6,314,420 B1 | | 11/2001 | Lang et al. |
| 6,324,535 B1 | | 11/2001 | Bair et al. |
| 6,324,552 B1 | | 11/2001 | Chang et al. |
| 6,341,277 B1 | | 1/2002 | Coden et al. |
| 6,351,755 B1 | | 2/2002 | Najork et al. |
| 6,360,215 B1 | | 3/2002 | Judd et al. |
| 6,363,377 B1 | * | 3/2002 | Kravets et al. ................ 707/4 |
| 6,385,602 B1 | | 5/2002 | Tso et al. |
| 6,473,751 B1 | * | 10/2002 | Nikolovska et al. ........... 707/3 |
| 6,631,369 B1 | * | 10/2003 | Meyerzon et al. ............ 707/4 |
| 6,751,612 B1 | * | 6/2004 | Schuetze et al. ............... 707/4 |

OTHER PUBLICATIONS

Ling Liu, Calton Pu, Roger Barga, and Tong Zhou (1996), Differential Evaluation of Continual Queries, pp. 458–465.*

Gultekin Ozsoyoglu, Kaizheng Du, sujutha Guru Swamy, and Wen–Chi Hou (1992), Processing Real–time, Non–Aggregate Queries with Time–Constraints in CASE–DB, pp. 410–417.*

Hanxiong Chen, Nobuo Ohbo, and Toshiro Ohno (1996), Processing Queries with Expensive Predicates by Filtering, pp. 350–356.*

Dayco Statement Regarding Related Applications.

* cited by examiner

Primary Examiner—Safet Metjahic
Assistant Examiner—Merilyn Nguyen
(74) Attorney, Agent, or Firm—Oppenheimer Wolff & Donnelly LLP

(57) ABSTRACT

A system, method and article of manufacture are provided for integrating a personalizable diary with an information page having a link to the diary. The information page is first displayed. Upon selection of the link to the diary by a user, the diary is displayed. User input for adding entries in the diary is received and selection of the entries for display on the information page is also allowed.

39 Claims, 45 Drawing Sheets

Figure 30: Retrieve User-Centric Content

Figure 32: Persona Data Model

Figure 33: Intention Data Model

SYSTEM, METHOD AND ARTICLE OF MANUFACTURE FOR A USER PROGRAMMABLE DIARY INTERFACE LINK

FIELD OF THE INVENTION

The present invention relates to agent based systems and more particularly to a system that integrates a personalizable diary with an information page having a link to the diary.

BACKGROUND OF THE INVENTION

Agent based technology has become increasingly important for use with applications designed to interact with a user for performing various computer based tasks in foreground and background modes. Agent software comprises computer programs that are set on behalf of users to perform routine, tedious and time-consuming tasks. To be useful to an individual user, an agent must be personalized to the individual user's goals, habits and preferences. Thus, there exists a substantial requirement for the agent to efficiently and effectively acquire user-specific knowledge from the user and utilize it to perform tasks on behalf of the user.

The concept of agency, or the user of agents, is well established. An agent is a person authorized by another person, typically referred to as a principal, to act on behalf of the principal. In this manner the principal empowers the agent to perform any of the tasks that the principal is unwilling or unable to perform. For example, an insurance agent may handle all of the insurance requirements for a principal, or a talent agent may act on behalf of a performer to arrange concert dates.

With the advent of the computer, a new domain for employing agents has arrived. Significant advances in the realm of expert systems enable computer programs to act on behalf of computer users to perform routine, tedious and other time-consuming tasks. These computer programs are referred to as "software agents."

Moreover, there has been a recent proliferation of computer and communication networks. These networks permit a user to access vast amounts of information and services without, essentially, any geographical boundaries. Thus, a software agent has a rich environment to perform a large number of tasks on behalf of a user. For example, it is now possible for an agent to make an airline reservation, purchase the ticket, and have the ticket delivered directly to a user. Similarly, an agent could scan the Internet and obtain information ranging from the latest sports or news to a particular graduate thesis in applied physics. Current solutions fail to apply agent technology to existing calendar technology to provide targeted acquisition of background information for a user's upcoming events.

SUMMARY OF THE INVENTION

A system, method and article of manufacture are provided for integrating a personalizable diary with an information page having a link to the diary. The information page is first displayed. Upon selection of the link to the diary by a user, the diary is displayed. User input for adding entries in the diary is received and selection of the entries for display on the information page is also allowed.

In one aspect of the present invention, the entries in the diary may include one or more of an appointment, a work schedule, a reminder, and a personal note. In another aspect of the present invention, the information displayed on the information page may be selected based on a schedule of the user. Additionally, the schedule of the user may be determined based on the entries in the diary.

In an embodiment of the present invention, representations of the selected entries may be shown on the information page. Each of the representations of the selected entries shown on the information page is linked to the associated entry in the diary. In a further embodiment of the present invention, a user may be allowed to authorize external sources to add entries to the diary.

DESCRIPTION OF THE DRAWINGS

The present invention will be better understood when consideration is given to the following detailed description thereof. Such description makes reference to the annexed drawings, wherein.

DETAILED DESCRIPTION

The present invention includes the following aspects:

Private Web Page: Presentation on a personalised web page of the user's "big picture", prioritised "pushed" information (email, news, and schedule).

Profile-Driven Filtering: Information filtered based on user's profile of interests. Users personalise by subscribing to specific topics and can provide their own filtering parameters for each topic. Topics humanly defined based on user community critical "knowledge map".

Awareness Filtering and Prioritization: Timely delivery of pertinent information performed by awareness software agents watching the user's schedule.

Contextual Awareness: Support for limited contextual understanding of the user community to facilitate interpretation of diaries, email, etc. For example, software agents can interpret acronyms and informal names.

Content agents deliver Community Tuned High Quality Content: Targeted topics to the business priorities of the pilot community. One or two fundamental sources of topic streams may be chosen out of the following: Internet, Intranet, and operational systems. A further source of topics may be user's email.

Time saving Through "Push", Flexibility through "Pull": "pushes" relevant information to users where possible to save time but also let users "pull" information by providing general search capabilities on all topics. This feature may rest on the existence of a search engine for INTRANET or the outside topic stream.

Figure 1:
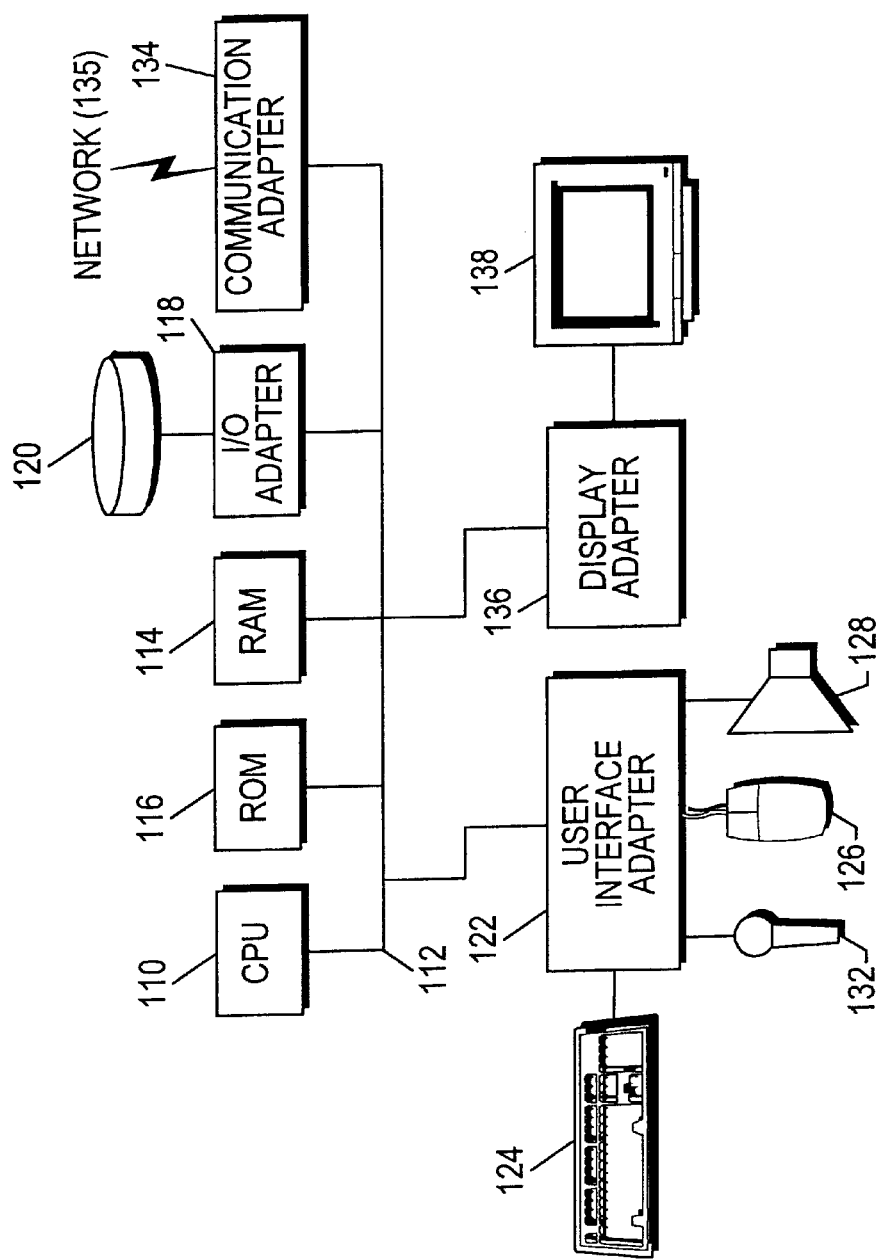
FIG. 1 is a schematic diagram of one possible hardware implementation by which the present invention may be carried out.

Users can "Save": A simple means (such as copy and paste via browser) for users to save useful items on their PC FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132 and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on other platforms and operating systems.

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects.

All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystems's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 2:
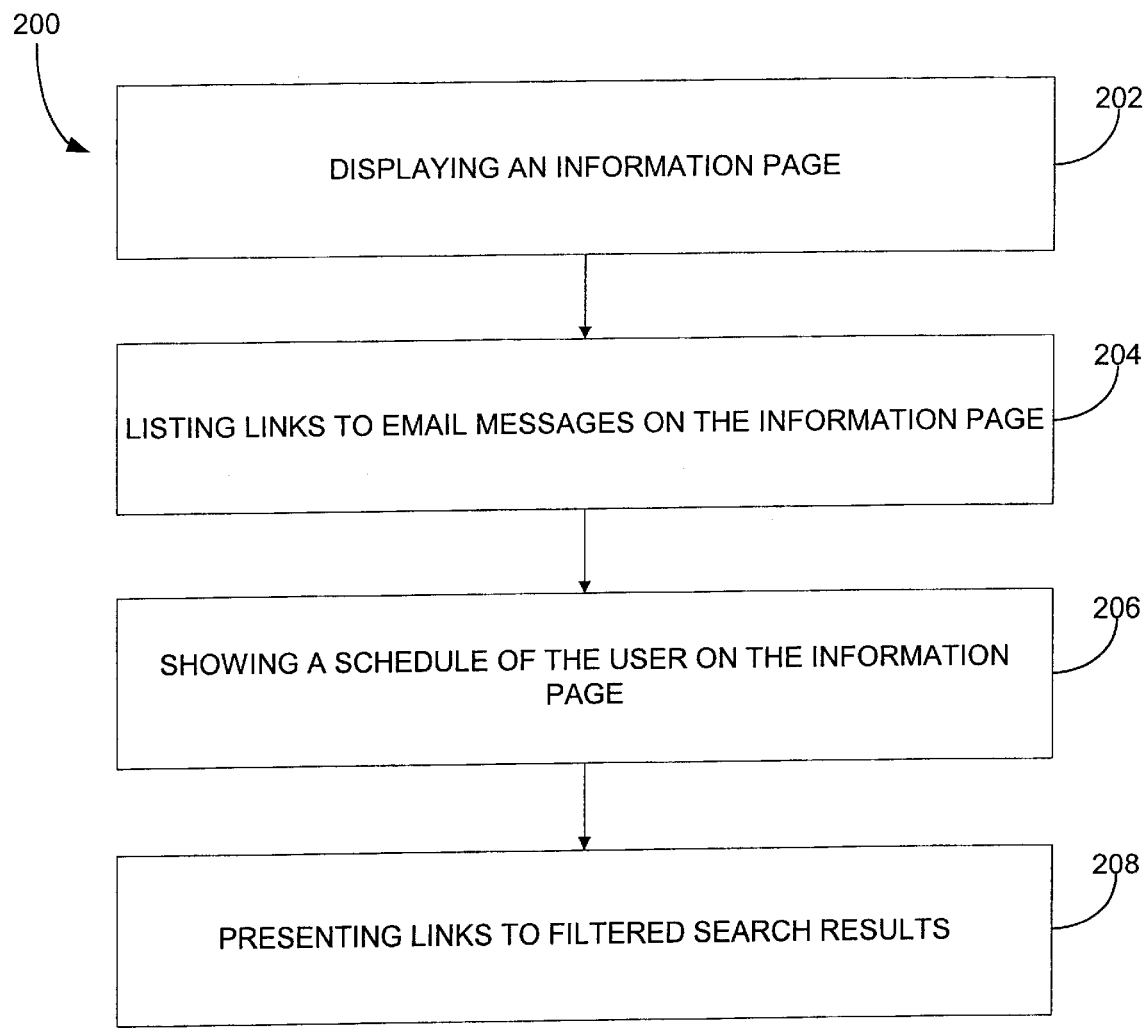
FIG. 2 shows a flowchart for a process for reducing an amount of unnecessary information presented to a user in accordance with an embodiment of the present invention.

Information Page
Business-Centric Graphical User Interface Design:

FIG. 2 shows a flowchart for a process 200 for reducing an amount of unnecessary information presented to a user in accordance with an embodiment of the present invention. In operations 202 and 204, an information page is displayed with links to email messages listed on the information page. Also shown on the information page is a schedule of the user in operation 206. Links to filtered search results are also presented in operation 208.

In an embodiment of the present invention, employer-specific information may be pushed for display on the information page. Optionally, the employer-specific information may be selected based on the schedule of the user. In another embodiment of the present invention, the user may be allowed to set filtering parameters for filtering the search results.

In one aspect of the present invention, the search results may be filtered based on a profile of the user. In a further aspect of the present invention, the search results may be filtered based on business priorities of a community to which the user is associated.

Figure 3:
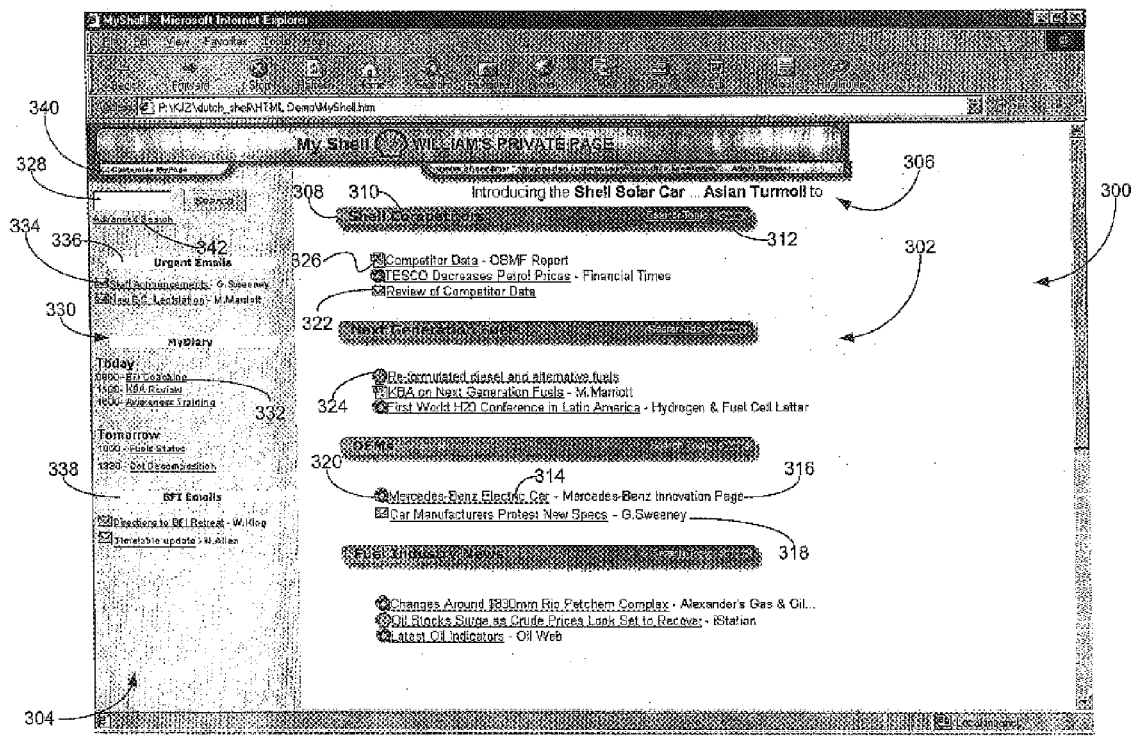
FIG. 3 illustrates a frame displaying a customizable information page in accordance with an embodiment of the present invention.

FIG. 3 illustrates a frame displaying a customizable information page 300 in accordance with an embodiment of the present invention. This page may be divided into the two main content areas: a news area 302, and a diary and email area 304. The information page displays the integration of a variety of information streams from many locations information organized into topics ego-centric information layers from user to outside world.

Figure 4:
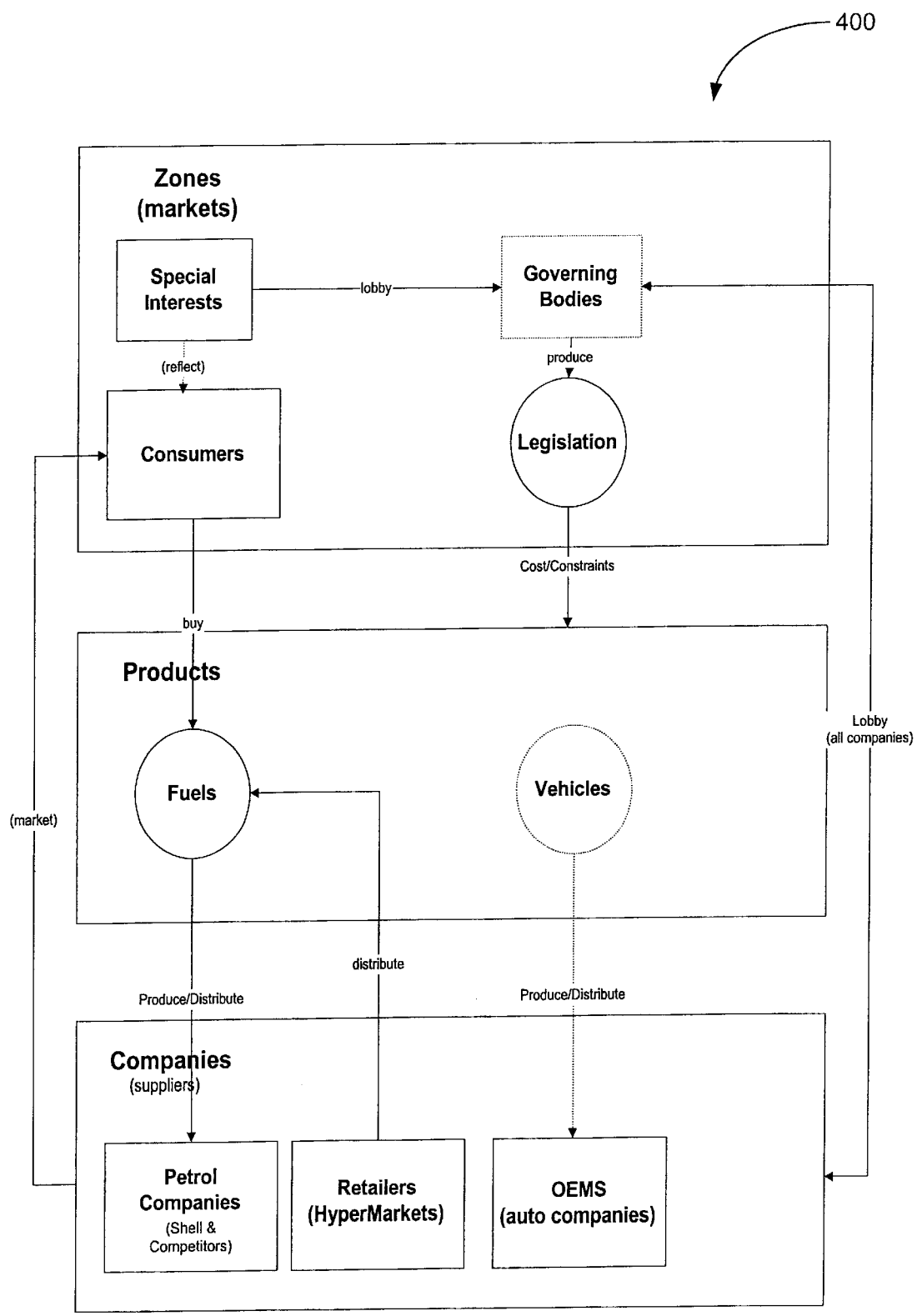
FIG. 4 illustrates a Knowledge Map (Theory of Business) in accordance with an embodiment of the present invention.

FIG. 4 illustrates a Knowledge Map (Theory of Business) in accordance with an embodiment of the present invention.

With an egocentric design, the integration of personal streams of information (email, diary) with external information (e.g., Intranet or Internet based news) gives a user their personal big picture across all their concerns. The information page also may serve as an Internet Portal. The present invention allows focusing of users individuals around the business of an organization by integrating company specific streams of information (e.g., company intranet, email, news and databases). The present invention may help users in many business value aspects including:

Business Automation: This Technological System represents automated support of concerns articulated through Knowledge Map and Theory of Business).

Focus on Business Priorities: information is organised so as to users on core business objectives (i.e., via Theory of Business and Knowledge Map).

The Big Picture: All relevant, filtered, information is summarised through one individually customised screen.

Reduced Info glut: The opportunity of the information age is increased knowledge and nimbleness, the dilemma is information overload. Combining the benefits above allow users to achieve strategic focus on their priorities without being overwhelmed (e.g., shepherding fuels implies detecting threats and opportunities in that marketplace).

More Time: Less time is spent in searching, collecting and organising information, and reading irrelevant information.

Scrolling News Bar:

The scrolling news bar 306 includes a scrolling area where text messages are scrolled across a portion of the information page. In one embodiment of the present invention, this scrolling news bar 306 may be located at the top of the news area 302.

Topic Separators:

In the news area 302, one or more topic separators 308 may be displayed. The topic separators may be labelled with individual topic names 310. A "change" button 312 may be displayed in each topic separator to access a link (upon selection thereof) to allow users to personalise the filters for that particular topic. In an illustrative embodiment of the present invention, exemplary topics that may be displayed include: Competitors, OEMs, Fuel Industry News, Fuels Marketing (OBMF), and Legislation.

Item Titles:

Item titles 314 are hypertext links. When selected they navigate the browser to the original source on the Internet, the World Wide Web (WWW), a companies internal intranet, or they launch an external application to display a document. In an exemplary embodiment, if the user is using IE4.0, an Office document will be displayed within the browser. Adjacent an item title, an item abstract 316 may be displayed to provide a user with more information about the item title. As another option, the item's author 318 may be displayed adjacent the item title to indicate the author of the particular item.

Source Type Icons:

Before each title, a small icon may be displayed representing the source type of an item. In an illustrative embodiment, source type icons (and their corresponding source types) include: an icon for indicating an external web page source type 320, an icon for indicating an email source type 322, an icon for indicating a INTRANET page source type 324, and even an icon for indicating a document source type 326 (e.g. a MS Word document)

Figure 5:
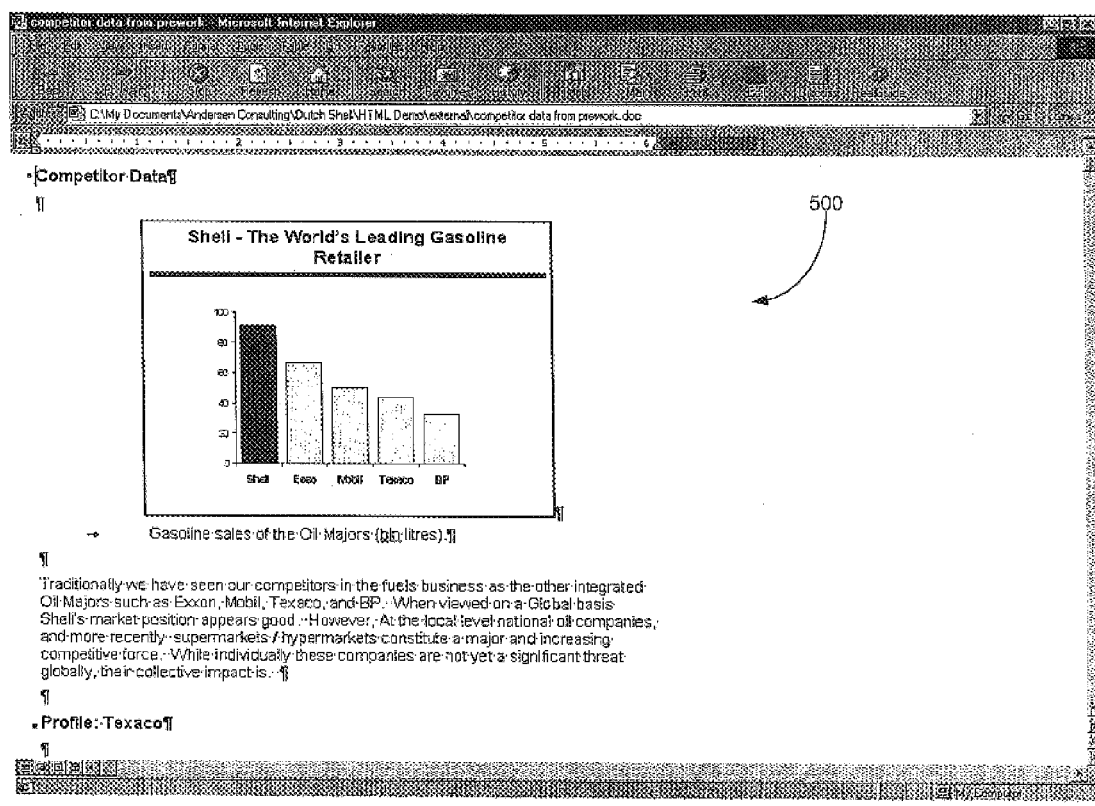
FIG. 5 illustrates an exemplary word processor document that is displayed upon selection of an item entitled "Competitor Data" which displays a document source type icon in accordance with an embodiment of the present invention.

FIG. 5 illustrates an exemplary word processor document 500 (in this case a MS Word Document Word Document) in accordance with an embodiment of the present invention that is displayed upon selection of an item entitled "Competitor Data" which displays a document source type icon 326. This type of item comprises information from a shared team space (in this illustrative case, a shared file server).

Figure 6:
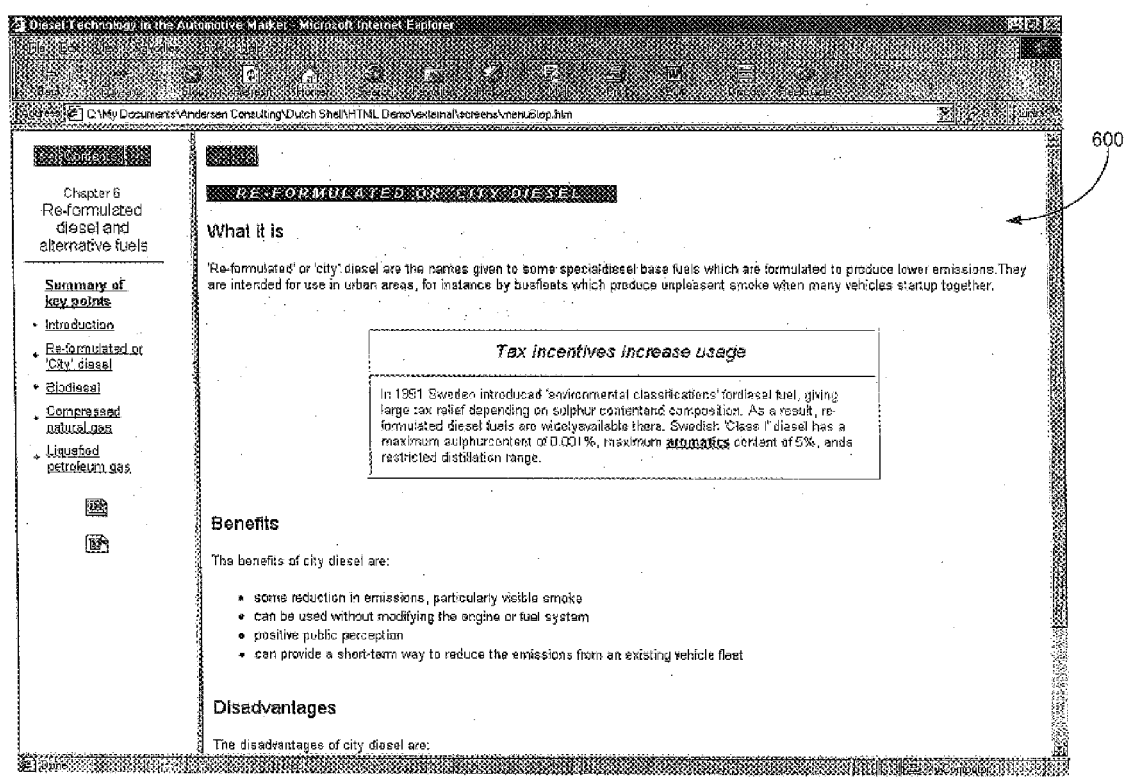
FIG. 6 illustrates an intranet source report in accordance with an embodiment of the present invention that is displayed upon selection of an item entitled "Re-formulated diesel and alternative fuels" which displays a intranet source type icon.
Figure 7:
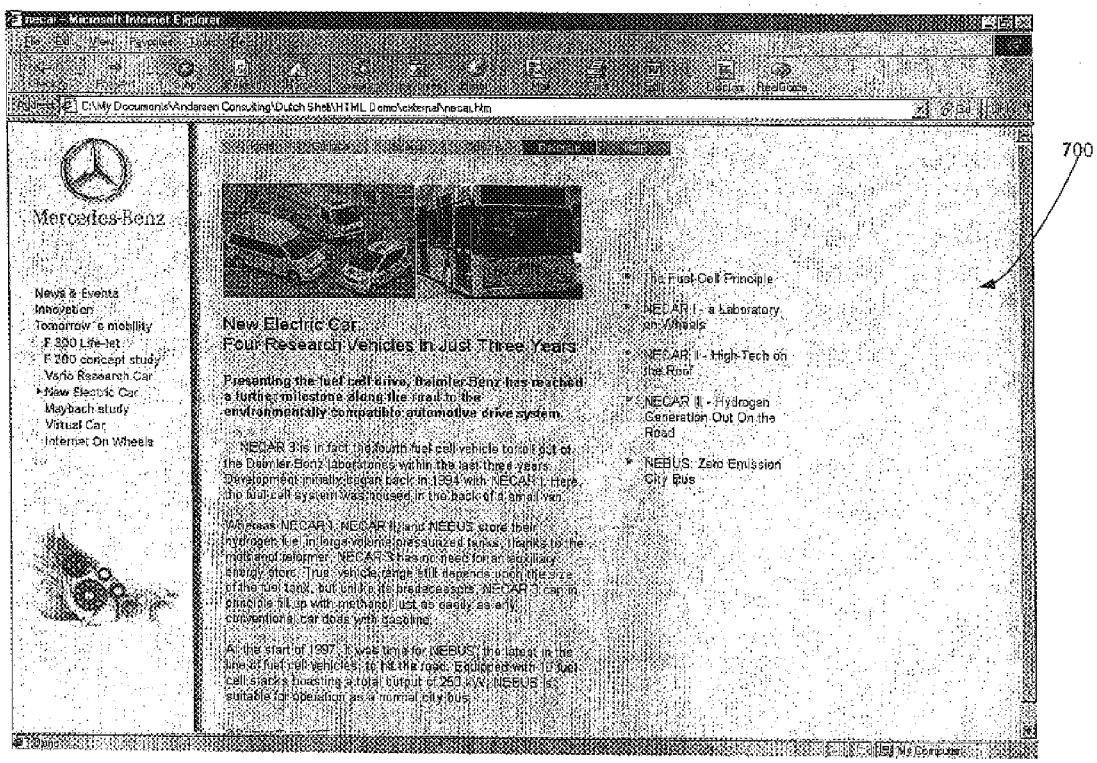
FIG. 7 illustrates an Internet source report in accordance with an embodiment of the present invention that is displayed upon selection of an item entitled "Mercedes-Benz Electric Car" which displays an Internet/WWW source type icon.

FIG. 6 illustrates an intranet source report 600 in accordance with an embodiment of the present invention that is displayed upon selection of an item entitled "Re-formulated diesel and alternative fuels" which displays a intranet source type icon 324. This type of item comprises information available utilizing the intranet FIG. 7 illustrates an Internet source report 700 in accordance with an embodiment of the present invention that is displayed upon selection of an item entitled "Mercedes-Benz Electric Car" which displays an Internet/WWW source type icon 320. This type of item comprises external information available utilizing the Internet/WWW such as in this case, an example of OEM, auto manufacturer, Mercedes-Benz New Electric Car information updated on a website controlled by Mercedes-Benz.

Basic Search:

A search field 328 for entering searches queries may be displayed in the information page, preferably in the diary and email area 304. In the search field, a users may enter a Boolean query to search the Internet (including the entire WWW) and an intranet, or to only search selected internal and external sources utilizing a network. In the preferred embodiment, the search field 328 may be located at the top of the diary and email area 304.

Figure 8:
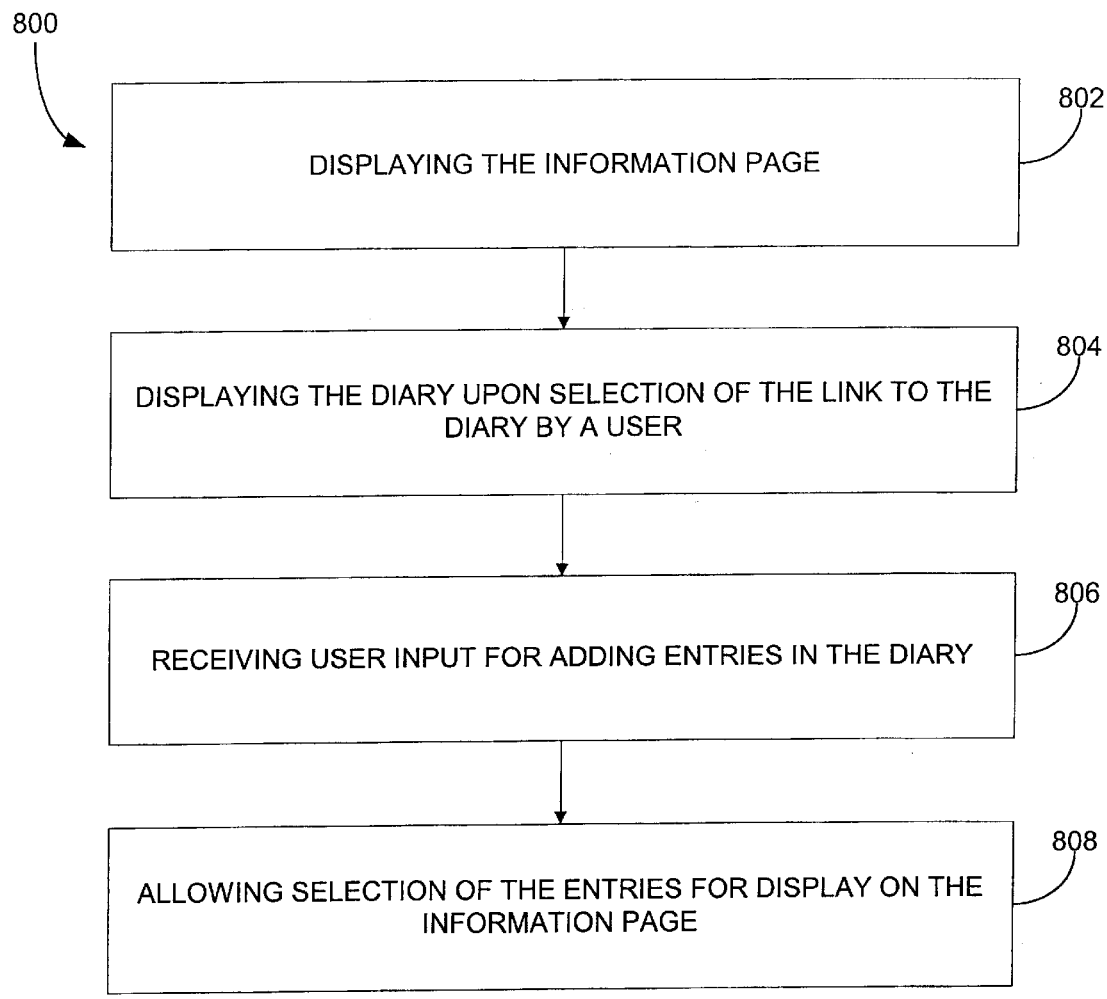
FIG. 8 shows a flowchart for a process for integrating a personalizable diary with an information page having a link to the diary in accordance with an embodiment of the present invention.

MyDiary—User Programmable Diary Interface Link:

FIG. 8 shows a flowchart for a process 800 for integrating a personalizable diary with an information page having a link to the diary in accordance with an embodiment of the present invention. The information page is first displayed in operation 802. Upon selection of the link to the diary by a user, the diary is displayed in operation 804. In operation 806, user input for adding entries in the diary is received and selection of the entries for display on the information page is also allowed in operation 808.

In one aspect of the present invention, the entries in the diary may include one or more of an appointment, a work schedule, a reminder, and a personal note. In another aspect of the present invention, the information displayed on the information page may be selected based on a schedule of the user. Additionally, the schedule of the user may be determined based on the entries in the diary.

In an embodiment of the present invention, representations of the selected entries may be shown on the information page. Each of the representations of the selected entries shown on the information page is linked to the associated entry in the diary. In a further embodiment of the present invention, a user may be allowed to authorize external sources to add entries to the diary.

Displayed in the diary and email area 304 is a section called "MyDiary" 330 which displays a user's appointments 332 for the day. As an option, this section may display additional day's appointments (e.g. "Tomorrow's" appointment). The displayed appointments 332 may also include a selectable link for displaying a frame associated with the appointment and providing additional information about the associated appointment.

Figure 9:
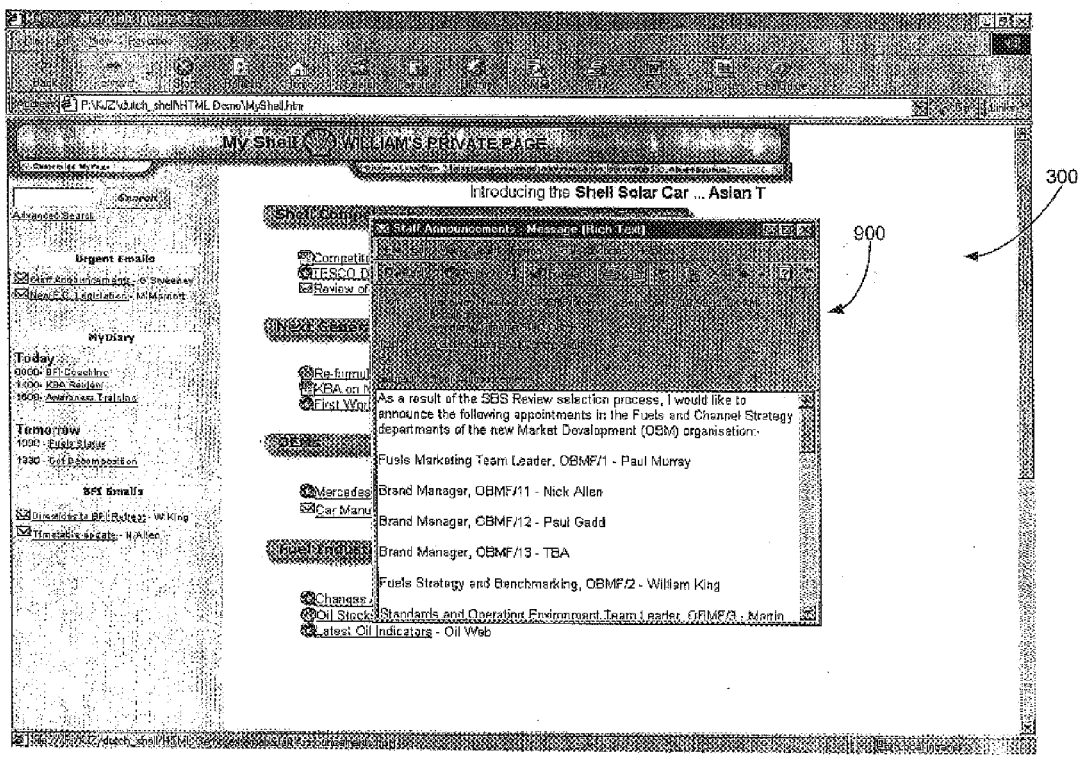
FIG. 9 illustrates an illustrative email frame that is displayed upon selection of an email link displayed in the Urgent email category in accordance with an embodiment of the present invention

Also displayed in the diary and email area 304 are selectable links to display email messages 334 upon selection thereof. In an illustrative embodiment, the displayed email links may be divided into different categories such as, for example, Urgent emails 336 and BFI emails 338. In an ideal illustrative embodiment, the Urgent emails may be located above the MyDiary section while the BFI emails may be located above the MyDiary section. Upon selection of an email link, an email frame with the email message associated with the selected is displayed on top of the information page. FIG. 9 illustrates an illustrative email frame 900 that is displayed upon selection of an email link displayed in the Urgent email category in accordance with an embodiment of the present invention. With the email features displayed in the information page 300, a user's user existing email application is integrated with the information page 300.

Basic Topic Subscription

Figure 10:
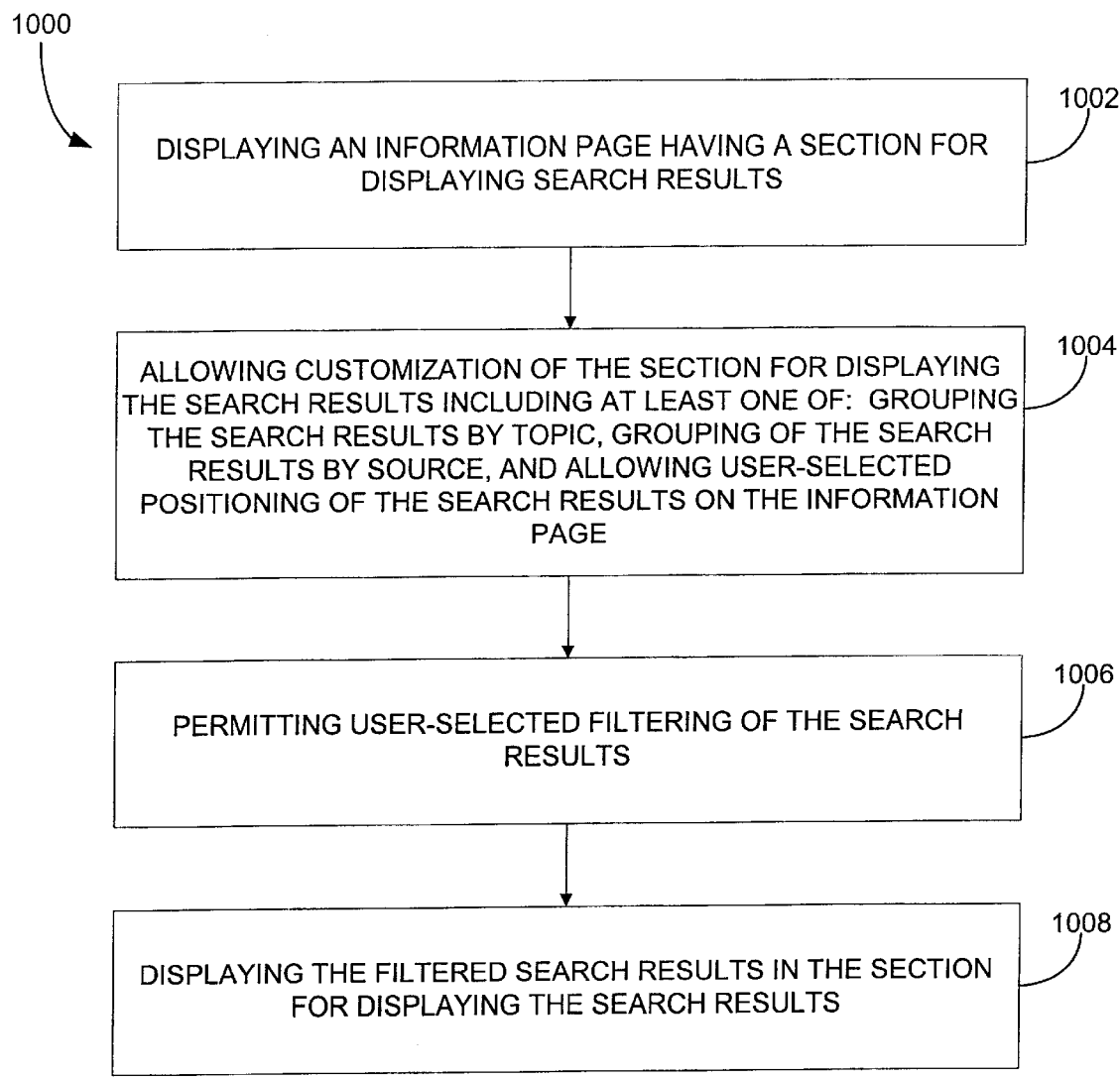
FIG. 10 shows a flowchart for a process for presenting search results in accordance with an embodiment of the present invention.

Customizable Organized Search Result Presentation:

FIG. 10 shows a flowchart for a process 1000 for presenting search results in accordance with an embodiment of the present invention. An information page is displayed in operation 1002. The information page includes a section for displaying search results. In operation 1004, customization of this section which displays the search results is allowed by one or more of: grouping the search results by topic, grouping of the search results by source, and allowing user-selected positioning of the search results on the information page. User-selected filtering of the search results is also permitted in operation 1006. The filtered search results are then displayed in operation 1008 in the section for displaying the search results.

In an embodiment of the present invention, the permitting of user-selected filtering of the search results may also include the displaying of a query field for entering a search query, the receiving of the search query entered in the query field, the presenting a plurality of filters applicable during a search, the allowing of the selection of at least one of the filters, the searching for information relating to the search query, the excluding of portions of the information based on the selected filters to generate a result, and also the outputting of the result of the searching. In another embodiment of the present invention, links may also be listed to email messages on the information page. In a further embodiment of the present invention, a schedule of the user may also be shown on the information page.

In one aspect of the present invention, the user-selected filtering may be based on one or more of a geographic area, a type of product, a company, and a time range. In an additional aspect of the present invention, limiting of sources in which the information is searched may also be allowed.

Figure 11:
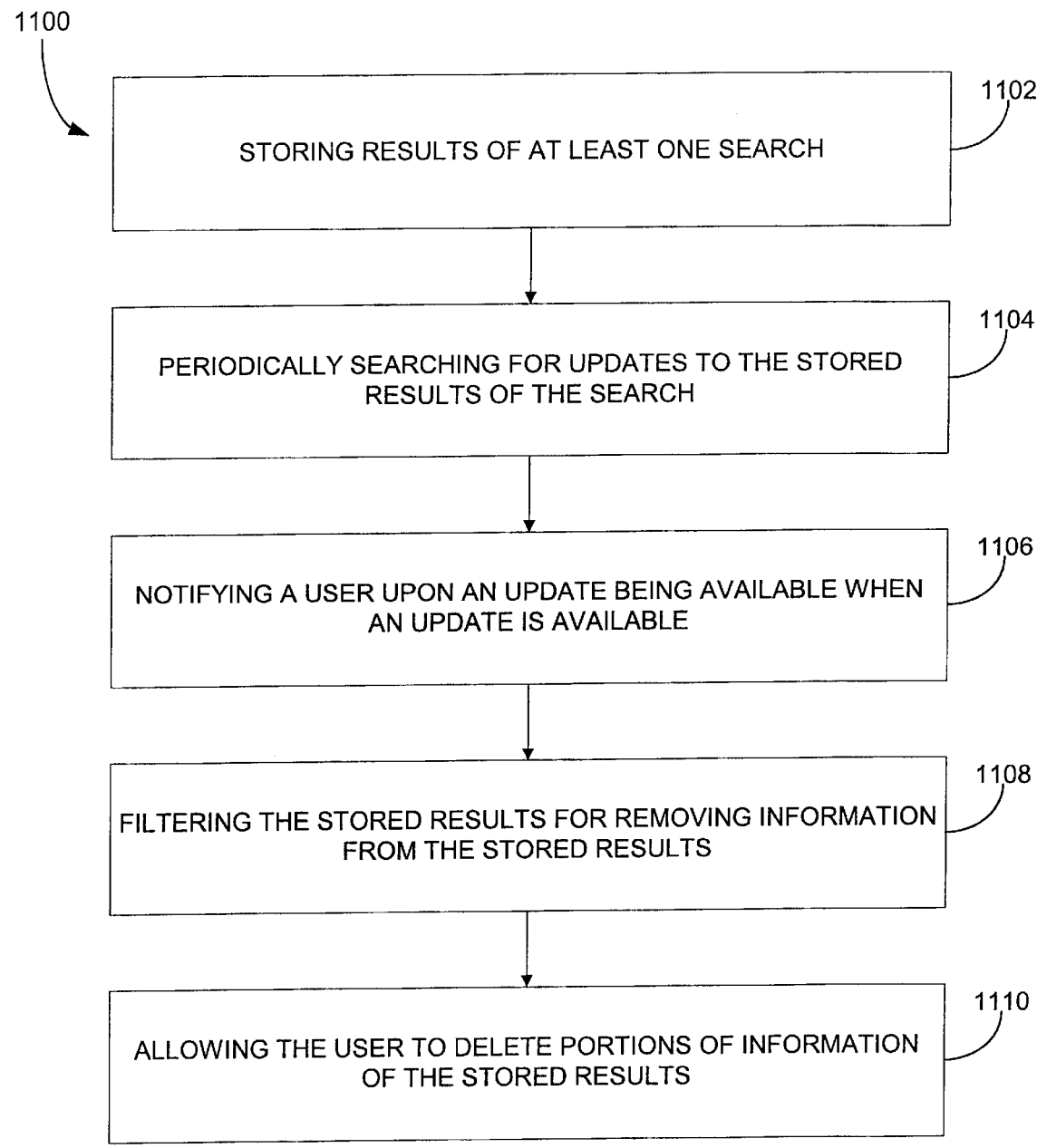
FIG. 11 shows a flowchart for a process for removing irrelevant information from a search result in accordance with an embodiment of the present invention.

Editor for Maintaining Relevancy of Stored Search Results:

FIG. 11 shows a flowchart for a process 1100 for removing irrelevant information from a search result in accordance with an embodiment of the present invention. In operation 1102, results of one or more searches are stored. Periodically, searches are conducted for updating the stored results of the search in operation 1104. Upon an update being available, a notification is generated in operation 1106 for notifying a user that an update is available. The stored results are filtered for removing information from the stored results in operation 1108 and the user is allowed to delete portions of information of the stored results in operation 1110.

In one aspect of the present invention, the updates to the stored results may include changes in one or more of an intranet site, an Internet site, a correspondence, and a database. In another aspect of the present invention, the filtering may be based on a user-defined parameter. In a further aspect of the present invention, the entire process may repeated at predetermined intervals.

In an embodiment of the present invention, reports may be generated to report that portions of information have been stored for more than a predetermined amount of time. In an additional embodiment of the present invention, information removed from the results may be stored in a database for allowing restoration of the removed information.

Figure 12:
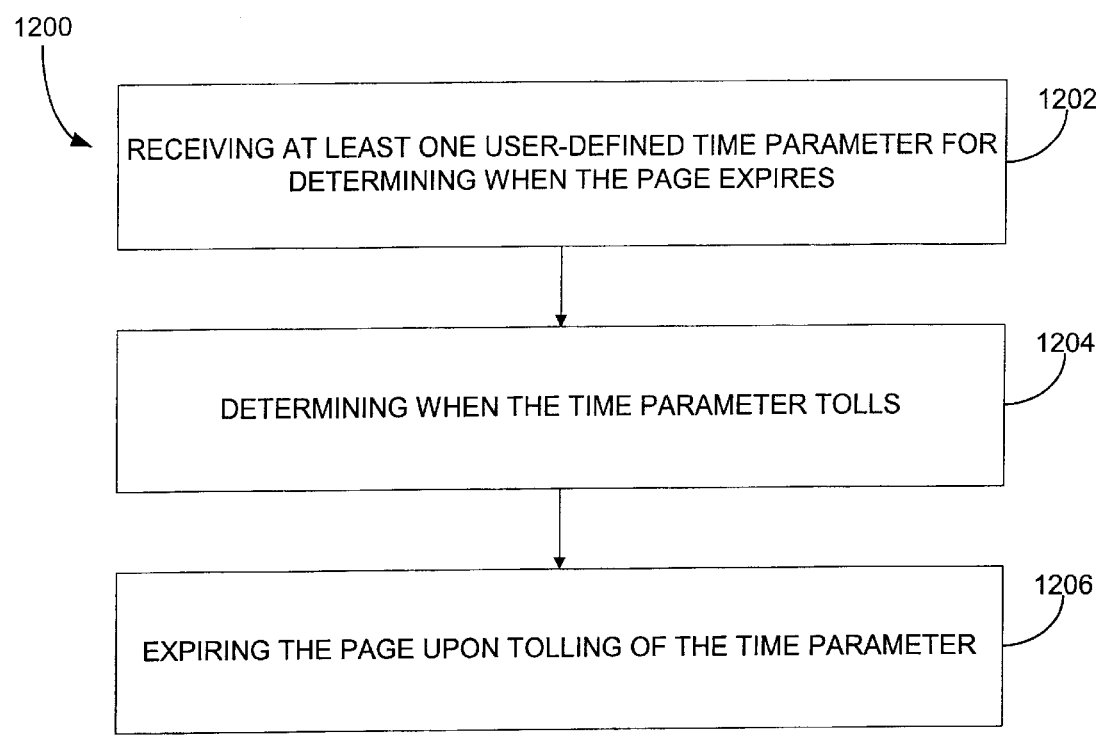
FIG. 12 shows a flowchart for a process for expiring a page on a network in accordance with an embodiment of the present invention.

Perishable Web Page Expirable Upon Tolling of User Defined Time Parameters:

FIG. 12 shows a flowchart for a process 1200 for expiring a page on a network in accordance with an embodiment of the present invention. One or more user-defined time parameters are received in operation 1202 for determining when the page expires. Subsequently, upon a determination of tolling of the time parameter in operation 1204, the page is expired in operation 1206.

In an embodiment of the present invention, the page may also be updated upon expiration of the page. In another embodiment of the present invention, the time parameter may be reset and the determining of when the time tolls and subsequent expiring of the page may be repeated.

In an aspect of the present invention, the time parameter may be a period of time. In a further aspect of the present invention, the time parameter may toll upon occurrence of an event.

Figure 13:
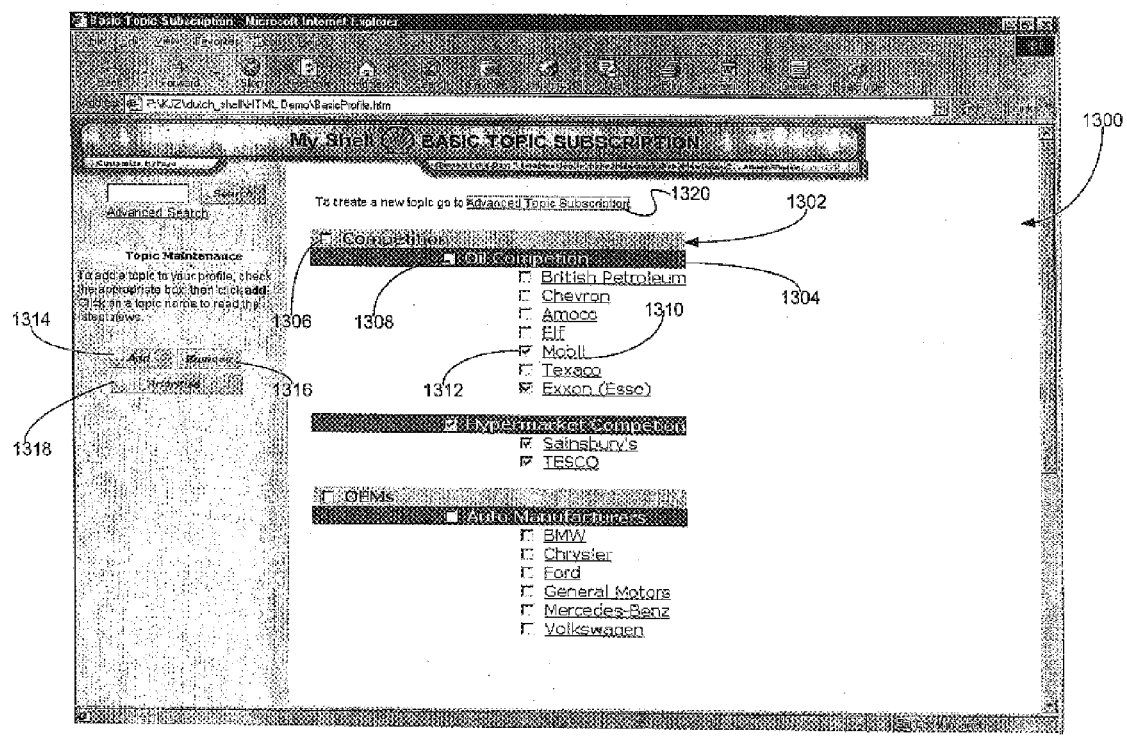
FIG. 13 illustrates a frame displaying an illustrative basic topic subscription page in accordance with an embodiment of the present invention.

Displayed in the information page 300 is a selectable Customize MyPage link 340. Upon selection of the Customize MyPage link 340, a basic topic subscription page 1300 is displayed. FIG. 13 illustrates a frame displaying an illustrative basic topic subscription page 1300 in accordance with an embodiment of the present invention. The basic topic subscription page 1300 allows a user to be in control of what topics the user wishes to see via subscription.

Displayed in the basic topic subscription page 1300 are a plurality of topic category bars or separators 1302, for various categories of topic such as Competition and OEM's for example. Under each topic category bar may be displayed one or more topic subcategory bars 1304. For example, under the Competition category bar, there may be displayed a Oil Competition subcategory bar and a Hypermarket Competition subcategory bar. Displayed in each category and subcategory bar may be a selectable checkmark box 1306, 1308 that upon selection by a user allows the display of information relating to the particular topic category or subcategory.

One or more topics 1310 are displayed under each subcategory (or category if no subcategory is associated with the particular category). Each topic 1310 may include a link to access recent news relating to the associated topic. For example, the topic Mobil may include a link to access recent news relating to the Mobile Corporation via the network. Adjacent to each topic is an associated selectable check box 1312 for permitting a user to select a particular topic related to the check box. In use, a user selects a topic's check box to select the topic. Selection of a previously check-marked check box de-selects the particular topic.

In an illustrative embodiment of the present invention, a selectable buttons may be displayed on the basic topic subscription page 1300 including an add button 1314, a remove button 1316, and a prioritize button 1318. In this illustrative embodiment, upon selection of the add button 1314, those topics which are check-marked are added to a list of topics for which information is retrieved utilizing the network and displayed to the user via the information page 300. In this illustrative embodiment, upon selection of the remove button 1316, those topics which are check-marked are removed from the list of topics for which information is retrieved utilizing the network and displayed to the user via the information page 300.

Figure 14:
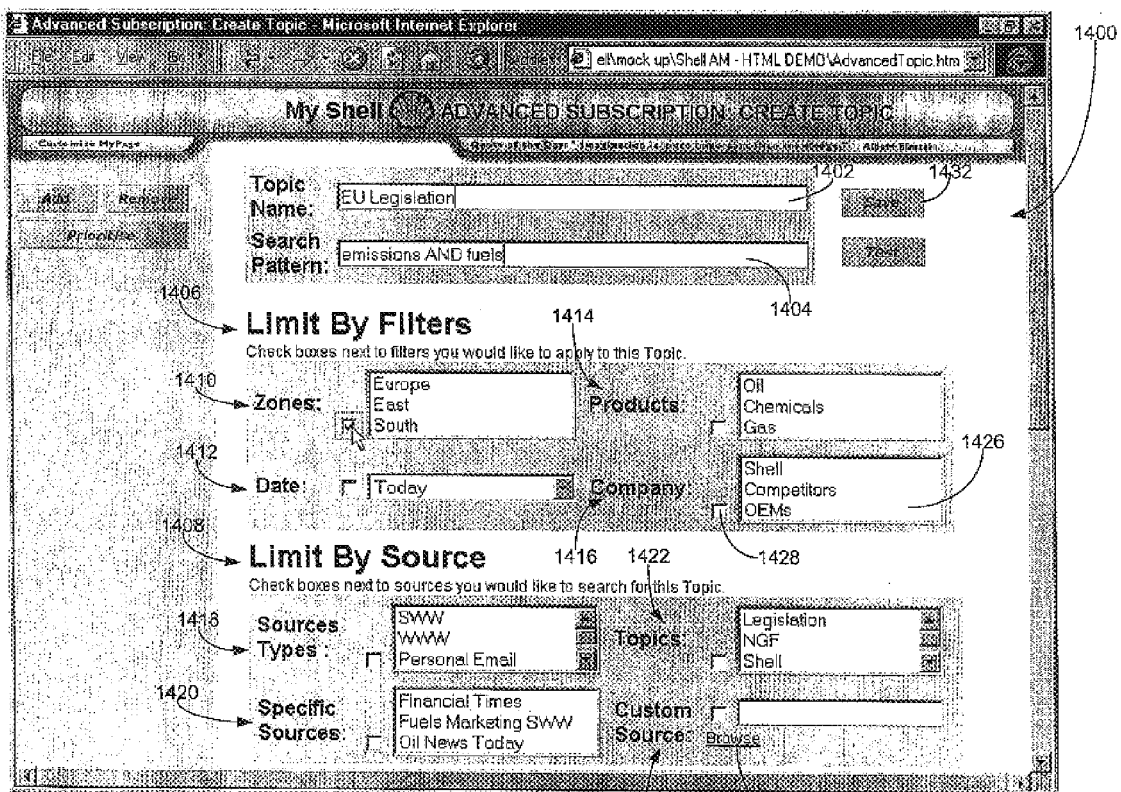
FIG. 14 illustrates an illustrative frame displaying an advanced subscription page in accordance with an embodiment of the present invention.

Also displayed in the basic topic subscription page 1300 is a selectable Advanced Topic Subscription link 1320. Upon selection of Advanced Topic Subscription link 1320, an advanced subscription: create topic page 1400 is displayed. FIG. 14 illustrates an illustrative frame displaying an advanced subscription page 1400 in accordance with an embodiment of the present invention. The Advanced Topic Subscription: create topic page 1400 permits a user to create new user-defined topics to subscribe to (i.e., to receive information relating to the user-defined topic on the information page 300.

The user may enter a topic name (for example: EU Legislation) for the user-defined topic in a topic name text field 1402. Users may also define their own search patterns by entering a particular search query (such as "emissions AND fuel") in a Search Pattern text field 1404.

The user may also select from a plurality of filter and source choices 1406, 1408 displayed in the advanced subscription: create topic page 1400 to limit and control what type and where information on the particular user-defined topic is retrieved.

Some illustrative examples of filters by which retrieved information relating to the user-defined topic may be limited by include: (1) a zones filter 1410 for filtering retrieved information by particular zones such as Europe, East and South; (2) a date filter 1412 for filtering retrieved information by a particular date such as the present date; (3) a product filter 1414 for filtering retrieved information by particular products; and (4) a company filter 1416 for filtering retrieved information by particular companies.

Some illustrative examples of sources from which retrieval of information relating to the user-defined topic may limited to include: (1) by source type 1418 for limiting the retrieval of information relating to the user-defined topic by particular predetermined source types such as the Internet/World Wide Web, an intranet, and email; (2) by specific sources 1420 for limiting the retrieval of information relating to the user-defined topic to specific predetermined sources such as, for example the Financial Times and Oil News Today; (3) by source topics 1422 for limiting the retrieval of information relating to the user-defined topic to specific predetermined topics such as, for example the legislation, NGF, and Shell; and (4) by a custom source 1424 for limiting the retrieval of information relating to the user-defined topic to a user-customized source.

A field 1426 is displayed for each filter and source choices for permitting the user to select filters and sources for the particular choice. Adjacent each field is a check box field 1428 that the user may select to have the selected filters and sources applied for retrieving information relating to the user-defined topic.

In the Custom Source choice 1424, a field is displayed for permitting the user to enter a custom source such as the URL (e.g., http://www.eurunion.org/legislat/) of a particular site on the network from which the user wishes information to be retrieved. Adjacent the Custom Source choice may be a browse link 1430 for permitting the user to browse various sites on the network in order to select the custom source.

Once the user has entered all of the necessary information and selected the desired filters and sources for the information on the user-defined topic, the user may then select the Save button 1432 displayed on the advanced subscription: create topic page 1400 to save the user-defined topic and permit retrieval of information relating to the user-defined top utilizing the network.

Figure 15:
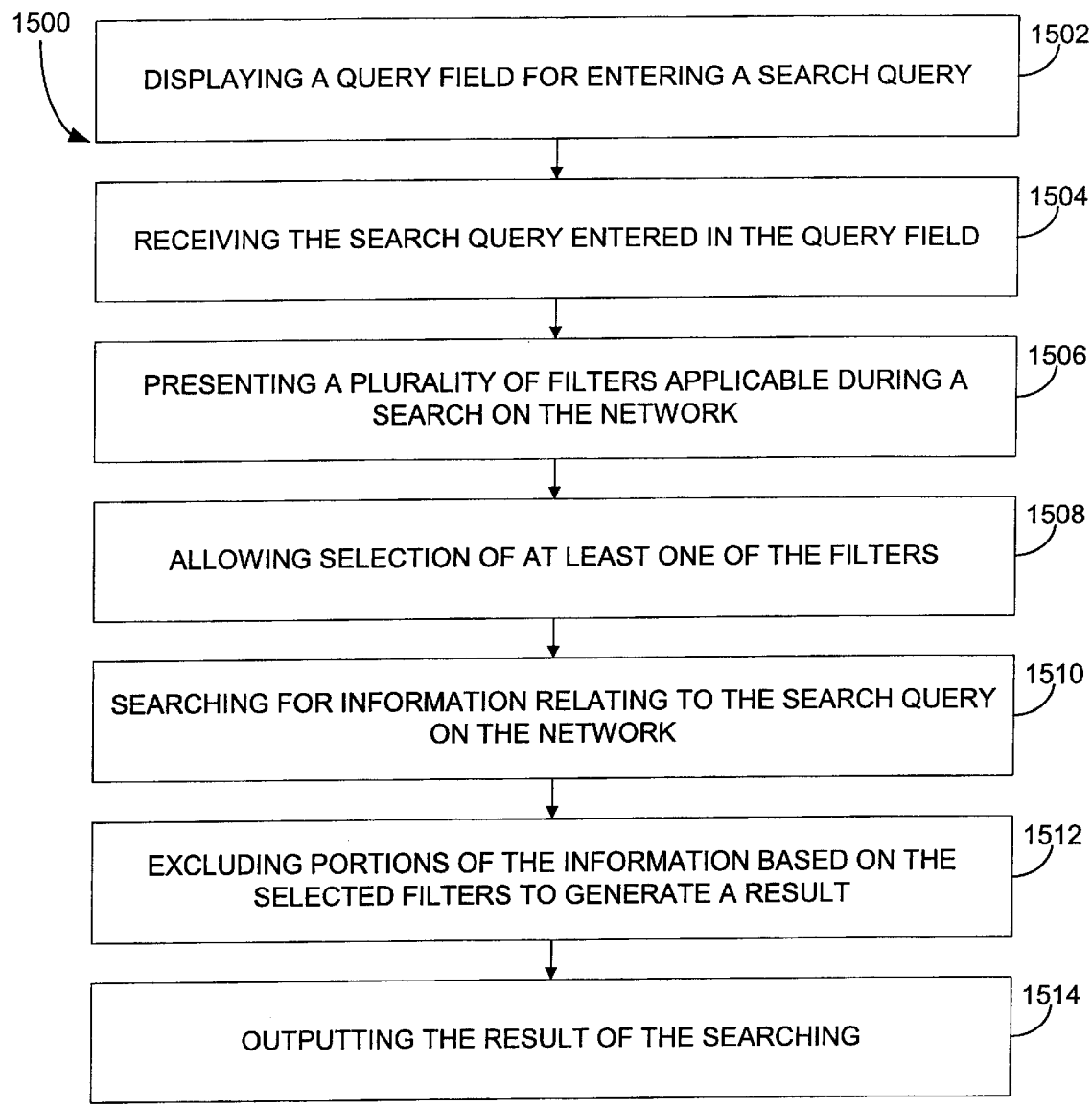
FIG. 15 shows a flowchart of a process for allowing selection of filtering criteria during a search utilizing a network in accordance with an embodiment of the present invention.

Advanced Search
Graphical User Interface Search Filter Generator:

FIG. 15 shows a flowchart of a process 1500 for allowing selection of filtering criteria during a search utilizing a network in accordance with an embodiment of the present invention. A query field is displayed for entering a search query in operation 1502. The search query entered in the query field is received in operation 1504 and a plurality of filters are presented applicable during a search utilizing the network in operation 1506. Selection of one or more of the filters is allowed and information relating to the search query is searched utilizing the network in operations 1508 and 1510. In operation 1512, portions of the information are excluded based on the selected filters to generate a result which is then outputted in operation 1514.

In an aspect of the present invention, the filters may be grouped by type and may also include limiting a source of the information to one or more of a local area network, a wide area network, correspondence, and a database. In another aspect of the present invention, the filters may be pre-selected by the user and presented as default sources for following searches. In a further aspect of the present invention, the filters may be based on one or more of a geographic location, a type of product, a company, and a time range.

In an embodiment of the present invention, information relating to the search query may be searched at periodic intervals and so that the results of these searches may be output after each interval. In another embodiment of the present invention, the limiting of sources in which the information is searched may also be allowed.

Figure 16:
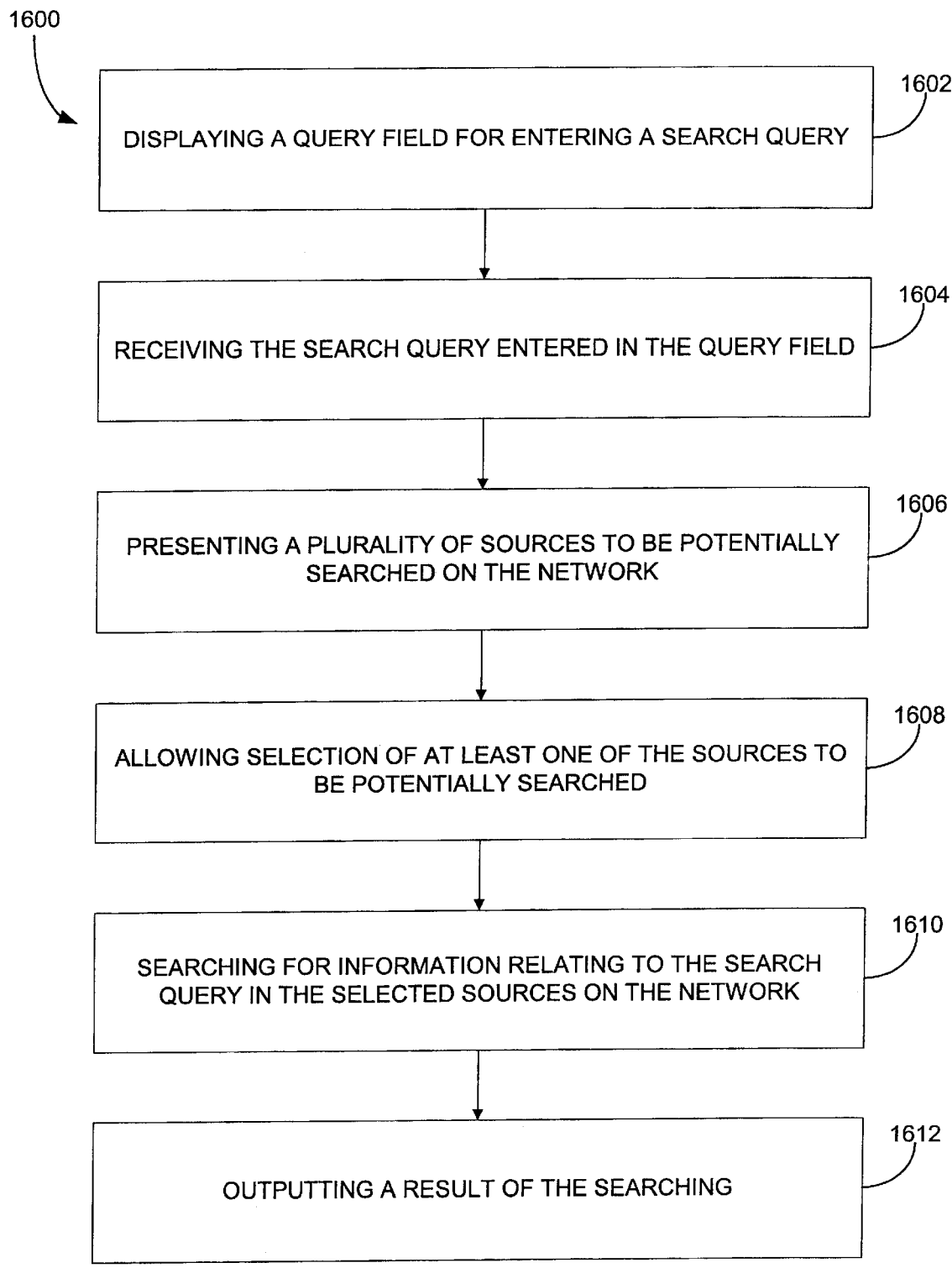
FIG. 16 shows a flowchart for a process for limiting sources in which a search is conducted utilizing a network in accordance with an embodiment of the present invention.

Search Source Selection Filter:

FIG. 16 shows a flowchart for a process 1600 for limiting sources in which a search is conducted utilizing a network in accordance with an embodiment of the present invention. A query field is displayed for entering a search query in operation 1602. Upon receiving the search query entered in the query field in operation 1604, a plurality of sources are presented to be potentially searched utilizing the network in operation 1606. A user is allowed to select one or more of the sources to be potentially searched in operation 1608. In operation 1610, information relating to the search query in the selected sources is searched utilizing the network and the result of the search is subsequently outputted in operation 1512.

In an aspect of the present invention, the sources may be grouped by type and include one or more of a local area network, a wide area network, correspondence, and a database. In another aspect of the present invention, the sources may be pre-selected by the user and presented as default sources for later-performed searches. As another option, the sources may be grouped by topic.

In an embodiment of the present invention, information relating to the search query may be searched for at periodic intervals with results from the periodic searches being outputted after each interval. In a further embodiment of the present invention, selection of a time frame by a user may be allowed so that searching for information relating to the search query has an age at a source within the selected time frame.

Figure 17:
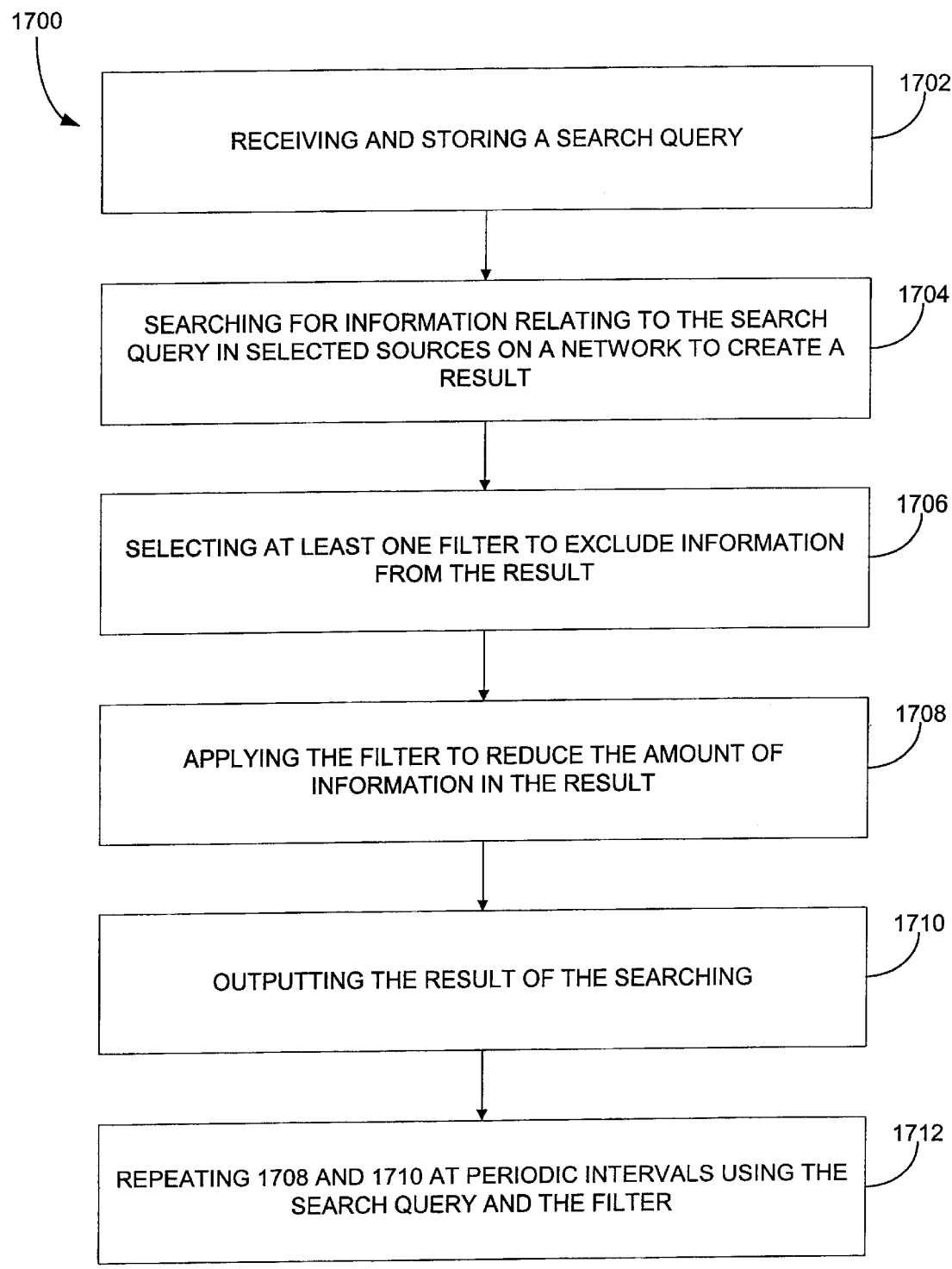
FIG. 17 shows a flowchart for a process for performing periodic searching based on selected parameters and further limited by filters in accordance with an embodiment of the present invention.

User Programmable Autonomous Periodic Search:

FIG. 17 shows a flowchart for a process 1700 for performing periodic searching based on selected parameters and further limited by filters in accordance with an embodiment of the present invention. After receipt and storage of a search query in operation 1702, information relating to the search query is searched for in selected sources on a network to create a result in operation 1704. One or more filters are selected in operation 1706 and applied to exclude information from the result in operation 1708 in order to reduce the amount of information in the result. The result of the searching is subsequently outputted in operation 1710. In operation 1712, application of the filters in order to reduce the amount of information in the result and outputting of the results are repeated at periodic intervals using the search query and the filter.

In an embodiment of the present invention, a user may also be notified that new information is available from the searching. In an aspect of the present invention, the result of the searching may be output on a personalized information page on a network. In another aspect of the present invention, the filter may be based on one or more of a geographic area, a type of product, a company, and a time range. In a further aspect of the present invention, the filter may be based on a profile of the user. As another option, the filters may include limiting sources of the information in which the information is searched.

Figure 18:
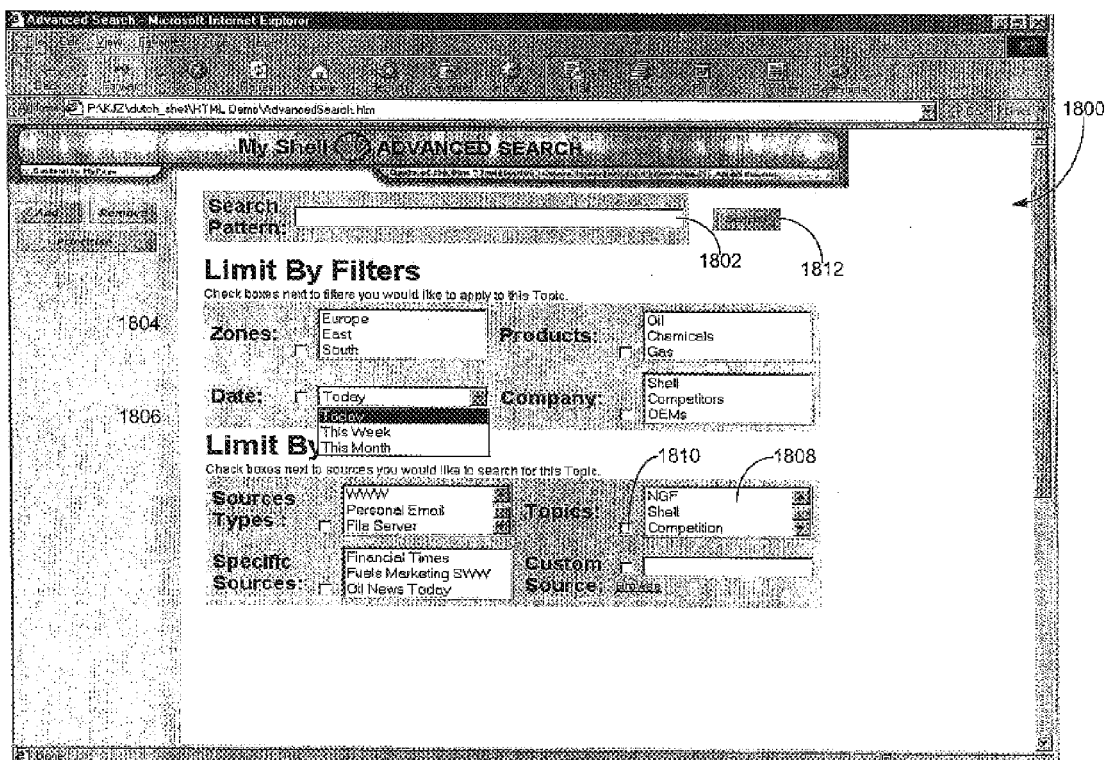
FIG. 18 illustrates a frame displaying an illustrative advanced search page in accordance with an embodiment of the present invention.

Upon selection of an Advanced Search link 342 displayed in the information page 300 adjacent the search field 328, an advanced search page 1800 is displayed. FIG. 18 illustrates a frame displaying an illustrative advanced search page 1800 in accordance with an embodiment of the present invention. From the advanced search page, users may define their own search patterns and user filters for searches executed utilizing the network.

Displayed in the advanced search page 1800 is a search pattern text field 1802 into which a user may enter a search query (for example: "diesel OR AGO"). The user may also select from a plurality of filter and source choices 1804, 1806 displayed in the advanced search topic page 1800 to limit and control what type and where information is searched for utilizing the network. In one embodiment of the present invention, the filter and source choices of the advanced search page may be the same as the filter and source choices of the advanced subscription: create topic page 1300.

Some illustrative examples of filters by which searches relating to the user-defined query may be limited by include: (1) a zones filter for filtering information retrieved by the search by particular zones such as Europe, East and South; (2) a date filter for filtering information retrieved by the search by a particular date such as the present date, the present week, and the present month; (3) a product filter for filtering information retrieved by the search by particular products; and (4) a company filter for filtering information retrieved by the search by particular companies.

Some illustrative examples of sources from which a search for information may be limited displayed in the source choice of the advanced search page include: (1) by source type for limiting the search to retrieve information relating to the user-defined query by particular predetermined source types such as the Internet/World Wide Web, an intranet, and email; (2) by specific sources for limiting the search to retrieve information relating to the user-defined query to specific predetermined sources such as, for example the Financial Times and Oil News Today; (3) by source topics for limiting the search to retrieve information relating to the user-defined query to specific predetermined topics such as, for example the legislation, NGF, and Shell; and (4) by a custom source for limiting the search to retrieve information relating to the user-defined query to a user-customized source.

A non-exhaustive list of illustrative source types includes:

Exchange public folders via the Intranet

Outlook Contacts

Tasks

Newsgroups

Co-ordination with existing Shell Research and Information groups

Other group databases

A field 1808 is displayed for each filter and source choices for permitting the user to select filters and sources for the particular choice. Adjacent each field is a check box field 1810 that the user may select to have the selected filters and sources applied to the search. Also, in the Custom Source choice, a field is displayed for permitting the user to enter a custom source such as the URL (e.g., http://www.eurunion.org/legislat/) of a particular site on the network from which the user wishes to search for information relating to the user's query. Adjacent the Custom Source choice may be a browse link for permitting the user to browse various sites on the network in order to select the custom source.

Once the user has entered all of the necessary information and selected the desired filters and sources for the information on the user-defined topic, the user may then select the Save button 1832 displayed on the advanced subscription: create topic page 1800 to save the user-defined topic and permit retrieval of information relating to the user-defined top utilizing the network.

To execute an advanced search for the user-defined query, a user selects a Search button 1812, which, upon selection thereof, executes the advanced search for the user-defined query limited by the selected filters and source.

System Architecture

Figure 19:
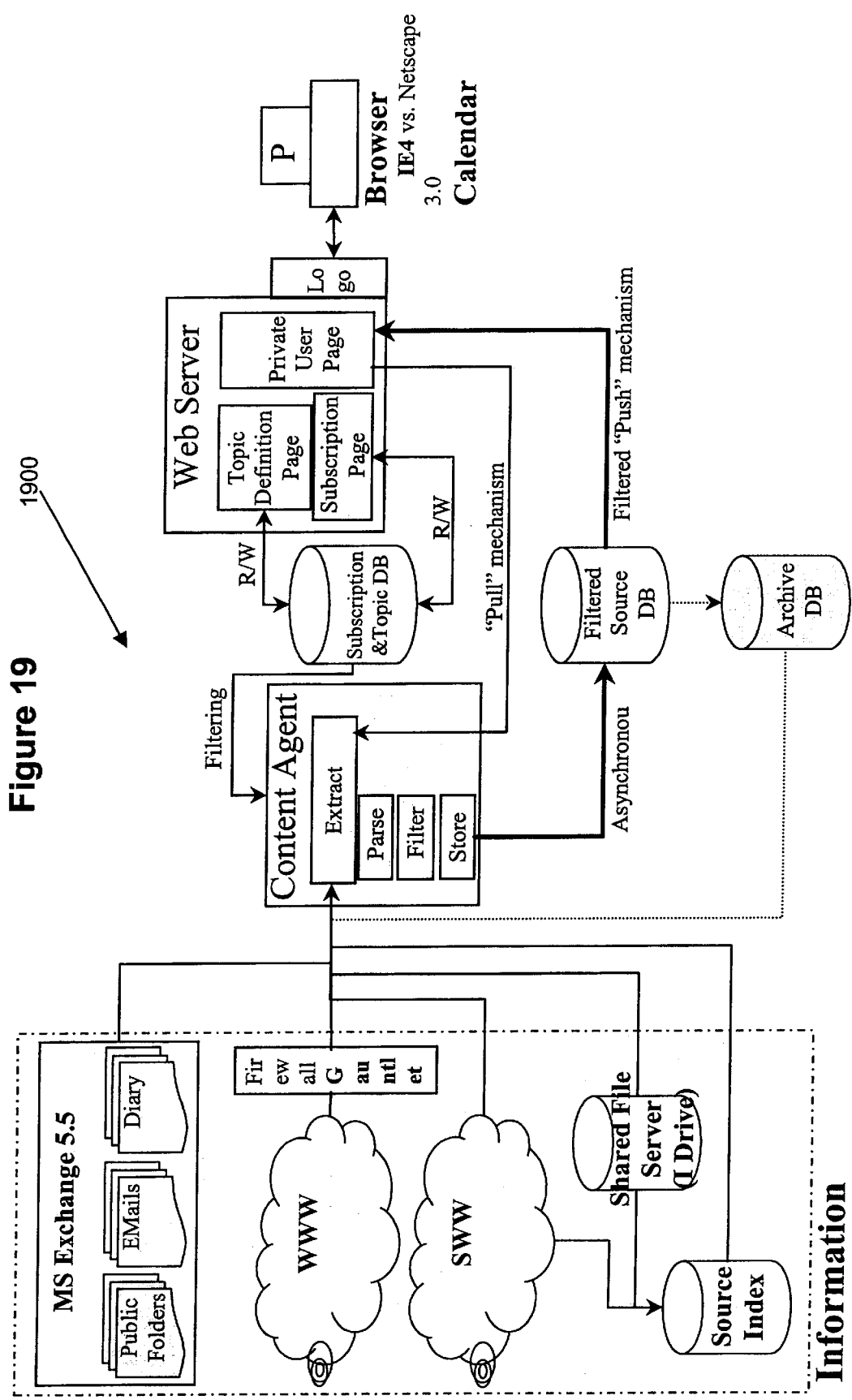
FIG. 19 is a schematic diagram of an exemplary system architecture in accordance with an embodiment of the present invention.

FIG. 19 is a schematic diagram of an exemplary system architecture in accordance with an embodiment of the present invention.

In accordance with an embodiment of the present invention, a BackgroundFinder (BF) is implemented as an agent responsible for preparing an individual for an upcoming meeting by helping him/her retrieve relevant information about the meeting from various sources. BF receives input text in character form indicative of the target meeting. The input text is generated in accordance with an embodiment of the present invention by a calendar program that includes the time of the meeting. As the time of the meeting approaches, the calendar program is queried to obtain the text of the target event and that information is utilized as input to the agent. Then, the agent parses the input meeting text to extract its various components such as title, body, participants, location, time etc. The system also performs pattern matching to identify particular meeting fields in a meeting text. This information is utilized to query various sources of information on the web and obtain relevant stories about the current meeting to send back to the calendaring system. For example, if an individual has a meeting with Netscape and Microsoft to talk about their disputes, and would obtain this initial information from the calendaring system. It will then parse out the text to realize that the companies in the meeting are "Netscape" and "Microsoft" and the topic is "disputes." Then, the system queries the web for relevant information concerning the topic. Thus, in accordance with an objective of the invention, the system updates the calendaring system and eventually the user with the best information it can gather to prepare the user for the target meeting. In accordance with an embodiment of the present invention, the information is stored in a file that is obtained via selection from a link imbedded in the calendar system.

Program Organization:

A computer program in accordance with an embodiment of the present invention is organized in five distinct modules: BF.Main, BF.Parse, Background Finder.Error, BF.PatternMatching and BF.Search. There is also a firmMain which provides a user interface used only for debugging purposes. The executable programs in accordance with an embodiment of the present invention never execute with the user interface and should only return to the calendaring system through Microsoft's Winsock control. An embodiment of the system executes in two different modes which can be specified under the command line sent to it by the calendaring system. When the system runs in simple mode, it executes a keyword query to submit to external search engines. When executed in complex mode, the system performs pattern matching before it forms a query to be sent to a search engine.

Data Structures:

The system in accordance with an embodiment of the present invention utilizes three user defined structures:
1. TMeetingRecord;
2. TPatternElement; and
3. TPatternRecord.

The user-defined structure, tMeetingRecord, is used to store all the pertinent information concerning a single meeting. This info includes userID, an original description of the meeting, the extracted list of keywords from the title and body of meeting etc. It is important to note that only one meeting record is created per instance of the system in accordance with an embodiment of the present invention. This is because each time the system is spawned to service an upcoming meeting, it is assigned a task to retrieve information for only one meeting. Therefore, the meeting record created corresponds to the current meeting examined. ParseMeetingText populates this meeting record and it is then passed around to provide information about the meeting to other functions.

If GoPatternMatch can bind any values to a particular meeting field, the corresponding entries in the meeting record is also updated. The structure of tMeetingRecord with each field described in parentheses is provided below in accordance with an embodiment of the present invention.

Public Type tMeetingRecord sUserID As String (user id given by Munin)

sTitleOrig As String (original non stop listed title we need to keep around to send back to Munin)

sTitleKW As String (stoplisted title with only keywords)

sBodyKW As String (stoplisted body with only keywords)

sCompany( ) As String (companies identified in title or body through pattern matching)

sTopic( ) As String (topics identified in title or body through pattern matching)

sPeople( ) As String (people identified in title or body through pattern matching)

sWhen( ) As String (time identified in title or body through pattern matching)

sWhere( ) As String (location identified in title or body through pattern matching)

sLocation As String (location as passed in by Munin)

sTime As String (time as passed in by Munin)

sParticipants( ) As String (all participants engaged as passed in by Munin)

sMeetingText As String (the original meeting text w/o userid)

End Type

There are two other structures which are created to hold each individual pattern utilized in pattern matching. The record tAPatternRecord is an array containing all the components/elements of a pattern. The type tAPatternElement is an array of strings which represent an element in a pattern. Because there may be many "substitutes" for each element, we need an array of strings to keep track of what all the substitutes are. The structures of tAPatternElement and tAPatternRecord are presented below in accordance with an embodiment of the present invention.

Public Type tAPatternElement elementArray( ) As String

End Type

Public Type tAPatternRecord patternArray( ) As tAPatternElement

End Type

User Defined Constants:

Many constants are defined in each declaration section of the program which may need to be updated periodically as part of the process of maintaining the system in accordance with an embodiment of the present invention. The constants are accessible to allow dynamic configuration of the system to occur as updates for maintaining the code.

Included in the following tables are lists of constants from each module which I thought are most likely to be modified from time to time. However, there are also other constants used in the code not included in the following list. It does not mean that these non-included constants will never be changed. It means that they will change much less frequently.

For the Main Module (BF.Main):

| CONSTANT | PRESET VALUE | USE |
| --- | --- | --- |
| MSGTOMUNIN_TYPE | 6 | Define the message number used to identify messages between BF and Munin |
| IP_ADDRESS_MUNIN | "10.2.100.48" | Define the IP address of the machine in which Munin and BF are running on so they can transfer data through UDP. |
| PORT_MUNIN | 7777 | Define the remote port in which we are operating on. |
| TIMEOUT_AV | 60 | Define constants for setting time out in inet controls |
| TIMEOUT_NP | 60 | Define constants for setting time out in inet controls |
| CMD_SEPARATOR | "\" | Define delimiter to tell which part of Munin's command represents the beginning of our input meeting text |
| OUTPARAM_SEPARATOR | "::" | Define delimiter for separating out different portions of the output. The separator is for delimiting the msg type, the user id, the meeting title and the beginning of the actual stories retrieved. |

For the Search Module (BF.Search):

| CONSTANT | CURRENT VALUE | USE |
| --- | --- | --- |
| PAST_NDAYS | 5 | Define number of days you want to look back for AltaVista articles. Doesn't really matter now because we aren't really doing a news search in alta vista. We want all info. |
| CONNECTOR_AV_URL | "+AND+" | Define how to connect keywords. We want all our keywords in the string so for now use AND. If you want to do an OR or something, just change connector. |
| CONNECTOR_NP_URL | "+AND+" | Define how to connect keywords. We want all our keywords in the string so for now use AND. If you want to do an OR or something, just change connector. |
| NUM_NP_STORIES | 3 | Define the number of stories to return back to Munin from NewsPage. |
| NUM_AV_STORIES | 3 | Define the number of stories to return back to Munin from AltaVista. |

For the Parse Module (BF.Parse):

| CONSTANT | CURRENT VALUE | USE |
| --- | --- | --- |
| PORTION_SEPARATOR | "::" | Define the separator between different portions of the meeting text sent in by Munin. For example in "09::Meet with Chad::aboutlife::Chad \| Denise::::::" "::" is the separator between different parts of the meeting text. |
| PARTICIPANT_SEPARATOR | "\|" | Define the separator between each participant in the participant list portion of the original meeting text. Refer to example above. |

For Pattern Matching Module (BFPatternMatch): There are no constants in this module which require frequent updates.

Figure 20:
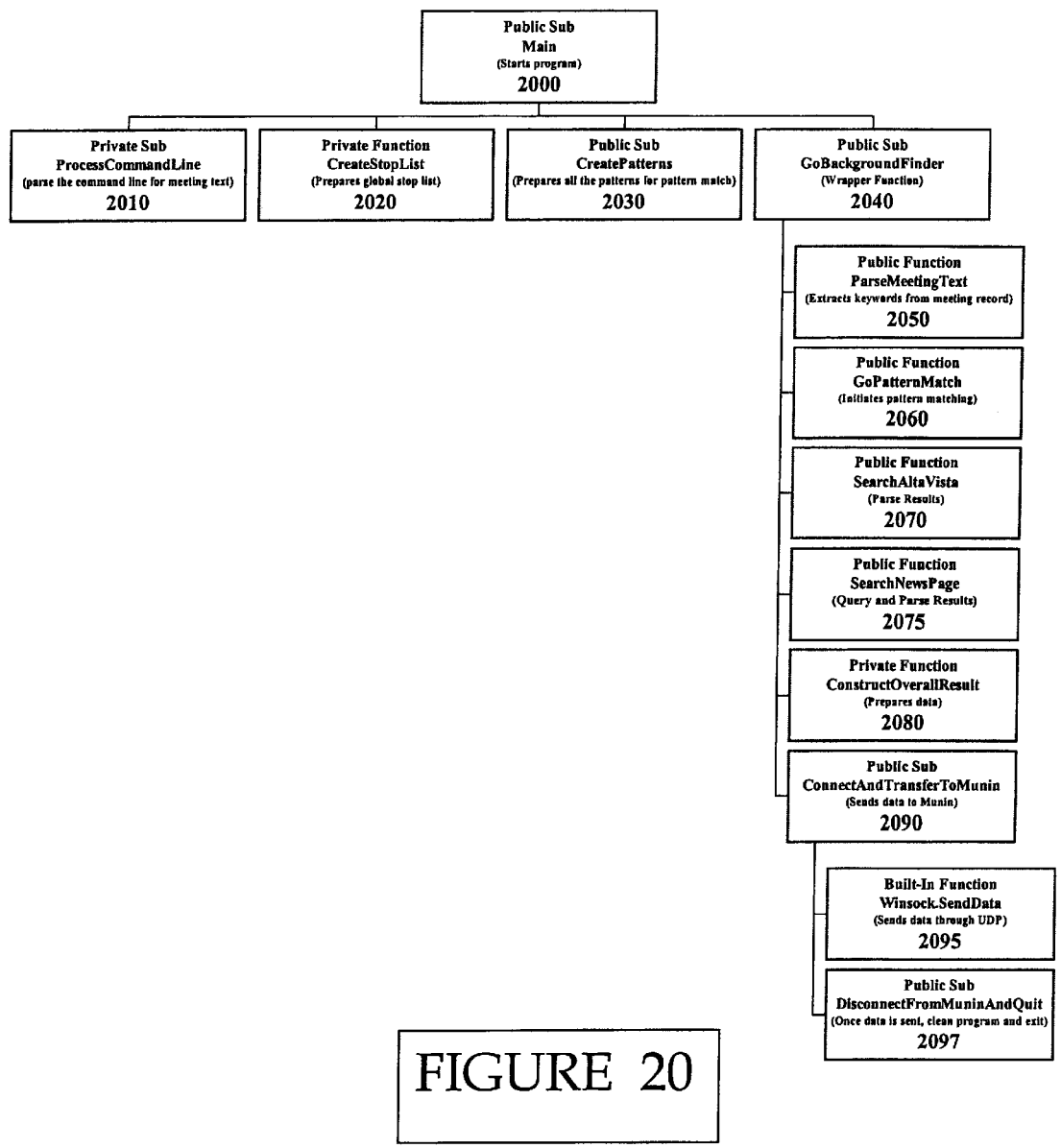
FIG. 20 is a flowchart of the system in accordance with an embodiment of the present invention.

General Process Flow:

The best way to depict the process flow and the coordination of functions between each other is with the five flowcharts illustrated in FIGS. 20 to 24. FIG. 20 depicts the overall process flow in accordance with an embodiment of the present invention. Processing commences at the top of the chart at function block 2000 which launches when the program starts. Once the application is started, the command line is parsed to remove the appropriate meeting text to initiate the target of the background find operation in accordance with an embodiment of the present invention as shown in function block 2010. A global stop list is generated after the target is determined as shown in function block 2020. Then, all the patterns that are utilized for matching operations are generated as illustrated in function block 2030. Then, by tracing through the chart, function block 2000 invokes GoBF 2040 which is responsible for logical processing associated with wrapping the correct search query information for the particular target search engine. For example, function block 2040 flows to function block 2050 and it then calls GoPatternMatch as shown in function block 2060. To see the process flow of GoPatternMatch, we swap to the diagram titled "Process Flow for BF's Pattern Matching Unit."

One key thing to notice is that functions depicted at the same level of the chart are called by in sequential order from left to right (or top to bottom) by their common parent function. For example, Main 2000 calls ProcessCommandLine 2010, then CreateStopListist 2020, then CreatePatterns 2030, then GoBackgroundFinder 2040. FIGS. 21 to 24 detail the logic for the entire program, the parsing unit, the pattern matching unit and the search unit respectively. FIG. 24 details the logic determinative of data flow of key information through BackgroundFinder, and shows the functions that are responsible for creating or processing such information. PS Detailed Search Architecture under the Basic Search/Simple Query Mode Search ALTA VISTA (Function block 2070 of FIG. 20):

The Alta Vista search engine utilizes the identifies and returns general information about topics related to the current meeting as shown in function block 270 of FIG. 2. The system in accordance with an embodiment of the present invention takes all the keywords from the title portion of the original meeting text and constructs an advanced query to send to Alta Vista. The keywords are logically combined together in the query. The results are also ranked based on the same set of keywords. One of ordinary skill in the art will readily comprehend that a date restriction or publisher criteria could be facilitated on the articles we want to retrieve. A set of top ranking stories are returned to the calendaring system in accordance with an embodiment of the present invention.

NewsPage (Function Block 2075 of FIG. 20):

The NewsPage search system is responsible for giving us the latest news topics related to a target meeting. The system takes all of the keywords from the title portion of the original meeting text and constructs a query to send to the NewsPage search engine. The keywords are logically combined together in the query. Only articles published recently are retrieved. The NewsPage search system provides a date restriction criteria that is settable by a user according to the user's preference. The top ranking stories are returned to the calendaring system.

Figure 21:
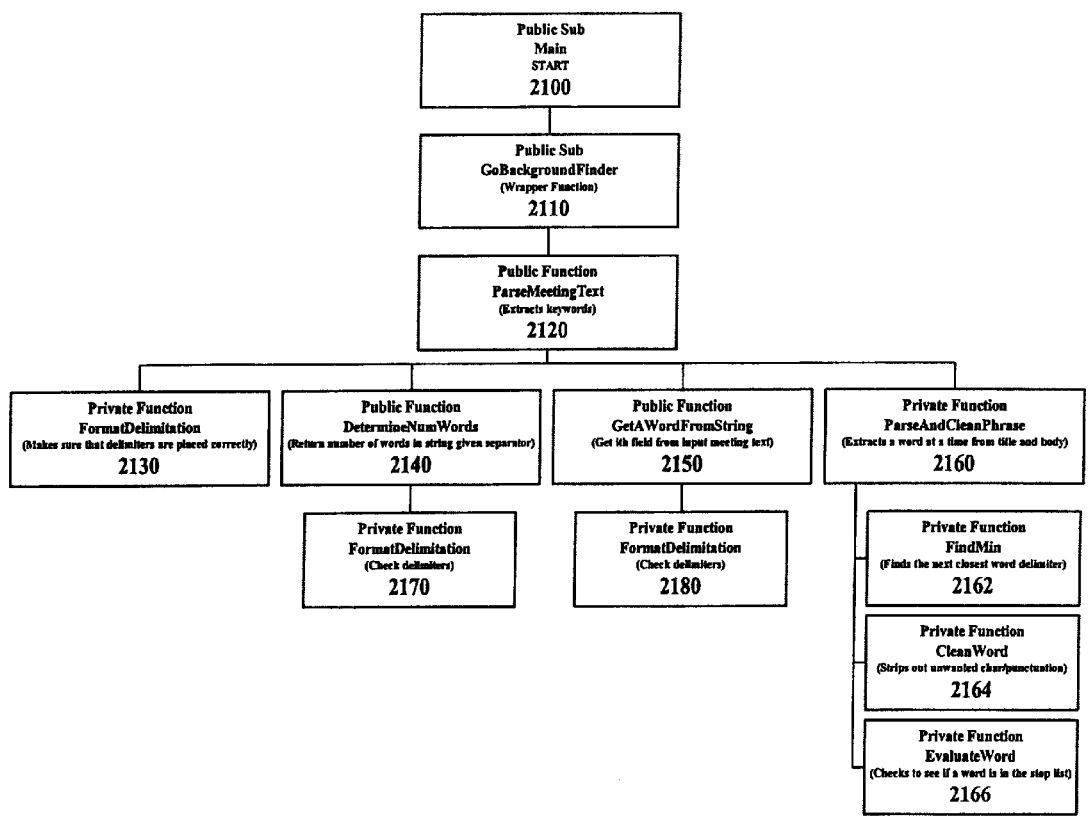
FIG. 21 is a flowchart of a parsing unit of the system in accordance with an embodiment of the present invention.

FIG. 21 is a user profile data model in accordance with an embodiment of the present invention. Processing commences at function block 2100 which is responsible for invoking the program from the main module. Then, at function block 2110, a wrapper function is invoked to prepare for the keyword extraction processing in function block 2120. After the keywords are extracted, then processing flows to function block 2130 to determine if the delimiters are properly positioned. Then, at function block 2140, the number of words in a particular string is calculated and the delimiters for the particular field are and a particular field from the meeting text is retrieved at function block 2150. Then, at function block 2180, the delimiters of the string are again checked to assure they are placed appropriately. Finally, at function block 2160, the extraction of each word from the title and body of the message is performed a word at a time utilizing the logic in function block 2162 which finds the next closest word delimiter in the input phrase, function block 2164 which strips unnecessary materials from a word and function block 2166 which determines if a word is on the stop list and returns an error if the word is on the stop list.

Pattern Matching:

Limitations associated with a simple searching method include:

1. Because it relies on a stop list of unwanted words in order to extract from the meeting text a set of keywords, it is limited by how comprehensive the stop list is. Instead of trying to figure out what parts of the meeting text we should throw away, we should focus on what parts of the meeting text we want.
2. A simple search method in accordance with an embodiment of the present invention only uses the keywords from a meeting title to form queries to send to Alta Vista and NewsPage. This ignores an alternative source of information for the query, the body of the meeting notice. We cannot include the keywords from the meeting body to form our queries because this often results in queries which are too long and so complex that we often obtain no meaningful results.

There is no way for us to tell what each keyword represents. For example, we may extract "Andy" and "Grove" as two keywords. However, a simplistic search has no way knowing that "Andy Grove" is in fact a person's name. Imagine the possibilities if we could somehow intelligently guess that "Andy Grove" is a person's name. We can find out if he is an Andersen person and if so what kind of projects he's been on before etc. etc.

In summary, by relying solely on a stop list to parse out unnecessary words, we suffer from "information overload".

Pattern Matching Overcomes These Limitations:

Here's how the pattern matching system can address each of the corresponding issues above in accordance with an embodiment of the present invention.

1. By doing pattern matching, we match up only parts of the meeting text that we want and extract those parts.
2. By performing pattern matching on the meeting body and extracting only the parts from the meeting body that we want. Our meeting body will not go to complete waste then.
3. Pattern matching is based on a set of templates that we specify, allowing us to identify people names, company names etc from a meeting text.
4. In summary, with pattern matching, we no longer suffer from information overload. Of course, the big problem is how well our pattern matching works. If we rely exclusively on artificial intelligence processing, we do not have a 100% hit rate. We are able to identify about 20% of all company names presented to us.

Patterns:

A pattern in the context of an embodiment of the present invention is a template specifying the structure of a phrase we are looking for in a meeting text. The patterns supported by an embodiment of the present invention are selected because they are templates of phrases which have a high probability of appearing in someone's meeting text. For example, when entering a meeting in a calendar, many would write something such as "Meet with Bob Dutton from Stanford University text Tuesday." A common pattern would then be something like the word "with" followed by a person's name (in this example it is Bob Dutton) followed by the word "from" and ending with an organization's name (in this case, it is Stanford University).

Pattern Matching Terminology:

Terminology associated with pattern matching includes:

Pattern: a pattern is a template specifying the structure of a phrase we want to bind the meeting text to. It contains sub units.

Element: a pattern can contain many sub-units. These subunits are called elements. For example, in the pattern "with $PEOPLE$ from $COMPANY$", "with" "$PEOPLE$" "from" "$COMPANY$" are all elements.

Placeholder: a placeholder is a special kind of element in which we want to bind a value to. Using the above example, "$PEOPLE$" is a placeholder.

Indicator: an indicator is another kind of element which we want to find in a meeting text but no value needs to bind to it. There may be often more than one indicator we are looking for in a certain pattern. That is why an indicator is not an "atomic" type.

Substitute: substitutes are a set of indicators which are all synonyms of each other. Finding any one of them in the input is good.

There may be five fields which are identified for each meeting:

Company ($COMPANY$)
People ($PEOPLE$)
Location ($LOCATION$)
Time ($TIME$)
Topic ($TOPIC_UPPER$) or ($TOPIC_ALL$)

In parentheses are the illustrative placeholders used in the code as representation of the corresponding meeting fields. Each placeholder may have the following meaning:

$COMPANY$: binds a string of capitalized words (e.g., Meet with Joe Carter of <Andersen Consulting>)

$PEOPLE$: binds series of string of two capitalized words potentially connected by ",", "and" or "&" (e.g., Meet with <Joe Carter> of Andersen Consulting, Meet with <Joe Carter and Luke Hughes> of Andersen Consulting)

$LOCATION$: binds a string of capitalized words (e.g., Meet Susan at <Palo Alto Square>)

$TIME$: binds a string containing the format #:## (e.g., Dinner at <6:30 pm>)

$TOPIC_UPPER$: binds a string of capitalized words for our topic (e.g., <Stanford Engineering Recruiting> Meeting to talk about new hires).

$TOPIC_ALL$: binds a string of words without really caring if it's capitalized or not. (e.g., Meet to talk about <ubiquitous computing>)

The following table represents patterns supported by BF. Each pattern belongs to a pattern group. All patterns within a pattern group share a similar format and they only differ from each other in terms of what indicators are used as substitutes. Note that the patterns which are grayed out are also commented in the code. BF has the capability to support these patterns but we decided that matching these patterns is not essential at this point.

| PAT RP | PAT # | PATTERN | EXAMPLE |
|---|---|---|---|
| 1 | a | $PEOPLE$ of $COMPANY$ | Paul Maritz of Microsoft |
|   | b | $PEOPLE$ from $COMPANY$ | Bill Gates, Paul Allen and Paul Maritz from Microsoft |
| 2 | a | $TOPIC_$UPPER$ meeting | Push Technology Meeting |
|   | b | $TOPIC_$UPPER$ mtg | Push Technology Mtg |
|   | c | $TOPIC_$UPPER$ demo | Push Technology demo |
|   | d | $TOPIC_$UPPER$ interview | Push Technology interview |
|   | e | $TOPIC_$UPPER$ presentation | Push Technology presentation |
|   | f | $TOPIC_$UPPER$ visit | Push Technology visit |
|   | g | $TOPIC_$UPPER$ briefing | Push Technology briefing |
|   | h | $TOPIC_$UPPER$ discussion | Push Technology discussion |
|   | i | $TOPIC_$UPPER$ workshop | Push Technology workshop |
|   | j | $TOPIC_$UPPER$ prep | Push Technology prep |
|   | k | $TOPIC_$UPPER$ review | Push Technology review |
|   | l | $TOPIC_$UPPER$ lunch | Push Technology lunch |
|   | m | $TOPIC_$UPPER$ project | Push Technology project |
|   | n | $TOPIC_$UPPER$ projects | Push Technology projects |
| 3 | a | $COMPANY$ corporation | Intel Corporation |
|   | b | $COMPANY$ corp. | IBM Corp. |
|   | c | $COMPANY$ systems | Cisco Systems |
|   | d | $COMPANY$ limited | IMB limited |
|   | e | $COMPANY$ ltd | IBM ltd |
| 4 | a | about $TOPIC_ALL$ | About intelligent agents technology |
|   | b | discuss $TOPIC_ALL$ | Discuss intelligent agents technology |
|   | c | show $TOPIC_ALL$ | Show the client our intelligent agents technology |
|   | d | re: $TOPIC_ALL$ | re: intelligent agents technology |
|   | e | review $TOPIC_ALL$ | Review intelligent agents technology |
|   | f | agenda | The agenda is as follows: clean up clean up clean up |
|   | g | agenda: $TOPIC_ALL$ | Agenda: demo client intelligent agents technology. demo ecommerce. |
| 5 | a | w/$PEOPLE$ of $COMPANY$ | Meet w/Joe Carter of Andersen Consulting |
|   | b | w/$PEOPLE$ of $COMPANY$ | Meet w/Joe Carter of Andersen Consulting |
| 6 | a | w/$COMPANY$ per $PEOPLE$ | Talk w/Intel per Jason Foster |
| 7 | a | At $TIME$ | at 3:00 pm |
|   | b | Around $TIME$ | Around 3:00 pm |
| 8 | a | At $LOCATION$ | At LuLu's resturant |
|   | b | In $LOCATION$ | in Santa Clara |
| 9 | a | Per $PEOPLE$ | per Susan Butler |
| 10 | a | call w/$PEOPLE$ | Conf call w/John Smith |
|   | B | call with $PEOPLE$ | Conf call with John Smith |
| 11 | A | prep for $TOPIC_ALL$ | Prep for London meeting |
|   | B | preparation for $TOPIC_ALL$ | Preparation for London meeting |

Figure 22:
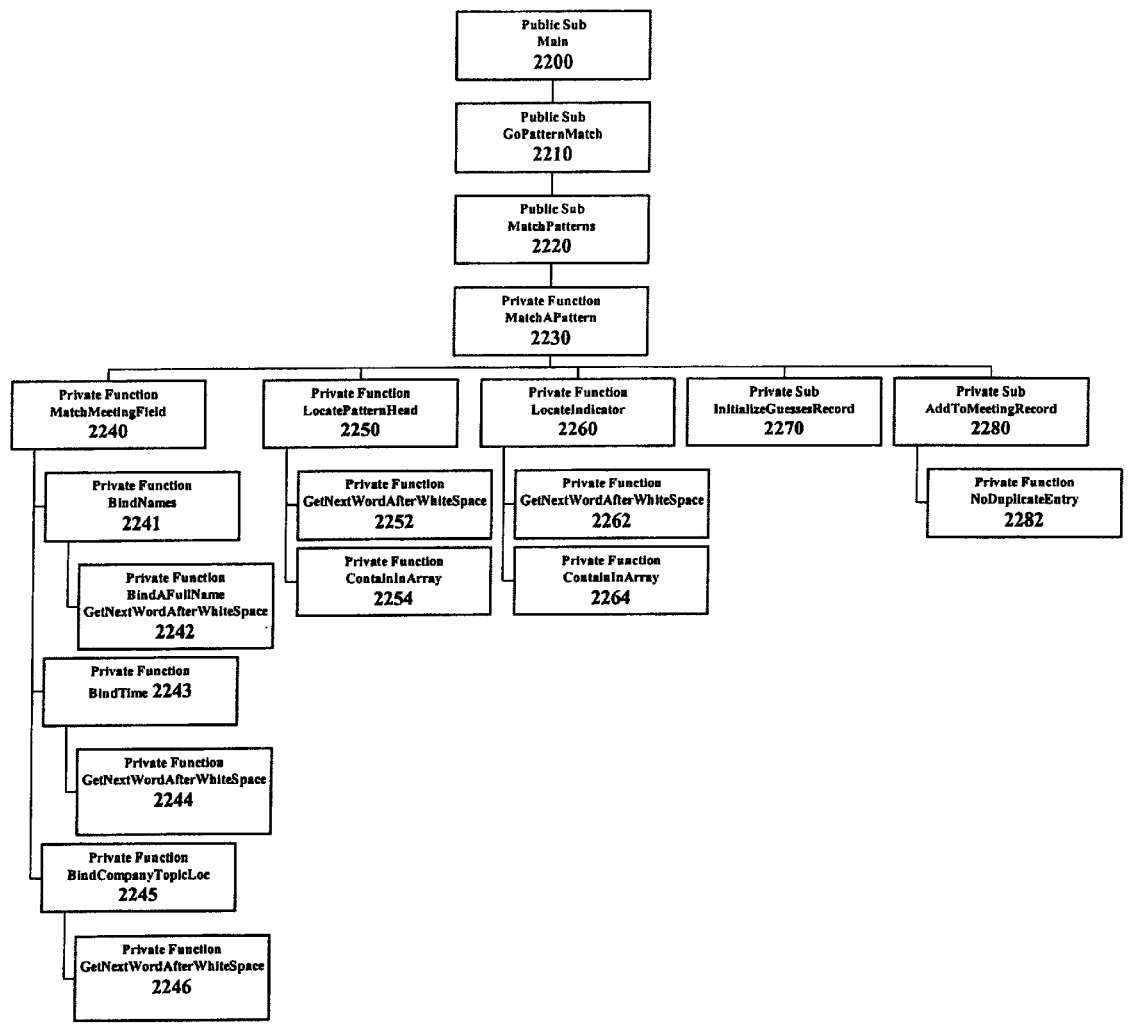
FIG. 22 is a flowchart for pattern matching in accordance with an embodiment of the present invention.

FIG. 22 is a detailed flowchart of pattern matching in accordance with an embodiment of the present invention. Processing commences at function block 2200 where the main program invokes the pattern matching application and passes control to function block 2210 to commence the pattern match processing. Then, at function block 2220, the wrapper function loops through to process each pattern which includes determining if a part of the text string can be bound to a pattern as shown in function block 2230. Then, at function block 2240, various placeholders are bound to values if they exist, and in function block 2241, a list of names separated by punctuation are bound, and at function block 2242 a full name is processed by finding two capitalized words as a full name and grabbing the next letter after a space after a word to determine if it is capitalized. Then, at function block 2243, time is parsed out of the string in an appropriate manner and the next word after a blank space in function block 2244. Then, at function block 2245, the continuous phrases of capitalized words such as company, topic or location are bound and in function block 2246, the next word after the blank is obtained for further processing in accordance with an embodiment of the present invention. Following the match meeting field processing, function block 2250 is utilized to locate an indicator which is the head of a pattern, the next word after the blank is obtained as shown in function block 2252 and the word is checked to determine if the word is an indicator as shown in function block 2254. Then, at function block 2260, the string is parsed to locate an indicator which is not at the end of the pattern and the next word after unnecessary white space such as that following a line feed or a carriage return is processed as shown in function block 2262 and the word is analyzed to determine if it is an indicator as shown in function block 2264. Then, in function block 2270, the temporary record is reset to the null set to prepare it for processing the next string and at function block 2280, the meeting record is updated and at function block 2282 a check is performed to determine if an entry is already made to the meeting record before parsing the meeting record again.

Using the Identified Meeting Fields:

Now that we have identified fields within the meeting text which we consider important, there are quite a few things we can do with it. One of the most important applications of pattern matching is of course to improve the query we construct which eventually gets submitted to Alta Vista and News Page. There are also a lot of other options and enhancements which exploit the results of pattern matching that we can add to BF. These other options will be described in the next section. The goal of this section is to give the reader a good sense of how the results obtained from pattern matching can be used to help us obtain better search results.

Figure 23:
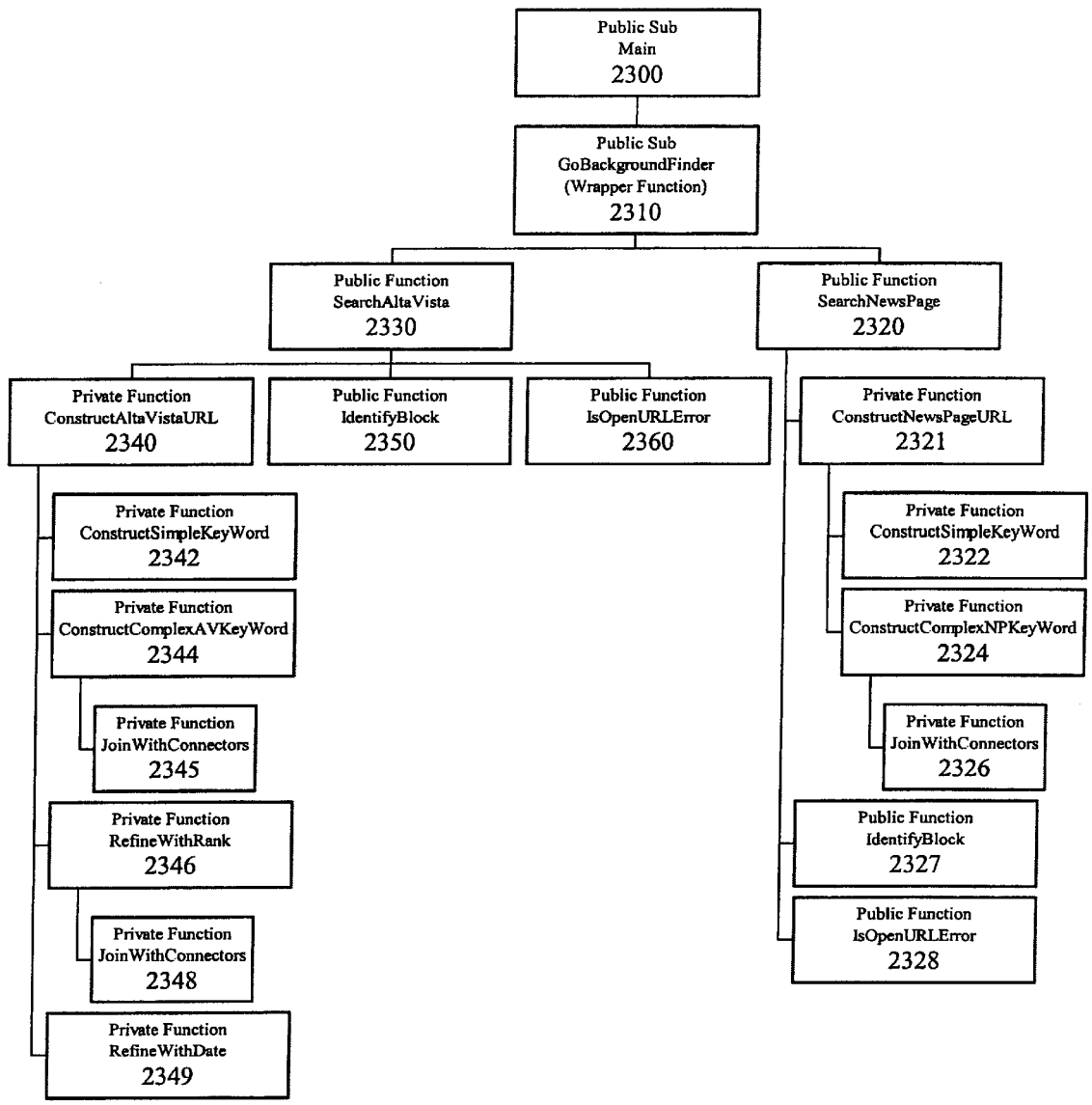
FIG. 23 is a flowchart for a search unit in accordance with an embodiment of the present invention.
Figure 24:
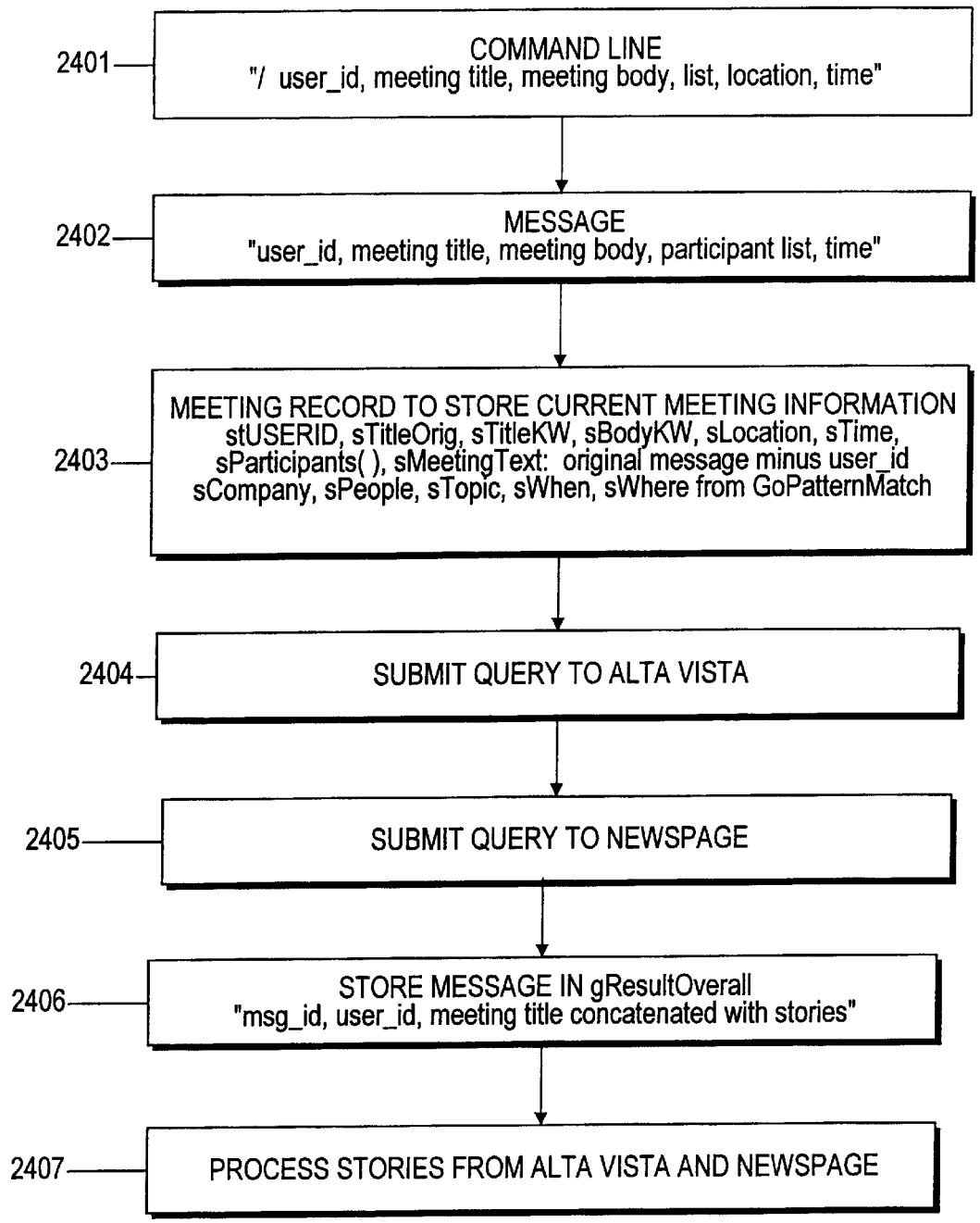
FIG. 24 is a flowchart for overall system processing in accordance with an embodiment of the present invention.

FIG. 23 shows a flowchart of the detailed processing for preparing a query and obtaining information from the Internet in accordance with an embodiment of the present invention. Processing commences at function block 2300 and immediately flows to function block 2310 to process the wrapper functionality to prepare for an Internet search utilizing a web search engine. If the search is to utilize the Alta Vista search engine, then at function block 2330, the system takes information from the meeting record and forms a query in function blocks 2340 to 2360 for submittal to the search engine. If the search is to utilize the NewsPage search engine, then at function block 2320, the system takes information from the meeting record and forms a query in function blocks 2321 to 2328.

Alta Vista Search Engine:

A strength of the Alta Vista search engine is that it provides enhanced flexibility. Using its advance query method, one can construct all sorts of Boolean queries and rank the search however you want. However, one of the biggest drawbacks with Alta Vista is that it is not very good at handling a large query and is likely to give back irrelevant results. If we can identify the topic and the company within a meeting text, we can form a pretty short but comprehensive query which will hopefully yield better results. We also want to focus on the topics found. It may not be of much merit to the user to find out info about a company especially if the user already knows the company well and has had numerous meetings with them. It's the topics they want to research on.

Figure 25:
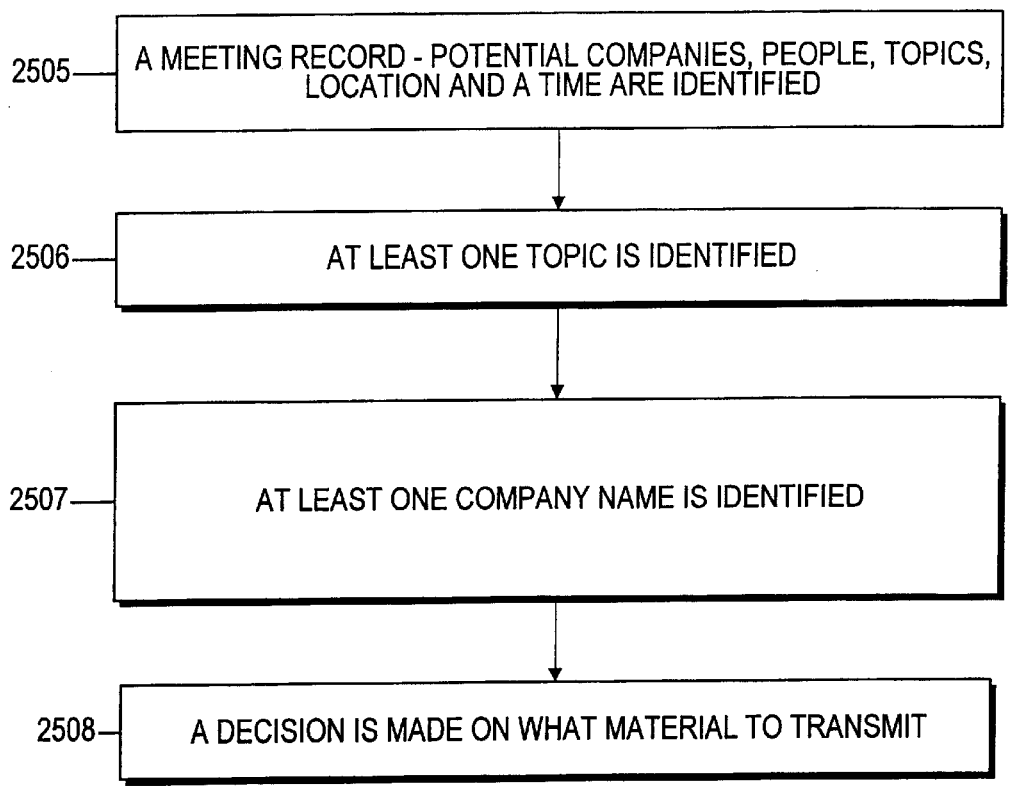
FIG. 25 is a flowchart of topic processing in accordance with an embodiment of the present invention.
Figure 26:
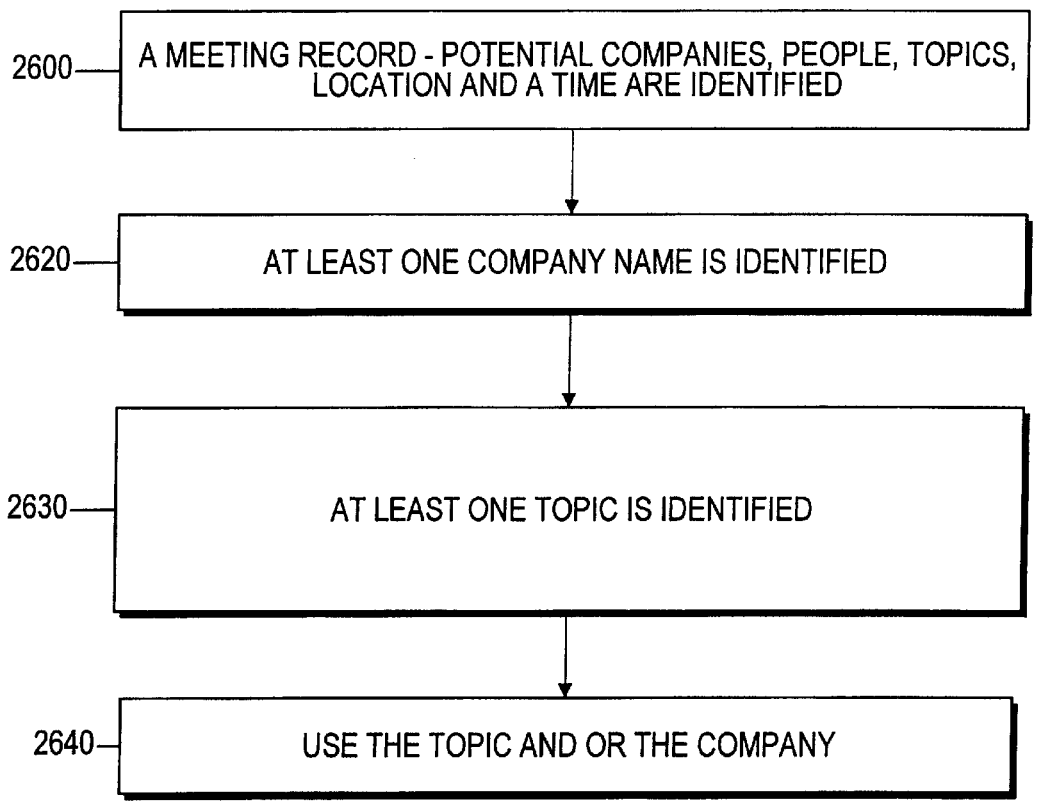
FIG. 26 is a flowchart of meeting record processing in accordance with an embodiment of the present invention.

News Page Search Engine:

A strength of the News Page search engine is that it does a great job searching for the most recent news if you are able to give it a valid company name. Therefore when we submit a query to the news page web site, we send whatever company name we can identify and only if we cannot find one do we use the topics found to form a query. If neither one is found, then no search is performed. The algorithm utilized to form the query to submit to Alta Vista is illustrated in FIG. 25. The algorithm that we will use to form the query to submit to News Page is illustrated in FIG. 26.

The following table describes in detail each function in accordance with an embodiment of the present invention. The order in which functions appear mimics the process flow as closely as possible. When there are situations in which a function is called several times, this function will be listed after the first function which calls it and its description is not duplicated after every subsequent function which calls it.

| Procedure Name | Type | Called By | Description |
| --- | --- | --- | --- |
| Main (13F.Main) | Public Sub | None | This is the main function where the program first launches. It initializes BF with the appropriate parameters (e.g. Internet time-out, stoplist . . .) and calls GoBF to launch the main part of the program. |
| ProcessCommandLine (BF.Main) | Private Sub | Main | This function parses the command line. It assumes that the delimiter indicating the beginning of input from Munin is stored in the constant CMD_SEPARATOR. |
| CreateStopList (BF.Main) | Private Function | Main | This function sets up a stop list for future use to parse out unwanted words from the meeting text. There are commas on each side of each word to enable straight checking. |

-continued

| Procedure Name | Type | Called By | Description |
| --- | --- | --- | --- |
| CreatePatterns (BF.Pattern Match) | Public Sub | Main | This procedure is called once when BF is first initialized to create all the potential patterns that portions of the meeting text can bind to. A pattern can contain however many elements as needed. There are two types of elements. The first type of elements are indicators. These are real words which delimit the potential of a meeting field (e.g. company) to follow. Most of these indicators are stop words as expected because stop words are words usually common to all meeting text so it makes sense they form patterns. The second type of elements are special strings which represent placeholders. A placeholder is always in the form of $*$ where * can be either PEOPLE, COMPANY, TOPIC_UPPER, TIME, LOCATION or TOPIC_ALL. A pattern can begin with either one of the two types of elements and can be however long, involving however any number/type of elements. This procedure dynamically creates a new pattern record for each pattern in the table and it also dynamically creates new tAPatternElements for each element within a pattern. In addition, there is the concept of being able to substitute indicators within a pattern. For example, the pattern $PEOPLE$ of $COMPANY$ is similar to the pattern $PEOPLE$ from $COMPANY$. "from" is a substitute for "of". Our structure should be able to express such a need for substitution. |
| GoBF (BF.Main) | Public Sub | Main | This is a wrapper proceduror that calls both the parsing and the searching subroutines of the BF. It is also responsible for sending data back to Munin. |
| ParseMeetingText (BF.Parse) | Public Function | GoBackGroundFinder | This function takes the initial meeting text and identifies the userID of the record as well as other parts of the meeting text including the title, body, participant list, location and time. In addition, we call a helper function ProcessStopList to eliminate all the unwanted words from the original meeting title and meeting body so that only keywords are left. The information parsed out is stored in the MeetingRecord structure. Note that this function does no error checking and for the most time assumes that the meeting text string is correctly formatted by Munin. The important variable is thisMeeting Record is the temp holder for all info regarding current meeting. It's eventually returned to caller. |
| FormatDelimitation (BF.Parse) | Private | ParseMeetingText, DetermineNumWords, GetAWordFromString | There are 4 ways in which the delimiters can be placed. We take care of all these cases by reducing them down to Case 4 in which there are no delimiters around but only between fields in a string (e.g. A::B::C) |
| DetermineNumWords (BF.Parse) | Public Function | ParseMeetingText, ProcessStopList | This functions determines how many words there are in a string (stInEvalString) The function assumes that each word is separated by a designated separator as specified in stSeparator. The return type is an integer that indicates how many words have been found assuming each word in the string is separated by stSeparator. This function is always used along with GetAW[001b]ordFromString and should be called before calling GetAWordFromString. |
| GetAWordFromString (BF.Parse) | Public Function | ParseMeetingText, ProcessStopList | This function extracts the ith word of the string (stInEvalString) assuming that each word in the string is separated by a designated separator contained in the variable stSeparator. In most cases, use this function with DetermineNumWords. The function returns the wanted word. This function checks to make sure that iInWordNum is within bounds so that i is not greater than the total number of words in string or less than/equal to zero. If it is out of bounds, we return empty string to indicate we can't get anything. We try to make sure this doesn't happen by calling DetermineNumWords first. |

-continued

| Procedure Name | Type | Called By | Description |
|---|---|---|---|
| ParseAndCleanPhrase (BF.Parse) | Private Function | ParseMeetingText | This function first grabs the word and send it to CleanWord in order strip the stuff that nobody wants. There are things in parseWord that will kill the word, so we will need a method of looping through the body and rejecting words without killing the whole function i guess keep CleanWord and check a return value ok, now I have a word so I need to send it down the parse chain. This chain goes ParseCleanPhrase -> CleanWord -> EvaluateWord. If the word gets through the entire chain without being killed, it will be added at the end to our keyword string. first would be the function that checks for "/" as a delimiter and extracts the parts of that. This I will call "StitchFace" (Denise is more normal and calls it GetAwordFromString) if this finds words, then each of these will be sent, in turn, down the chain. If these get through the entire chain without being added or killed then they will be added rather than tossed. |
| FindMin (BF.Parse) | Private Function | ParseAndCleanPhrase | This function takes in 6 input values and evaluates to see what the minimum non zero value is. It first creates an array as a holder so that we can sort the five input values in ascending order. Thus the minimum value will be the first non zero value element of the array. If we go through entire array without finding a non zero value, we know that there is an error and we exit the function. |
| CleanWord (BF.Parse) | Private Function | ParseAndCleanPhrase | This function tries to clean up a word in a meeting text. It first of all determines if the string is of a valid length. It then passes it through a series of tests to see it is clean and when needed, it will edit the word and strip unnecessary characters off of it. Such tests includes getting rid of file extensions, non chars, numbers etc. |
| EvaluateWord (BF.Parse) | Private Function | ParseAndCleanPhrase | This function tests to see if this word is in the stop list so it can determine whether to eliminate the word from the original meeting text. If a word is not in the stoplist, it should stay around as a keyword and this function exits beautifully with no errors. However, if the words is a stopword, an error must be returned. We must properly delimit the input test string so we don't accidentally retrieve sub strings. |
| GoPatternMatch (BF.PatternMatch) | Public Sub | GoBF | This procedure is called when our QueryMethod is set to complex query meaning we do want to do all the pattern matching stuff. It's a simple wrapper function which initializes some arrays and then invokes pattern matching on the title and the body. |
| MatchPatterns (BF.PatternMatch) | Public Sub | GoPattern Match | This procedure loops through every pattern in the pattern table and tries to identify different fields within a meeting text specified by sInEvalString. For debugging purposes it also tries to tabulate how many times a certain pattern was triggered and stores it in gTabulateMatches to see whichp pattern fired the most. gTabulateMatches is stored as a global because we want to be able to run a batch file of 40 or 50 test strings and still be able to know how often a pattern was triggered. |
| MatchAPattern (BF.PatternMatch) | Private Function | MatchPatterns | This function goes through each element in the current pattern. It first evaluates to determine whether element is a placeholder or an indicator. If it is a placeholder, then it will try to bind the placeholder with some value. If it is an indicator, then we try to locate it. There is a trick however. Depending on whether we are at current element is the head of the pattern or not we want to take different actions. If we are at the head, we want to look for the indicator or the placeholder. If we can't find it, then we know that the current pattern doesn't exist and we quit. However, if it is not the head, then we continue looking, because there may still be a head somewhere. We retry in this case. |
| MatchMeetingField (BF.PatternMatch) | Private Function | MatchAPattern | This function uses a big switch statement to first determine what kind of placeholder we are talking about and depending on what type of placeholder, we have specific requirements and different binding criteria as specified in the subsequent functions called such as BindNames, BindTime etc. If binding is successful we add it to our guessing record. |

-continued

| Procedure Name | Type | Called By | Description |
|---|---|---|---|
| BindNames (BF.PatternMatch) | Private Function | MatchMeetingField | In this function, we try to match names to the corresponding placeholder $PEOPLE$. Names are defined as any consecutive two words which are capitalized. We also what to retrieve a series of names which are connected by and, or & so we look until we don't see any of these 3 separators anymore. Note that we don't want to bind single word names because it is probably too general anyway so we don't want to produce broad but irrelevant results. This function calls BindAFullName which binds one name so in a since BindNames collects all the results from BindAFullName |
| BindAFullName (BF.PatternMatch) | Private Function | BindNames | This function tries to bind a full name. If the $PEOPLE$ placeholder is not tbe head of the pattern, we know that it has to come right at the beginning of the test string because we've been deleting stuff off the head of the string all along. If it is the head, we search until we find something that looks like a full name. If we can't find it, then there's no such pattern in the text entirely and we quit entirely from this pattern. This should eventually return us to the next pattern in MatchPatterns. |
| GetNextWordAfterWhiteSpace (BF.PatternMatch) | Private Function | BindAFullName, BindTime, BindCompanyTopicLoc | This function grabs the next word in a test string. It looks for the next word after white spaces, @ or /. The word is defined to end when we encounter another one of these white spaces or separators. |
| BindTime (BF.PatternMatch) | Private Function | MatchMeetingField | Get the immediate next word and see if it looks like a time pattern. If so we've found a time and so we want to add it to the record. We probably should add more time patterns. But people don't seem to like to enter the time in their titles these days especially since we now have tools like OutLook. |
| BindCompanyTopicLoc (BF.PatternMatch) | Private Function | MatchMeetingField | This function finds a continuous capitalized string and binds it to stMatch which is passed by reference from MatchMeetingField. A continous capitaiized string is a sequence of capitalized words which are not interrupted by things like, . etc. There's probably more stuff we can add to the list of interruptions. |
| LocatePatternHead (BF.PatternMatch) | Private Function | MatchAPattern | This function tries to locate an element which is an indicator. Note that this indicator SHOULD BE AT THE HEAD of the pattern otherwise it would have gone to the function LocateIndicator instead. Therefore, we keep on grabbing the next word until either there's no word for us to grab (quit) or if we find one of the indicators we are looking for. |
| ContainInArray (BF.PatternMatch) | Private Function | LocatePatternHead, LocateIndicator | ' This function is really simple. It loops through all the elements in the array ' to find a matching string. |
| LocateIndicator (BF.PatternMatch) | Private Function | MatchAPattern | This function tries to locate an element which is an indicator. Note that this indicator is NOT at the head of the pattern otherwise it would have gone to LocatePatternHead instead. Because of this, if our pattern is to be satisfied, the next word we grab HAS to be the indicator or else we would have failed. Thus we only grab one word, test to see if it is a valid indicator and then return result. |
| InitializeGuessesRecord (BF.PatternMatch) | Private Sub | MatchAPattern | This function reinitializes our temporary test structure because we have already transferred the info to the permanent structure, we can reinitialize it so they each have one element |
| AddToMeetingRecord (BF.PatternMatch) | Private Sub | MatchAPattern | This function is only called when we know that the information stored in tInCurrGuesses is valid meaning that it represents legitimate guesses of meeting fields ready to be stored in the permanent record, tInMeetingRecord. We check to make sure that we do not store duplicates and we also what to clean up what we want to store so that there's no cluttered crap such as punctuations, etc. The reason why we don't clean up until now is to save time. We don't waste resources calling ParseAndCleanPhrase until we know for sure that we are going to add it permanently. |
| NoDuplicateEntry (BF.PatternMatch) | Private Function | AddToMeetingRecord | This function loops through each element in the array to make sure that the test string aString is not the same as any of the strings already stored in the array. Slightly different from ContainInArray. |

-continued

| Procedure Name | Type | Called By | Description |
| --- | --- | --- | --- |
| SearchAltaVista (BF.Search) | Public Function | GoBackGroundFinder | This function prepares a query to be submited to AltaVista Search engine. It submits it and then parses the returning result in the appropriate format containing the title, URL and body/summary of each story retrieved. The number of stories retrieved is specified by the constant NUM_AV_STORIES. Important variables include stURLAltaVista used to store query to submit stResultHTML used to store html from page specified by stURLAltaVista. |
| ConstructAltaVistaURL (BF.Search) | Private Function | SearchAltaVista | This function constructs the URL string for the alta vista search engine using the advanced query search mode. It includes the keywords to be used, the language and how we want to rank the search. Depending on whether we want to use the results of our pattern matching unit, we construct our query differently. |
| ConstructSimpleKeyWord (BF.Search) | Private Function | ConstructAltaVistaURl, ConstructNewsPageURL | This function marches down the list of keywords stored in the stTitleKW or stBodyKW fields of the input meeting record and links them up into one string with each keyword separated by a connector as determined by the input variable stInConnector. Returns this newly constructed string. |
| ConstructComplexAVKeyword (BF.Search) | Private Function | ConstructAltaVistaURL | This function constructs the keywords to be send to the AltaVista site. Unlike ConstructSimpleKeyWord which simply takes all the keywords from the title to form the query, this function will look at the results of BF's pattern matching process and see if we are able to identify any specific company names or topics for constructing the queries. Query will include company and topic identified and default to simple query if we cannot identify either company or topic. |
| JoinWithConnectors (BF.Search) | Private Function | ConstructComplexAVKeyWord, ConstructComplexNPKeyWord, RefineWithRank | This function simply replaces the spaces between the words within the string with a connector which is specified by the input. |
| RefineWithDate (NOT CALLED AT THE MOMENT) (BF.Search) | Private Function | ConstructAltaVistaURL | This function constructs the date portion of the alta vista query and returns this portion of the URL as a string. It makes sure that alta vista searches for articles within the past PAST_NDAYS. |
| RefineWithRank (BF.Search) | Private Function | ConstructAltaVistaURL | This function constructs the string needed to passed to AltaVista in order to rank an advanced query search. If we are constructing the simple query we will take in all the keywords from the title. For the complex query, we will take in words from company and topic, much the same way we formed the query in ConstructComplexAVKeyWord. |
| IdentifyBlock (BF.Parse) | Public Function | SearchAltaVista, SearchNewsPage | This function extracts the block within a string marked by the beginning and the ending tag given as inputs starting at a certain location(iStart). The block retrieved does not include the tags themselves. If the block cannot be identified with the specified delimiters, we return unsuccessful through the parameter iReturnSuccess passed to use by reference. The return type is the block retrieved. |
| IsOpenURLError (BF.Error) | Public Function | SearchAltaVista, SearchNewsPage | This function determines whether the error encountered is that of a timeout error. It restores the mouse to default arrow and then returns true if it is a time out or false otherwise. |
| SearchNewsPage (BF.Search) | Public Function | GoBackGroundFinder | This function prepares a query to be submited to NewsPage Search engine. It submits it and then parses the returning result in the appropriate format containing the title, URL and body/summary of each story retrieved. The number of stories retrieved is specified by the constant UM_NP_STORIES |
| ConstructNewsPageURL (BF.Search) | Private Function | SearchNewsPage | This function constructs the URL to send to the NewsPage site. It uses the information contained in the input meeting record to determine what keywords to use. Also depending whether we want simple or complex query, we call different functions to form strings. |
| ConstructComplexNPKeyWord (BF.Search) | Private Function | ConstructNewsPageURL | This function constructs the keywords to be send to the NewsPage site. UnlikeConstructKeyWordString which simply takes all the keywords from the title to form the query, this function will look at the results of BF's pattern matching process and see if we are able to identify any specific company names or topics for constructing the queries. |

-continued

| Procedure Name | Type | Called By | Description |
| --- | --- | --- | --- |
| ConstructOverallResult (BF.Main) | Private Function | GoBackGroundFinder | This function takes in as input an array of strings (stInStories) and a MeetingRecord which stores the information for the current meeting. Each element in the array stores the stories retrieved from each information source. The function simply constructs the appropriate output to send to Munin including a return message type to let Munin know that it is the BF responding and also the original user_id and meeting title so Munin knows which meeting BF is talking about. |
| ConnectAndTransferToMunin (BF.Main) | Public Sub | GoBackGroundFinder | This function allows Background Finder to connect to Munin and eventually transport information to Munin. We will be using the UDP protocol instead of the TCP protocol so we have to set up the remote host and port correctly. We use a global string to store gResult Overall because although it is unnecessary with UDP, it is needed with TCP and if we ever switch back don't want to change code. |
| DisconnectFromMuninAndQuit (BF.Main) | Public Sub | | |

FIG. 24 shows a flowchart of the actual code utilized to prepare and submit searches to the Alta Vista and NewsPage search engines in accordance with an embodiment of the present invention. Processing commences at function block 2401 where a command line is utilized to update a calendar entry with specific calendar information. The message is next posted in accordance with function block 2402 and a meeting record is created to store the current meeting information in accordance with function block 2403. Then, in function block 2404 the query is submitted to the Alta Vista search engine and in function block 2405, the query is submitted to the NewsPage search engine. When a message is returned from the search engine, it is stored in a results data structure as shown in function block 2406 and the information is processed and stored in summary form in a file for use in preparation for the meeting as detailed in function block 2407.

FIG. 25 provides more detail on creating the query in accordance with an embodiment of the present invention. Processing commences at function block 2505 where the meeting record is parsed to obtain potential companies, people, topics, location and a time. Then, in function block 2506, at least one topic is identified and in function block 2507, at least one company name is identified and finally in function block 2508, a decision is made on what material to transmit to the file for ultimate consumption by the user.

FIG. 26 is a variation on the query theme presented in FIG. 25. A meeting record is parsed in function block 2600, a company is identified in function block 2620, a topic is identified in function block 2630 and finally in function block 2640 the topic and or the company is utilized in formulating the query.

Additional embodiments for adding various specific features for specific user requirements are discussed below:

Enhance Target Rate for Pattern Matching:

To increase BF's performance, more patterns/pattern groups are added to the procedure "CreatePatterns." The existing code for declaring patterns can be used as a template for future patterns. Because everything is stored as dynamic arrays, it is convenient to reuse code by cutting and pasting. The functions BindName, BindTime, BindCompanyLoc-Topic which are responsible for associating a value with a placeholder can be enhanced. The enhancement is realized by increasing the set of criteria for binding a certain meeting field in order to increase the number of binding values. For example, BindTime currently accepts and binds all values in the form of ##:## or #:##. To increase the times we can bind, we may want BindTime to also accept the numbers 1 to 12 followed by the more aesthetic time terminology "o'clock." Vocabulary based recognition algorithms and assigning an accuracy rate to each guess BF makes allowing only guesses which meet a certain threshold to be valid.

Depending on what location the system identifies through pattern matching or alternatively depending on what location the user indicates as the meeting place, a system in accordance with an embodiment of the present invention suggests a plurality of fine restaurants whenever it detects the words lunch/dinner/breakfast. We can also use a site like company finder to confirm what we got is indeed a company name or if there is no company name that pattern matching can identify, we can use a company finder web site as a "dictionary" for us to determine whether certain capitalized words represent a company name. We can even display stock prices and breaking news for a company that we have identified.

Figure 27:
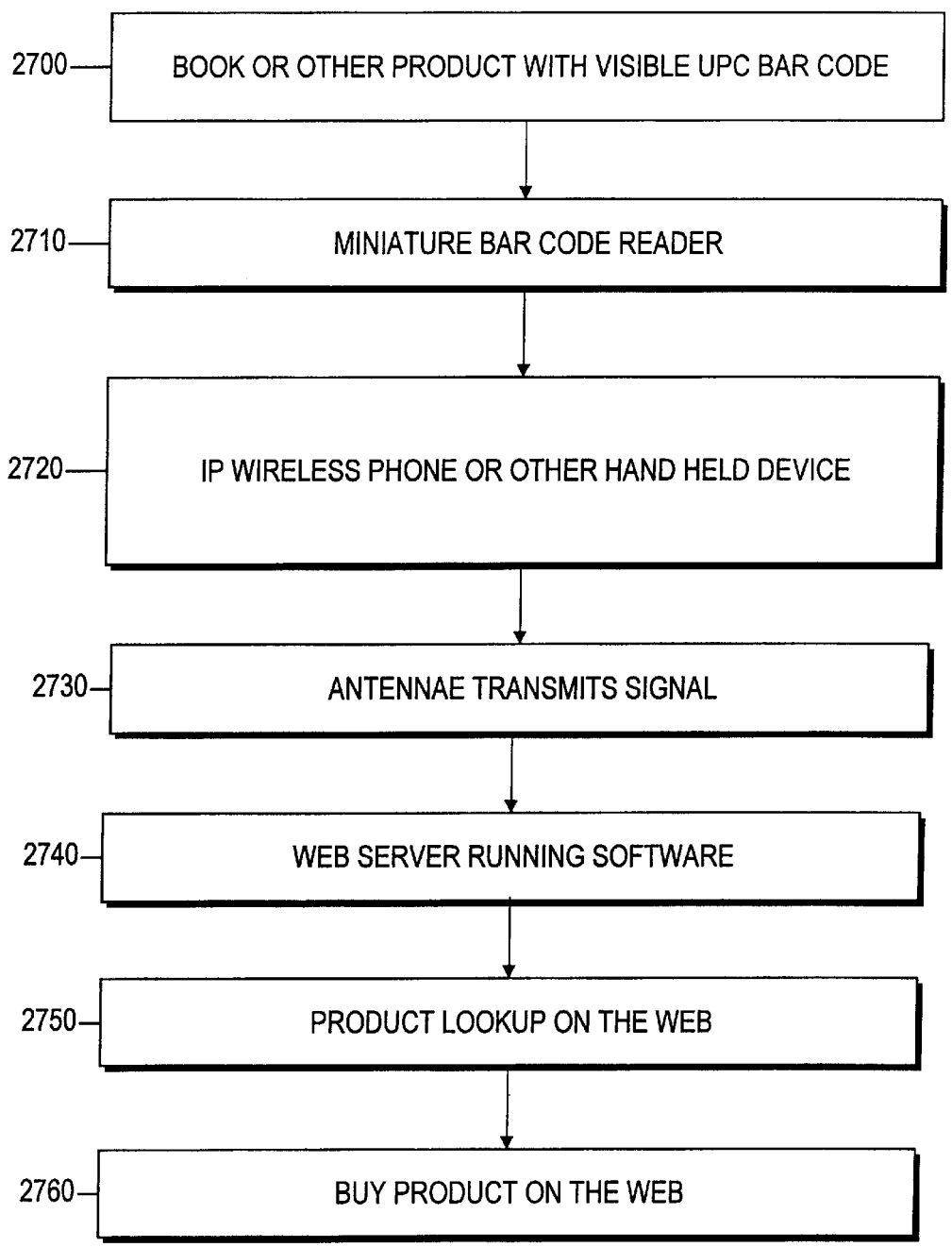
FIG. 27 is a block diagram of process flow of a pocket bargain finder in accordance with an embodiment of the present invention.

Wireless Bargain Identification:

FIG. 27 is a flow diagram that depicts the hardware and logical flow of control for a device and a software system designed to allow Web-based comparison shopping in conventional, physical, non-Web retail environments. A wireless phone or similar hand-held wireless device 2720 with Internet Protocol capability is combined with a miniature barcode reader 2710 (installed either inside the phone or on a short cable) and used to scan the Universal Product Code (UPC) bar code on a book or other product 2700. The wireless device 2720 transmits the bar code via an antennae 2730 to the Pocket BargainFinder Service Module (running on a Web server) 2740, which converts it to (in the case of books) its International Standard Book Number or (in the case of other products) whatever identifier is appropriate. The Service Module then contacts the appropriate third-party Web site(s) to find price, shipping and availability information on the product from various Web suppliers 2750. This information is formatted and displayed on the hand-held device's screen. The IP wireless phone or other hand held device 2720 utilizes a wireless modem such as a Ricochet SE Wireless Modem from Metricom. Utilizing this device, a user can hang out in a coffee shop with a portable computer perched on a rickety little table, with a latte sloshing dangerously close to the keyboard, and access the Internet at speeds rivaling direct connect via a telephone line.

The 8-ounce Ricochet SE Wireless Modem is about as large as a pack of cigarettes and setup is extremely simple, simply attach the modem to the back of your portable's screen with the included piece of Velcro, plug the cable into the serial port, flip up the stubby antenna, and transmit. Software setup is equally easy: a straightforward installer adds the Ricochet modem drivers and places the connection icon on your desktop. The functional aspects of the modem are identical to that of a traditional telephone modem.

Of course, wireless performance isn't nearly as reliable as a traditional dial-up phone connection. We were able to get strong connections in several San Francisco locations as long as we stayed near the windows. But inside CNET's all-brick headquarters, the Ricochet couldn't connect at all. When you do get online, performance of up to 28.8 kbps is available with graceful degradation to slower speeds. But even the slower speeds didn't disappoint. Compared to the alternative—connecting via a cellular modem—the Ricochet is much faster, more reliable, and less expensive to use. Naturally, the SE Wireless is battery powered. The modem has continuous battery life of up to 12 hours. And in accordance with an embodiment of the present invention, we ran down our portable computer's dual cells before the Ricochet started to fade.

Thus, utilizing the wireless modem, a user may utilize the web server software 2740 to identify the right product 2750 and then use an appropriate device's key(s) to select a supplier and place an order in accordance with an embodiment of the present invention. The BargainFinder Service Module then consummates the order with the appropriate third-party Web supplier 2760.

mySite! Personal Web Site & Intentions Value Network:

mySite! is a high-impact, Internet-based application in accordance with an embodiment of the present invention that is focused on the theme of delivering services and providing a personalized experience for each customer via a personal web site in a buyer-centric world. The services are intuitively organized around satisfying customer intentions—fundamental life needs or objectives that require extensive planning decisions, and coordination across several dimensions, such as financial planning, healthcare, personal and professional development, family life, and other concerns. Each member owns and maintains his own profile, enabling him to create and browse content in the system targeted specifically at him. From the time a demand for products or services is entered, to the completion of payment, intelligent agents are utilized to conduct research, execute transactions and provide advice. By using advanced profiling and filtering, the intelligent agents learn about the user, improving the services they deliver. Customer intentions include Managing Daily Logistics (e.g., email, calendar, contacts, to-do list, bill payment, shopping, and travel planning); and Moving to a New Community (e.g., finding a place to live, moving household possessions, getting travel and shipping insurance coverage, notifying business and personal contacts, learning about the new community). From a consumer standpoint, mySite! provides a central location where a user can access relevant products and services and accomplish daily tasks with ultimate ease and convenience.

From a business standpoint, mySite! represents a value-added and innovative way to effectively attract, service, and retain customers. Intention value networks allow a user to enter through a personalized site and, and with the assistance of a learning, intelligent agent, seamlessly interact with network participants. An intention value network in accordance with an embodiment of the present invention provides superior value. It provides twenty four hour a day, seven days a week access to customized information, advice and products. The information is personalized so that each member views content that is highly customized to assure relevance to the required target user.

Egocentric Interface:

An Egocentric Interface is a user interface crafted to satisfy a particular user's needs, preferences and current context. It utilizes the user's personal information that is stored in a central profile database to customize the interface. The user can set security permissions on and preferences for interface elements and content. The content integrated into the Egocentric Interface is customized with related information about the user. When displaying content, the Egocentric Interface will include the relationship between that content and the user in a way that demonstrates how the content relates to the user. For instance, when displaying information about an upcoming ski trip the user has signed up for, the interface will include information about events from the user's personal calendar and contact list, such as other people who will be in the area during the ski trip. This serves to put the new piece of information into a context familiar to the individual user.

Figure 28:
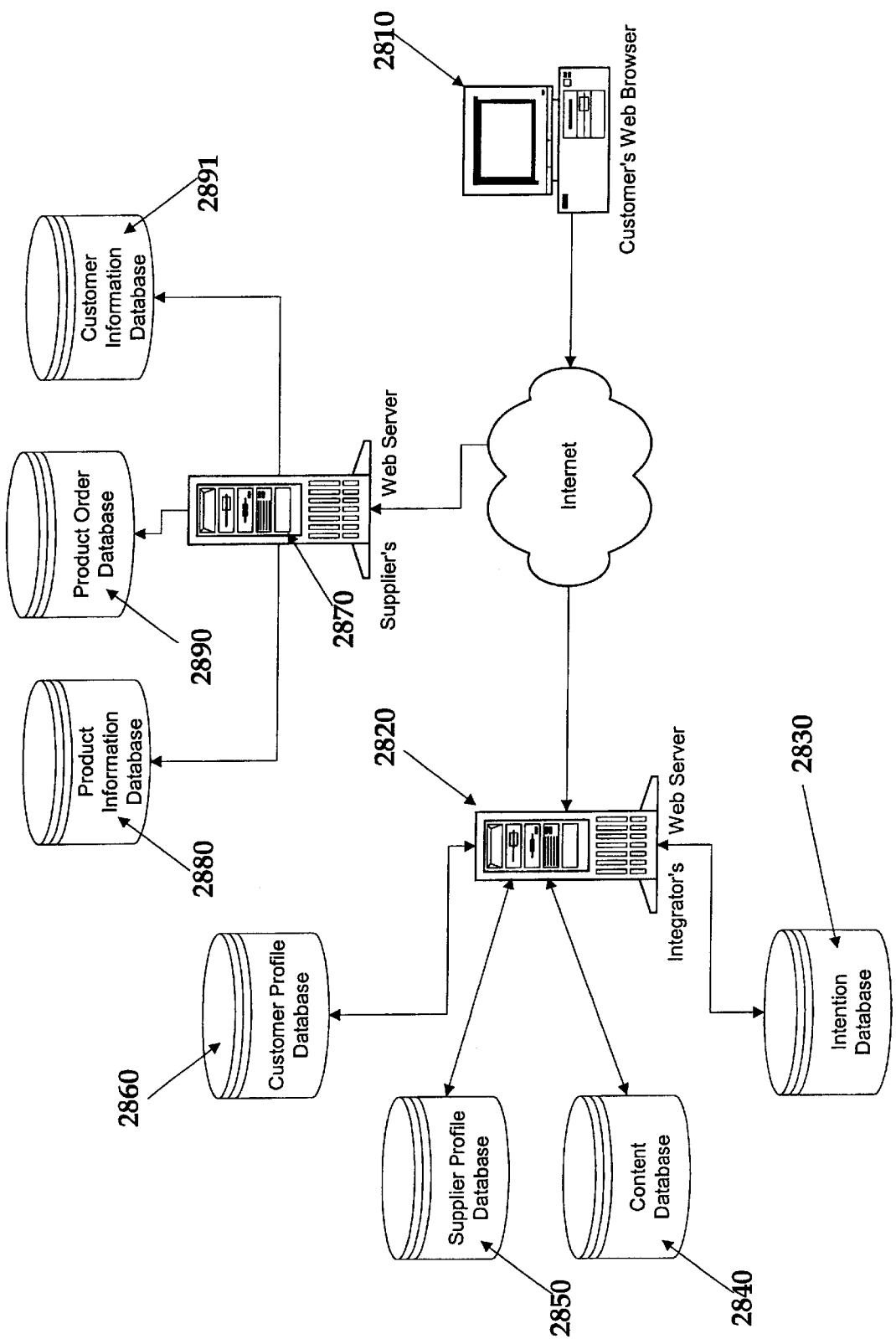
FIG. 28 is a block diagram depicting the logic associated with creating a customized content web page in accordance with an embodiment of the present invention.

FIG. 28 describes the Intention Value Network Architecture implementation for the World Wide Web in accordance with an embodiment of the present invention.

For simplification purposes, this diagram ignores the complexity pertaining to security, scalability and privacy. The customer can access the Intention Value Network with any Internet web browser 2810, such as Netscape Navigator or Microsoft Internet Explorer, running on a personal computer connected to the Internet or a Personal Digital Assistant with wireless capability. See FIG. 36 for a more detailed description of the multiple methods for accessing an Intention Value Network. The customer accesses the Intention Value Network through the unique name or IP address associated with the Integrator's Web Server 2820. The Integrator creates the Intention Value Network using a combination of resources, such as the Intention Database 2830, the Content Database 2840, the Supplier Profile Database 2850, and the Customer Profile Database 2860.

The Intention Database 2830 stores all of the information about the structure of the intention and the types of products and services needed to fulfill the intention. Information in this database includes intention steps, areas of interest, layout templates and personalization templates. The Content Database 2840 stores all of the information related to the intention, such as advice, referral information, personalized content, satisfaction ratings, product ratings and progress reports. The Supplier Profile Database 2850 contains information about the product and service providers integrated into the intention. The information contained in this database provides a link between the intention framework and the suppliers. It includes product lists, features and descriptions, and addresses of the suppliers' product web sites. The Customer Profile Database 2860 contains personal information about the customers, such as name, address, social security number and credit card information, personal preferences, behavioral information, history, and web site layout preferences. The Supplier's Web Server 2870 provides access to all of the supplier's databases necessary to provide information and transactional support to the customer.

The Product Information Database 2880 stores all product-related information, such as features, availability and pricing. The Product Order Database 2890 stores all customer orders. The interface to this database may be through an Enterprise Resource Planning application offered by SAP, Baan, Oracle or others, or it may be accessible directly through the Supplier's Web Server or application server. The Customer Information Database 2891 stores all of the customer information that the supplier needs to complete a transaction or maintain customer records.

Figure 29:
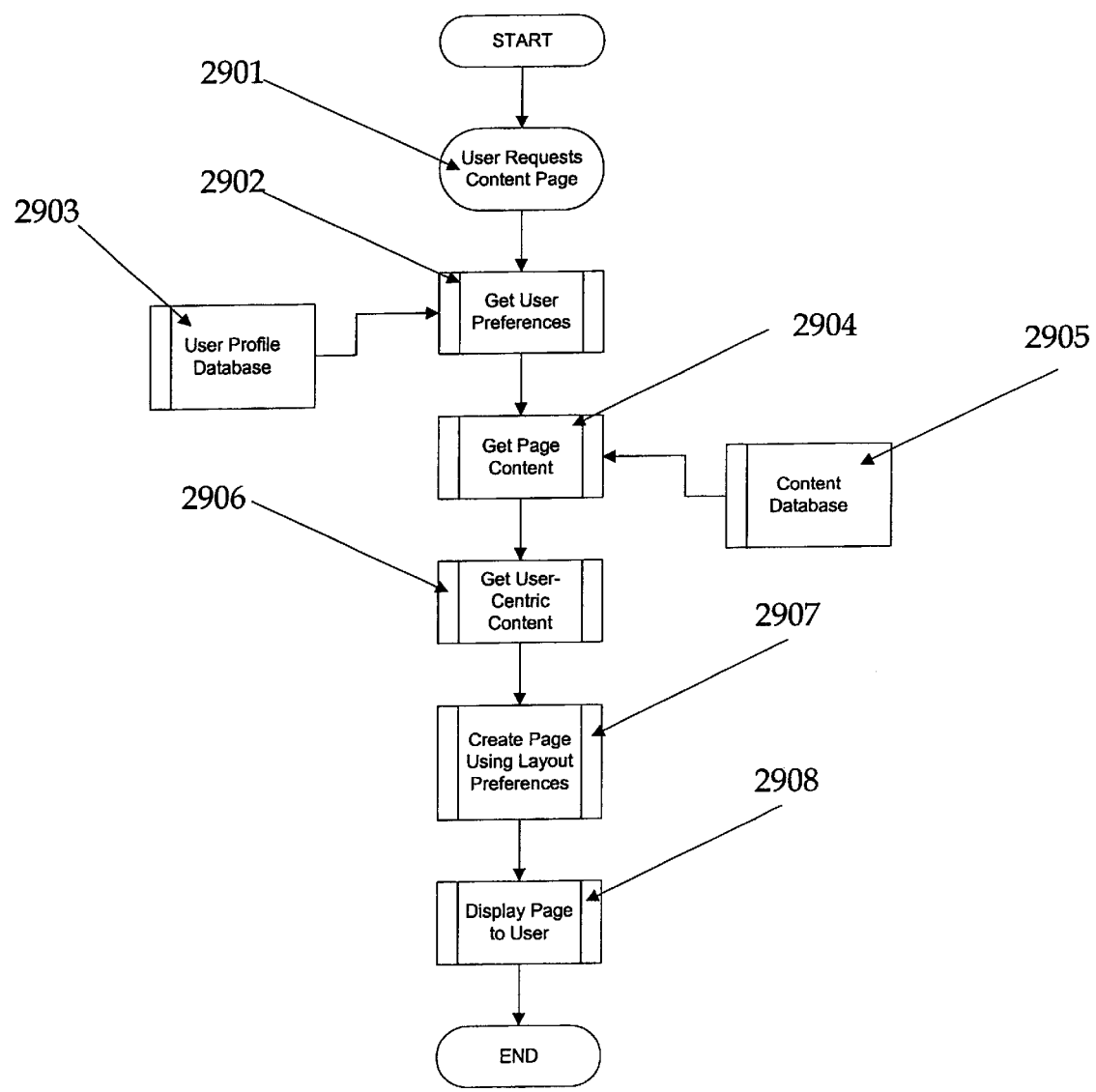
FIG. 29 is flowchart depicting the logic associated with creating a customized content web page in accordance with an embodiment of the present invention.

FIG. 29 shows a flowchart providing the logic utilized to create a web page within the Egocentric Interface in accordance with an embodiment of the present invention.

The environment assumes a web server and a web browser connected through a TCP/IP network, such as over the public Internet or a private Intranet. Possible web servers could include Microsoft Internet Information Server, Netscape Enterprise Server or Apache. Possible web browsers include Microsoft Internet Explorer or Netscape Navigator. The client (i.e. web browser) makes a request 2901 to the server (i.e. web server) for a particular web page. This is usually accomplished by a user clicking on a button or a link within a web page. The web server gets the layout and content preferences 2902 for that particular user, with the request to the database keyed off of a unique user id stored in the client (i.e. web browser) and the User profile database 2903. The web server then retrieves the content 2904 for the page that has been requested from the content database 2905. The relevant user-centric content, such as calendar, email, contact list, and task list items are then retrieved 2906. (See FIG. 30 for a more detailed description of this process.) The query to the database utilizes the user content preferences stored as part of the user profile in the User profile database 2903 to filter the content that is returned. The content that is returned is then formatted into a web page 2907 according to the layout preferences defined in the user profile. The web page is then returned to the client and displayed to the user 2908.

Figure 30:
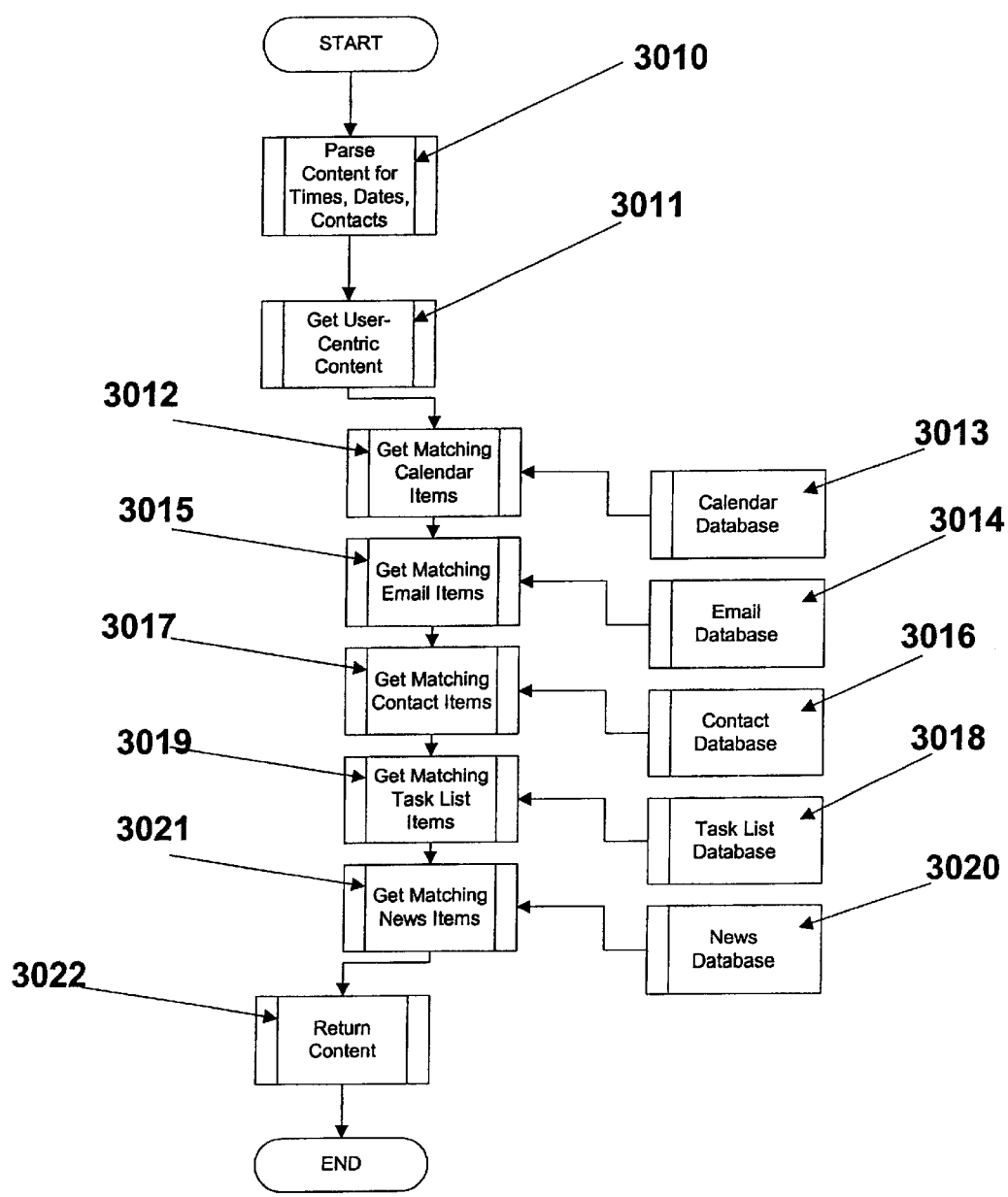
FIG. 30 is a flowchart depicting the detailed logic associated with retrieving user-centric content in accordance with an embodiment of the present invention.

FIG. 30 describes the process of retrieving user-centric content to add to a web page. This process describes 2906 in FIG. 29 in a more detailed fashion. It assumes that the server already has obtained the user profile and the existing content that is going to be integrated into this page. The server parses 3010 the filtered content, looking for instances of events, contact names and email addresses. If any of these are found, they are tagged and stored in a temporary holding space. Then, the server tries to find any user-centric content 3020 stored in various databases. This involves matching the tagged items in the temporary storage space with calendar items 3030 in the Calendar Database 3040; email items 3015 in the Email Database 3014; contact items 3017 in the Contact Database 3068; task list items 3019 in the Task List Database 3018; and news items 3021 in the News Database 3020. After retrieving any relevant user-centric content, it is compiled together and returned 3022.

User Persona:

The present invention may allow the user to create a number of different personas that aggregate profile information into sets that are useful in different contexts. A user may create one persona when making purchases for his home. This persona may contain his home address and may indicate that this user is looking to find a good bargain when shopping. The same user may create a second persona that can be used when he is in a work context. This persona may store the user's work address and may indicate that the user prefers certain vendors or works for a certain company that has a discount program in place. When shopping for work-related items, the user may use this persona. A persona may also contain rules and restrictions. For instance, the work persona may restrict the user to making airline reservations with only one travel agent and utilizing booking rules set up by his employer.

Figure 31:
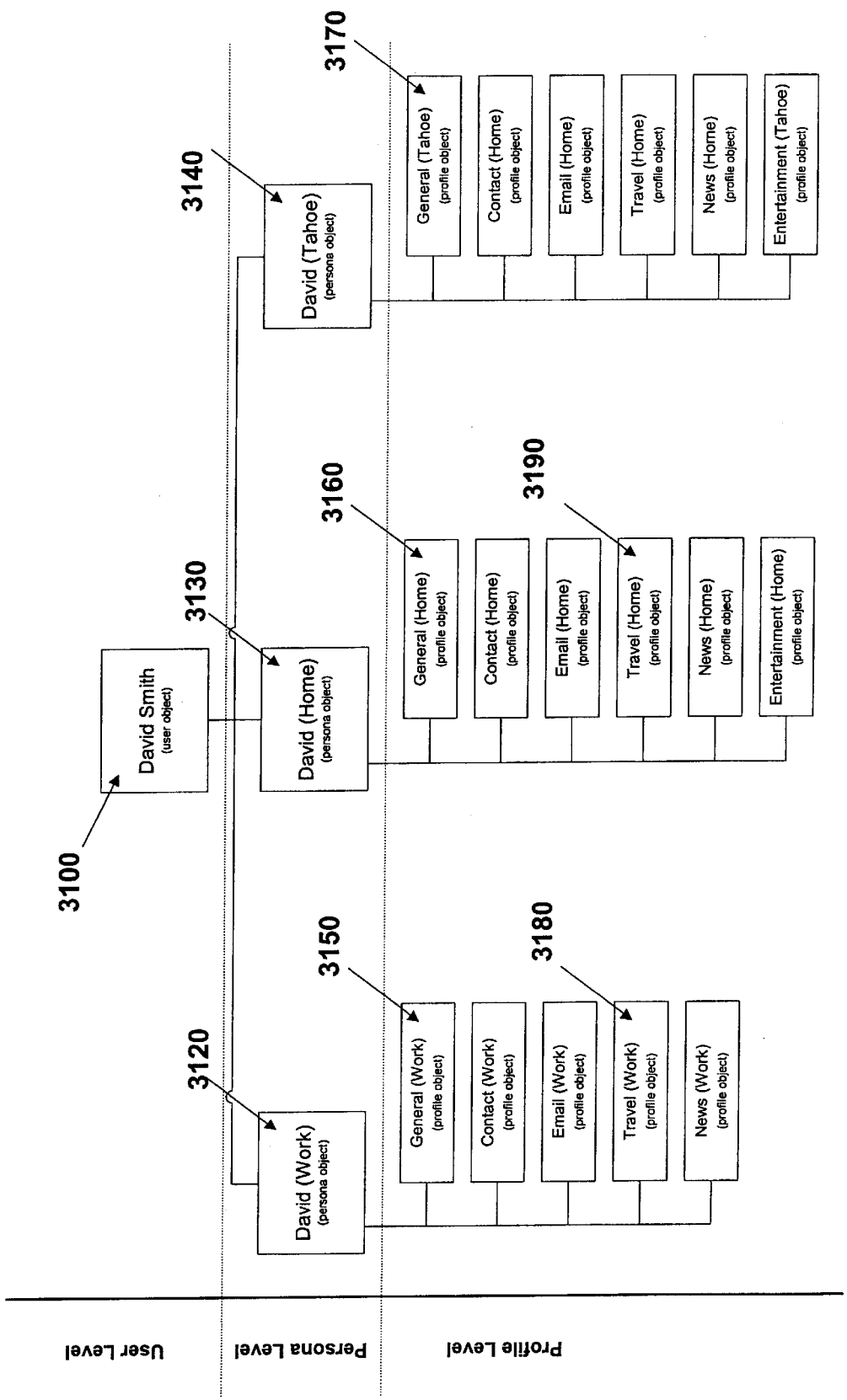
FIG. 31 is a data model of a user profile in accordance with an embodiment of the present invention.

FIG. 31 describes the relationship between a user, his multiple personas and his multiple profiles. At the User Level is the User Profile 3100. This profile describes the user and his account information. There is one unique record in the database for each user who has an account. Attached to each user are multiple Personas 3120, 3130 & 3140. These Personas are used to group multiple Profiles into useful contexts. For instance, consider a user who lives in San Francisco and works in Palo Alto, but has a mountain cabin in Lake Tahoe. He has three different contexts in which he might be accessing his site. One context is work-related. The other two are home-life related, but in different locations. The user can create a Persona for Work 3120, a Persona for Home 3130, and a Persona for his cabin home 3140. Each Persona references a different General Profile 3150, 3160 and 3170 which contains the address for that location. Hence, there are three General Profiles. Each Persona also references one of two Travel Profiles. The user maintains a Work Travel Profile 3180 that contains all of the business rules related to booking tickets and making reservations. This Profile may specify, for instance, that this person only travels in Business or First Class and his preferred airline is United Airlines. The Work Persona references this Work Travel Profile. The user may also maintain a Home Travel Profile 3190 that specifies that he prefers to travel in coach and wants to find non-refundable fairs, since they are generally cheaper. Both the Persona for Home and the Persona for the cabin home point to the Home Travel Profile.

Figure 32:
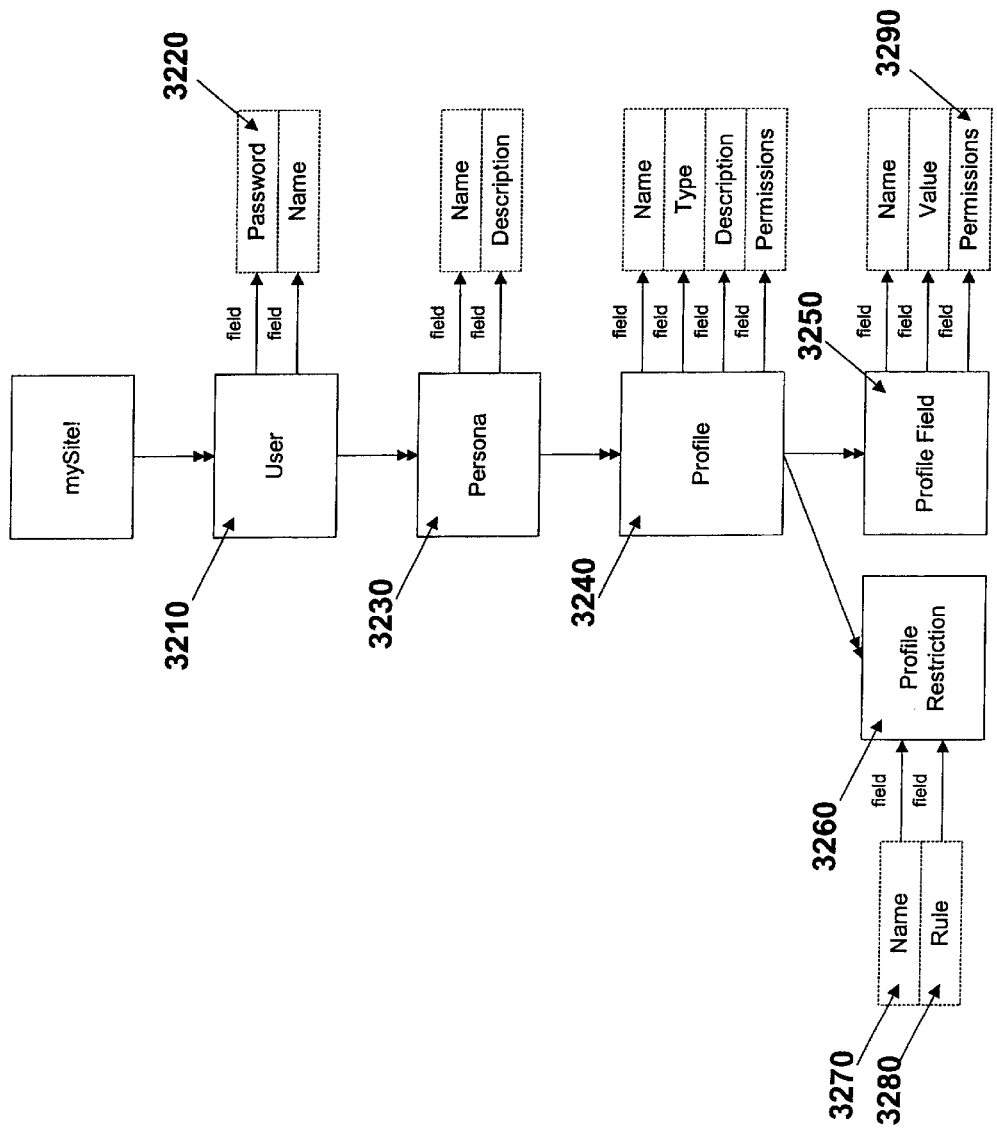
FIG. 32 is a persona data model in accordance with an embodiment of the present invention.

FIG. 32 describes the data model that supports the Persona concept. The user table 3210 contains a record for each user who has an account in the system. This table contains a username and a password 3220 as well as a unique identifier. Each user can have multiple Personas 3230, which act as containers for more specialized structures called Profiles 3240. Profiles contain the detailed personal information in Profile Field 3250 records. Attached to each Profile are sets of Profile Restriction 3260 records. These each contain a Name 3270 and a Rule 3280, which define the restriction. The Rule is in the form of a pattern like (if x then y), which allows the Rule to be restricted to certain uses. An example Profile Restriction would be the rule that dictates that the user cannot book a flight on a certain airline contained in the list. This Profile Restriction could be contained in the "Travel" Profile of the "Work" Persona set up by the user's employer, for instance. Each Profile Field also contains a set of Permissions 3290 that are contained in that record. These permissions dictate who has what access rights to that particular Profile Field's information.

Intention-Centric Interface:

Satisfying Customer Intentions, such as Planning for Retirement or Relocating requires a specialized interface. Customer Intentions require extensive planning and coordination across many areas, ranging from financial security, housing and transportation to healthcare, personal and professional development, and entertainment, among others. Satisfying Intentions requires a network of complementary businesses, working across industries, to help meet consumers' needs.

An Intention-Centric Interface is a user interface designed to help the user manage personal Intentions. At any given point, the interface content is customized to show only content that relates to that particular Intention. The Intention-Centric Interface allows the user to manage the process of satisfying that particular Intention. This involves a series of discrete steps and a set of content areas the user can access. At any point, the user can also switch the interface to manage a different Intention, and this act will change the content of the interface to include only that content which is relevant to the satisfaction of the newly selected Intention.

Figure 33:
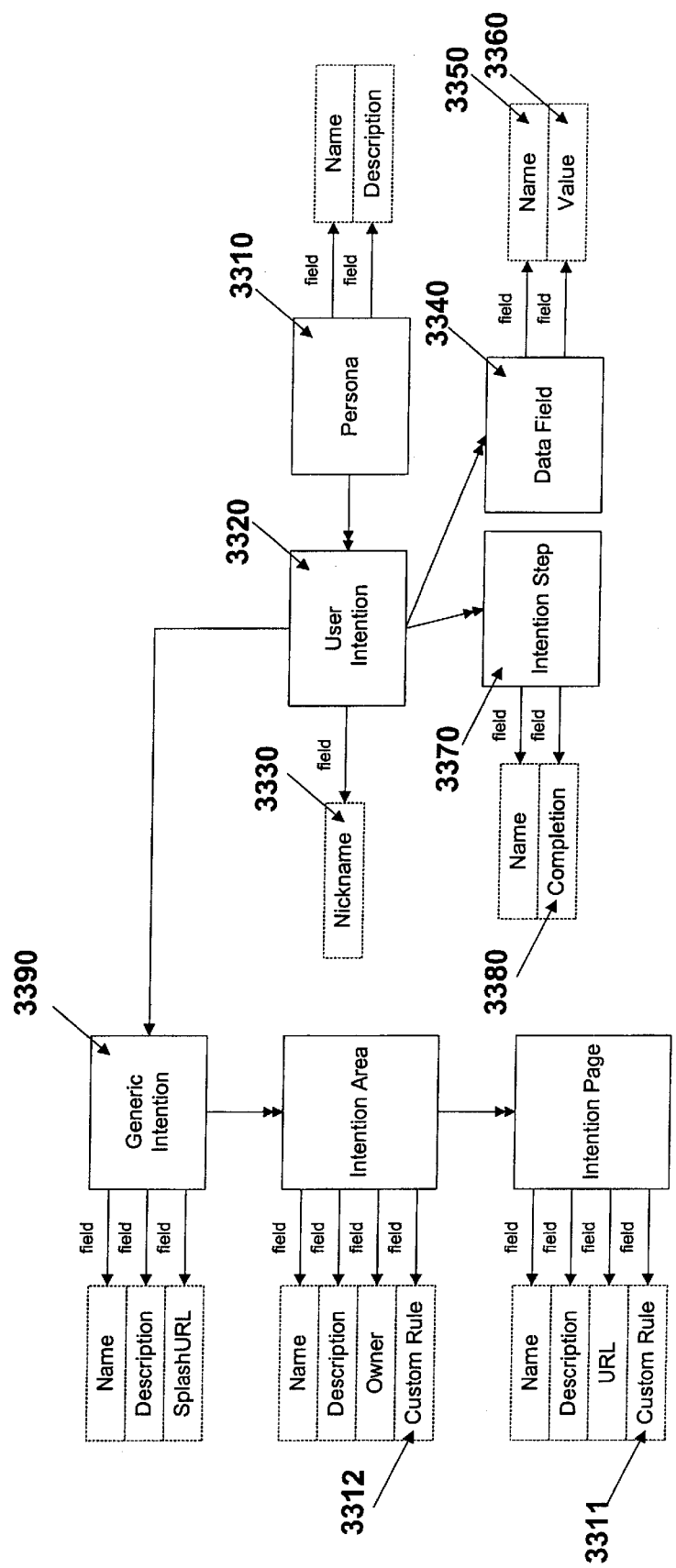
FIG. 33 is an intention data model in accordance with an embodiment of the present invention.

FIG. 33 provides a detailed description of the data model needed to support an Intention-Centric Interface. Each User Persona 3310 (see FIG. 32 for a more detailed description of the Persona data model.) has any number of active User Intentions 3320. Each active User Intention is given a Nickname 3330, which is the display name the user sees on the screen. Each active User Intention also contains a number of Data Fields 3340, which contain any user data collected throughout the interaction with the user. For instance, if the user had filled out a form on the screen and one of the fields was Social Security Number, the corresponding Data Field would contain Name="SSN" 3350, Value="999-99-9999" 3360. Each User Intention also keeps track of Intention Step 3370 completion status. The Completion 3380 field indicates whether the user has completed the step. Every User Intention is a user-specific version of a Generic Intention 3390, which is the default model for that Intention for all users. The Generic Intention is customized through Custom Rules 3311 and 3312 that are attached to the sub-steps in the Intention. These Custom Rules are patterns describing how the system will customize the Intention for each individual user using the individual user's profile information.

Statistical Agent:

An agent keeps track of key statistics for each user. These statistics are used in a manner similar to the Tamagochi virtual reality pet toy to encourage certain behaviors from the user. The statistics that are recorded are frequency of login, frequency of rating of content such as news articles, and activity of agents, measured by the number of tasks which it performs in a certain period. This information is used by the system to emotionally appeal to the user to encourage certain behaviors.

Figure 34:
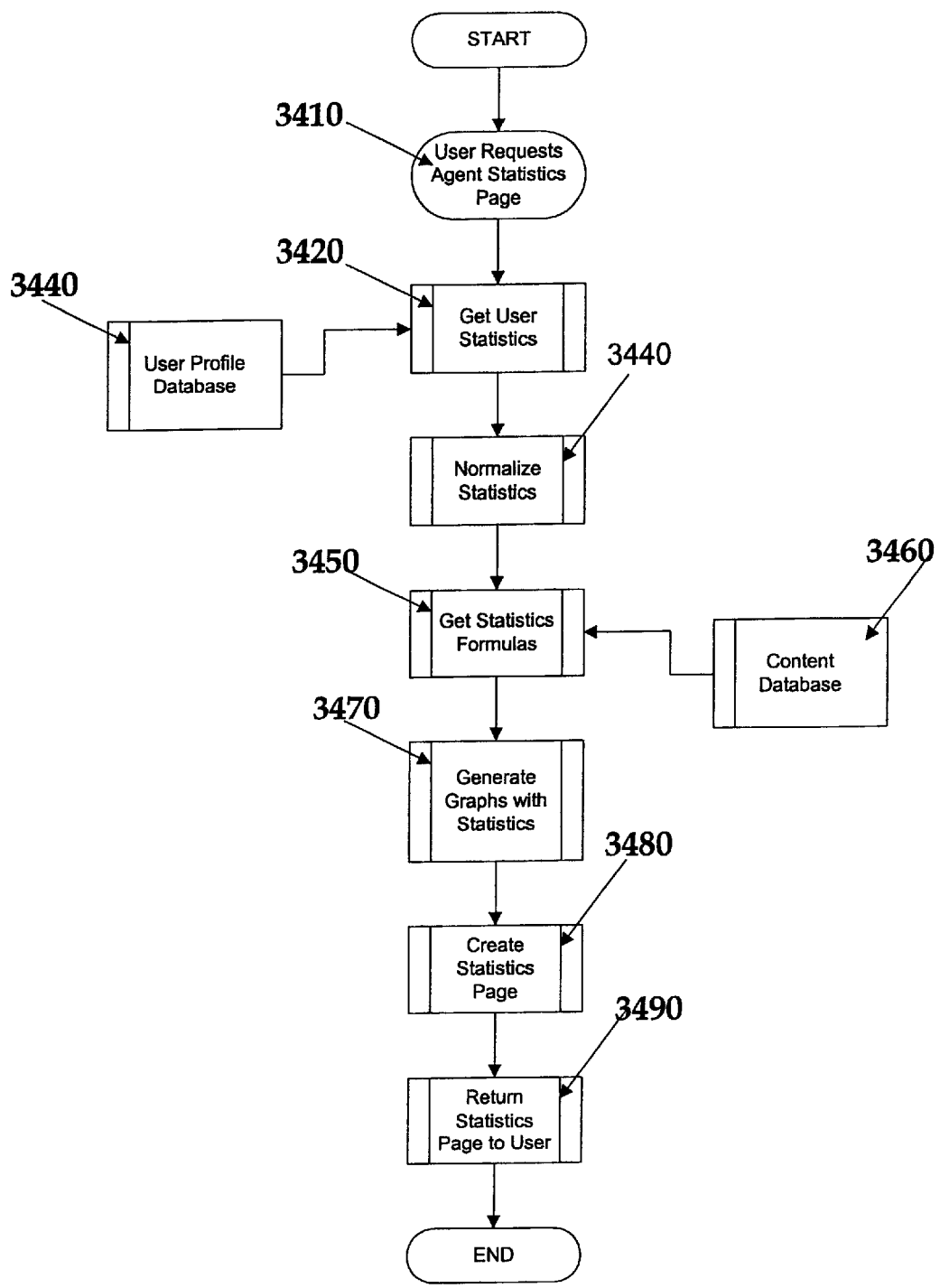
FIG. 34 is a flowchart of the processing for generating an agent's current statistics in accordance with an embodiment of the present invention.

FIG. 34 describes the process for generating the page that displays the agent's current statistics in accordance with an embodiment of the present invention. When the user requests the agent statistics page 3410 with the client browser, the server retrieves the users' statistics 3420 from the users' profile database 3430. The server then performs the mathematical calculations necessary to create a normalized set of statistics 3440. The server then retrieves the formulas 3450 from the content database 3460 that will be used to calculate the user-centric statistics. Graphs are then generated 3470 using the generic formulas and that user's statistics. These graphs are inserted into a template to create the statistics page 3480. This page is then returned to the user 3490.

Personalized Product Report Service:

The system provide Consumer Report-like service that is customized for each user based on a user profile. The system records and provides ratings from users about product quality and desirability on a number of dimensions. The difference between this system and traditional product quality measurement services is that the ratings that come back to the users are personalized. This service works by finding the people who have the closest match to the user's profile and have previously rated the product being asked for. Using this algorithm will help to ensure that the product reports sent back to the user only contain statistics from people who are similar to that user.

Figure 35:
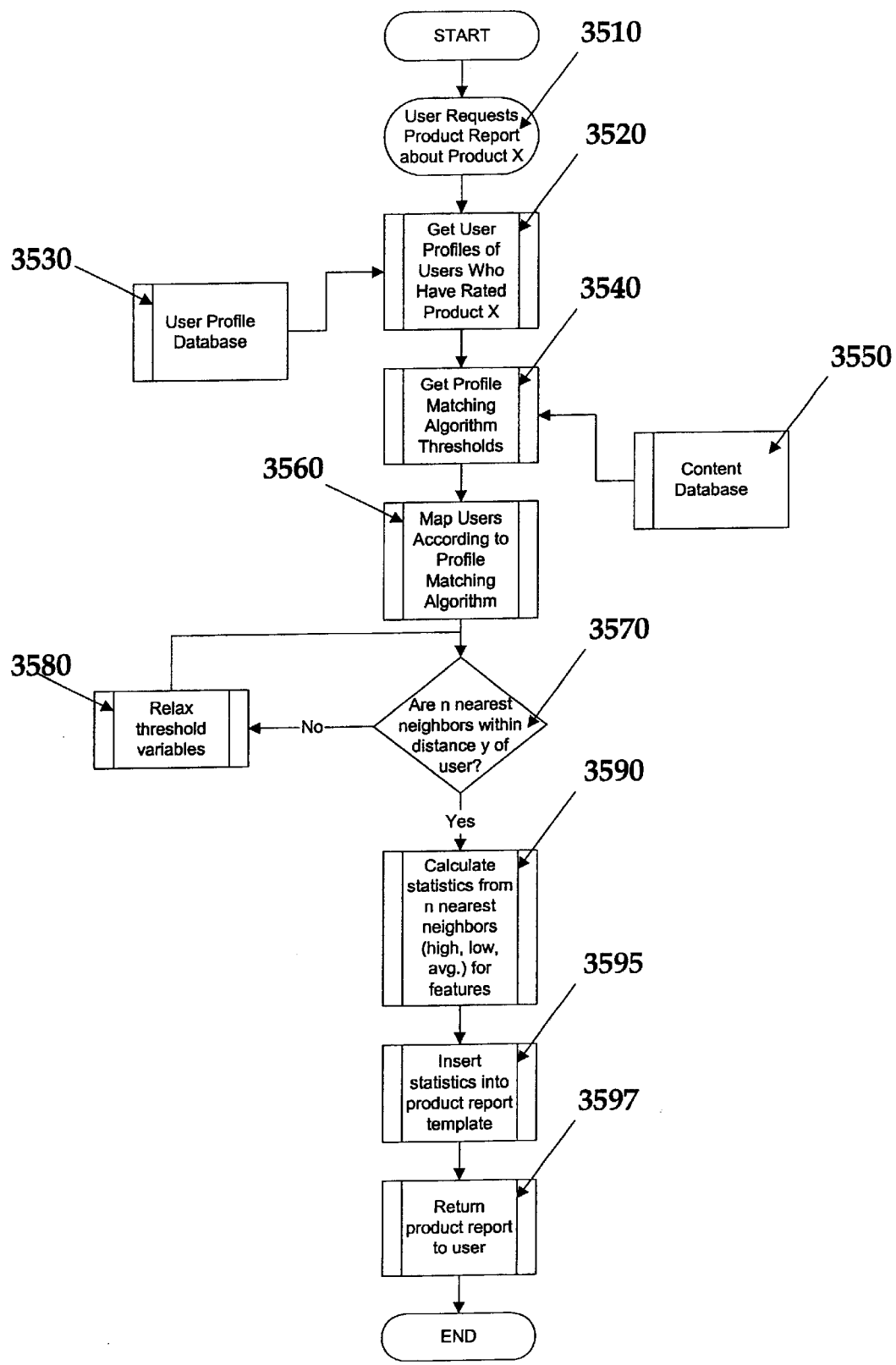
FIG. 35 is a flowchart of the logic that determines the personalized product rating for a user in accordance with an embodiment of the present invention.

FIG. 35 describes the algorithm for determining the personalized product ratings for a user in accordance with an embodiment of the present invention. When the user requests a product report 3510 for product X, the algorithm retrieves the profiles 3520 from the profile database 3530 (which includes product ratings) of those users who have previously rated that product. Then the system retrieves the default thresholds 3540 for the profile matching algorithm from the content database 3550. It then maps all of the short list of users along several dimensions specified in the profile matching algorithm 3560. The top n (specified previously as a threshold variable) nearest neighbors are then determined and a test is performed to decide if they are within distance y (also specified previously as a threshold variable) of the user's profile in the set 3570 using the results from the profile matching algorithm. If they are not within the threshold, then the threshold variables are relaxed 3580, and the test is run again. This processing is repeated until the test returns true. The product ratings from the smaller set of n nearest neighbors are then used to determine a number of product statistics 3590 along several dimensions. Those statistics are inserted into a product report template 3595 and returned to the user 3597 as a product report.

Personal Profile and Services Ubiquity:

In accordance with an embodiment of the present invention, this system may provide one central storage place for a person's profile. This storage place is a server available through the public Internet, accessible by any device that is connected to the Internet and has appropriate access. Because of the ubiquitous accessibility of the profile, numerous access devices can be used to customize services for the user based on his profile. For example, a merchant's web site can use this profile to provide personalized content to the user. A Personal Digital Assistant (PDA) with Internet access can synchronize the person's calendar, email, contact list, task list and notes on the PDA with the version stored in the Internet site. This enables the person to only have to maintain one version of this data in order to have it available whenever it is needed and in whatever formats it is needed.

Figure 36:
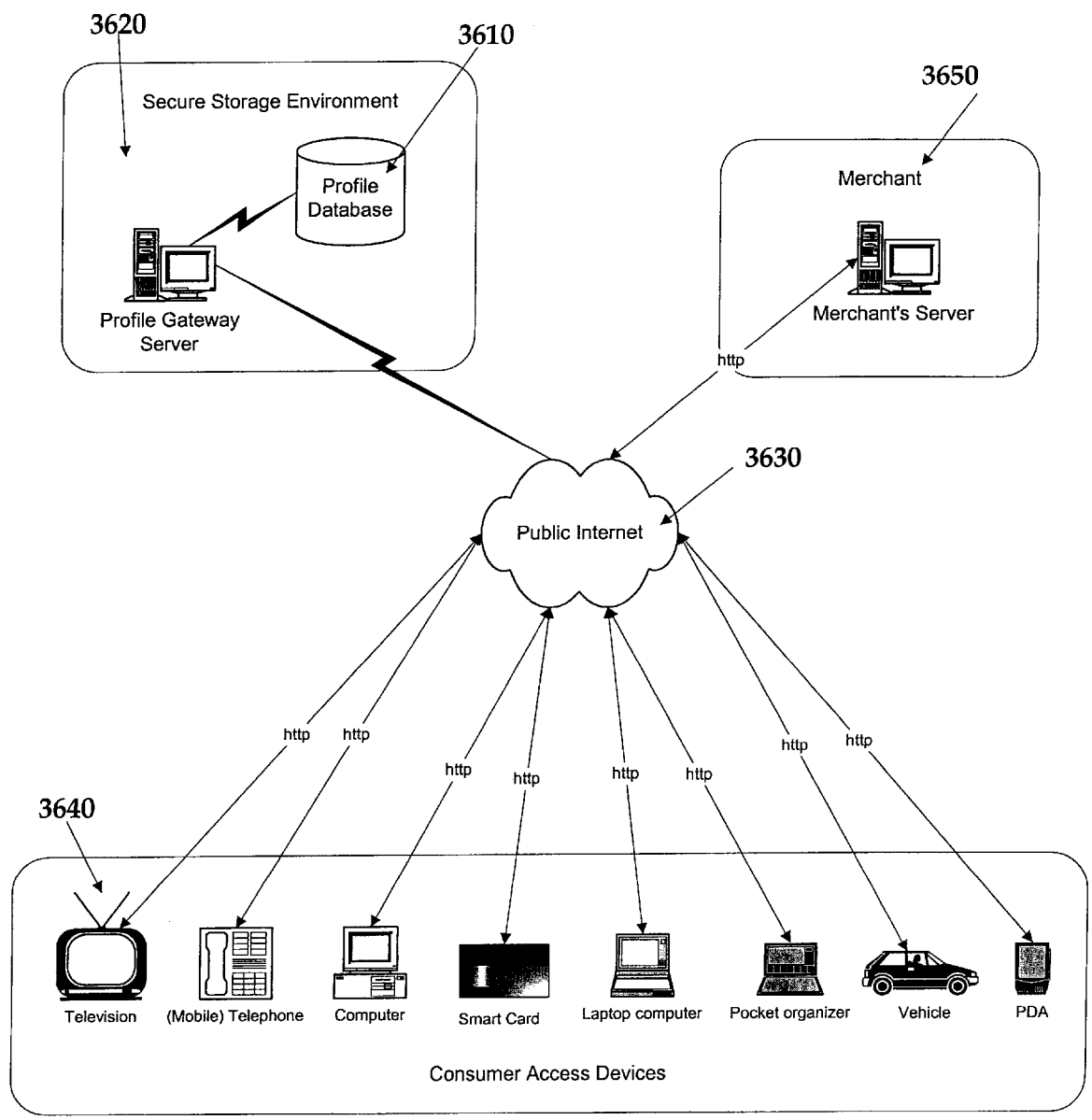
FIG. 36 is a flowchart of the logic for accessing the centrally stored profile in accordance with an embodiment of the present invention.

FIG. 36 presents the detailed logic associated with the many different methods for accessing this centrally stored profile in accordance with an embodiment of the present invention. The profile database 3610 is the central storage place for the users' profile information. The profile gateway server 3620 receives all requests for profile information, whether from the user himself or merchants trying to provide a service to the user. The profile gateway server is responsible for ensuring that information is only given out when the profile owner specifically grants permission. Any device that can access the public Internet 3630 over TCP/IP (a standard network communications protocol) is able to request information from the profile database via intelligent HTTP requests. Consumers will be able to gain access to services from devices such as their televisions 3640, mobile phones, Smart Cards, gas meters, water meters, kitchen appliances, security systems, desktop computers, laptops, pocket organizers, PDAs, and their vehicles, among others. Likewise, merchants 3650 will be able to access those profiles (given permission from the consumer who owns each profile), and will be able to offer customized, personalized services to consumers because of this.

One possible use of the ubiquitous profile is for a hotel chain. A consumer can carry a Smart Card that holds a digital certificate uniquely identifying him. This Smart Card's digital certificate has been issued by the system and it recorded his profile information into the profile database. The consumer brings this card into a hotel chain and checks in. The hotel employee swipes the Smart Card and the consumer enters his Pin number, unlocking the digital certificate. The certificate is sent to the profile gateway server (using a secure transmission protocol) and is authenticated. The hotel is then given access to a certain part of the consumer's profile that he has previously specified. The hotel can then retrieve all of the consumer's billing information as well as preferences for hotel room, etc. The hotel can also access the consumer's movie and dining preferences and offer customized menus for both of them. The hotel can offer to send an email to the consumer's spouse letting him/her know the person checked into the hotel and is safe. All transaction information can be uploaded to the consumer's profile after the hotel checks him in. This will allow partners of the hotel to utilize the information about the consumer that the hotel has gathered (again, given the consumer's permission).

Intention Value Network:

In an Intention Value Network, the overall integrator system coordinates the delivery of products and services for a user. The integrator manages a network of approved suppliers providing products and services, both physical and virtual, to a user based on the user's preferences as reflected in the user's profile. The integrator manages the relationship between suppliers and consumers and coordinates the suppliers' fulfillment of consumers' intentions. It does this by providing the consumer with information about products and suppliers and offering objective advice, among other things.

Figure 37:
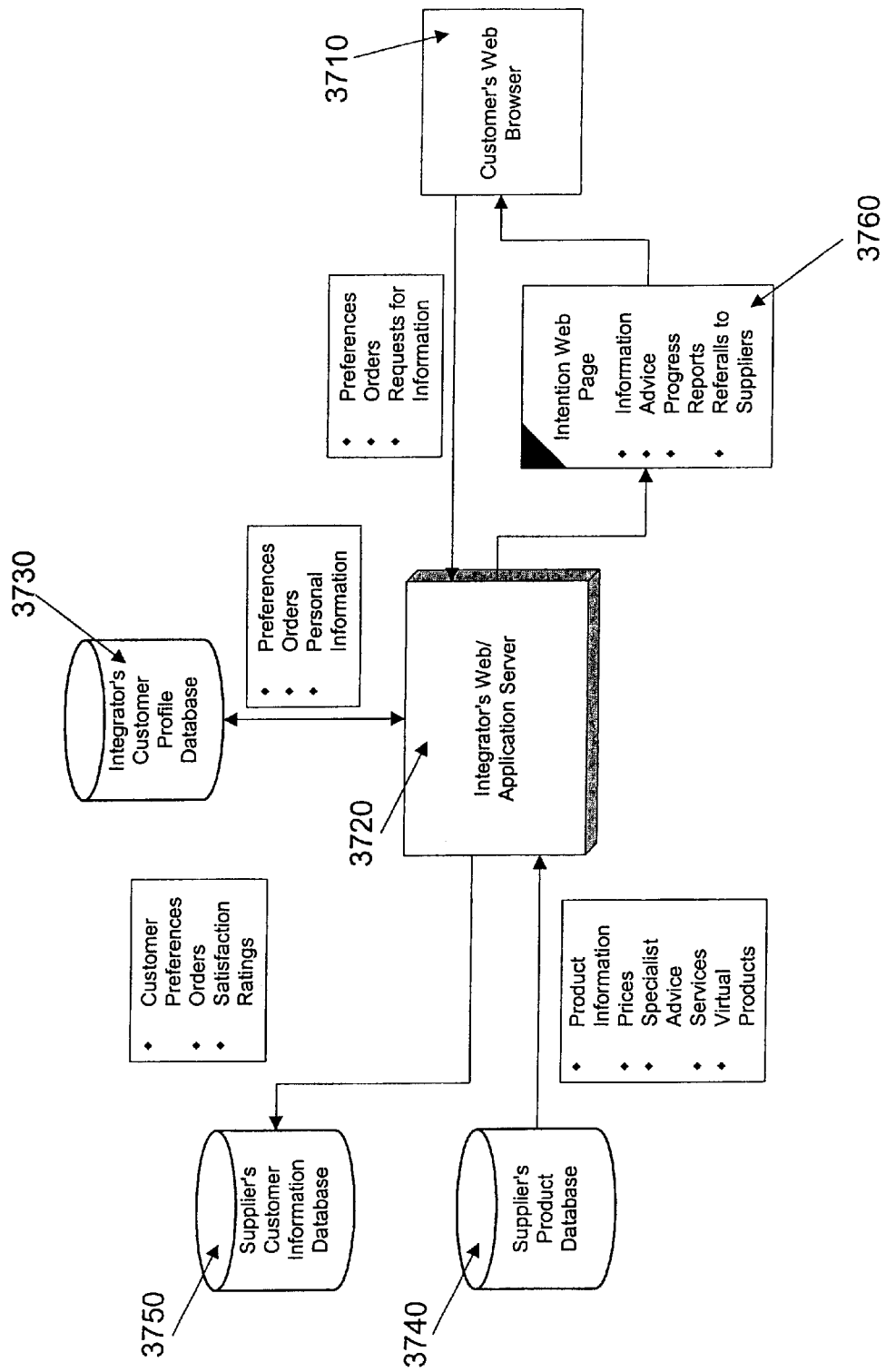
FIG. 37 is a flowchart of the interaction logic between a user and the integrator for a particular supplier in accordance with an embodiment of the present invention.

FIG. 37 discloses the detailed interaction between a consumer and the integrator involving one supplier. The user accesses a Web Browser 3710 and requests product and pricing information from the integrator. The request is sent from the user's browser to the integrator's Web/Application Server 3720. The user's preferences and personal information is obtained from an integrator's customer profile database 3730 and returned to the Web/Application server. The requested product information is extracted from the supplier's product database 3740 and customized for the particular customer. The Web/Application server updates the supplier's customer information database 3750 with the inquiry information about the customer. The product and pricing information is then formatted into a Web Page 3760 and returned to the customer's Web Browser.

Summary Agent:

In accordance with an embodiment of the present invention, a suite of software agents running on the application and web servers are programmed to take care of repetitive or mundane tasks for the user. The agents work according to rules set up by the user and are only allowed to perform tasks explicitly defined by the user. The agents can take care of paying bills for the user, filtering content and emails, and providing a summary view of tasks and agent activity. The user interface for the agent can be modified to suit the particular user.

Figure 38:
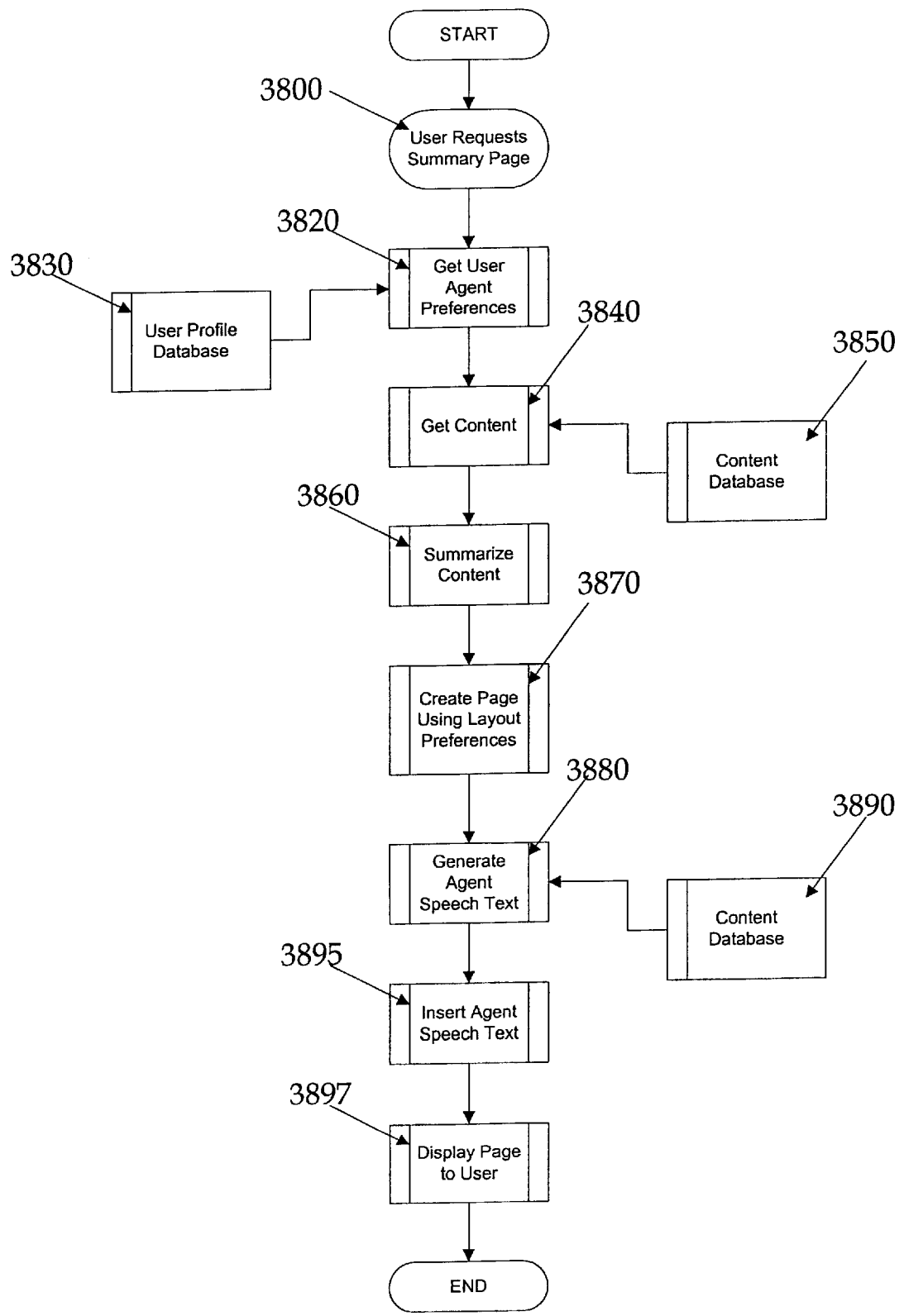
FIG. 38 is a flowchart of the agent processing for generating a verbal summary in accordance with an embodiment of the present invention.

FIG. 38 discloses the logic in accordance with an embodiment of the present invention processing by an agent to generate a verbal summary for the user. When the user requests the summary page 3800, the server gets the user's agent preferences 3820, such as agent type, rules and summary level from the user profile database 3830. The server gets the content 3840, such as emails, to do list items, news, and bills, from the content database 3850. The agent parses all of this content, using the rules stored in the profile database, and summarizes the content 3860. The content is formatted into a web page 3870 according to a template. The text for the agent's speech is generated 3880, using the content from the content database 3890 and speech templates stored in the database. This speech text is inserted into the web page 3895 and the page is returned to the user 3897.

Trusted Third Party:

The above scenario requires the web site to maintain a guarantee of privacy of information according to a published policy. This system is the consumer's Trusted Third Party, acting on his behalf in every case, erring on the side of privacy of information, rather than on the side of stimulation of commerce opportunities. The Trusted Third Party has a set of processes in place that guarantee certain complicity with the stated policy.

"meCommerce":

This word extends the word "eCommerce" to mean "personalized electronic commerce."

Figure 39:
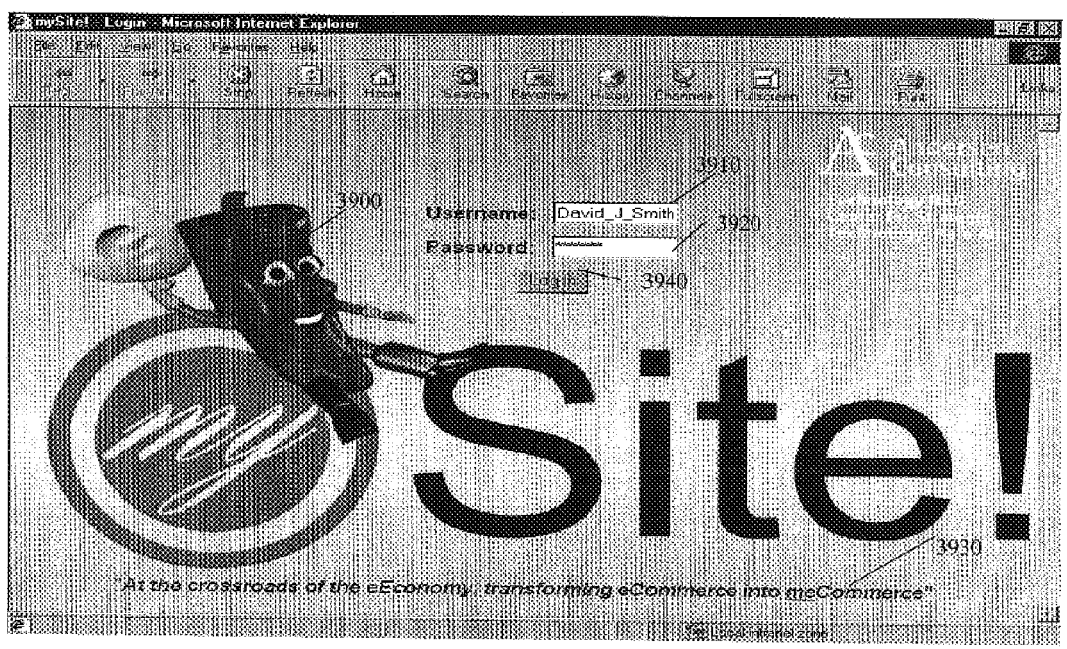
FIG. 39 illustrates a display login in accordance with an embodiment of the present invention.

FIG. 39 illustrates a display login in accordance with an illustrative embodiment of the present invention. The display is implemented as a Microsoft Internet Explorer application with an agent 3900 that guides a user through the process of interacting with the system to customize and personalize various system components to gather information and interact with the user's personal requirements. A user enters a username at 3910 and a password at 3920 and selects a button 3940 to initiate the login procedure. As the logo 3930 suggests, the system transforms electronic commerce into a personalized, so called "me" commerce.

Figure 40:
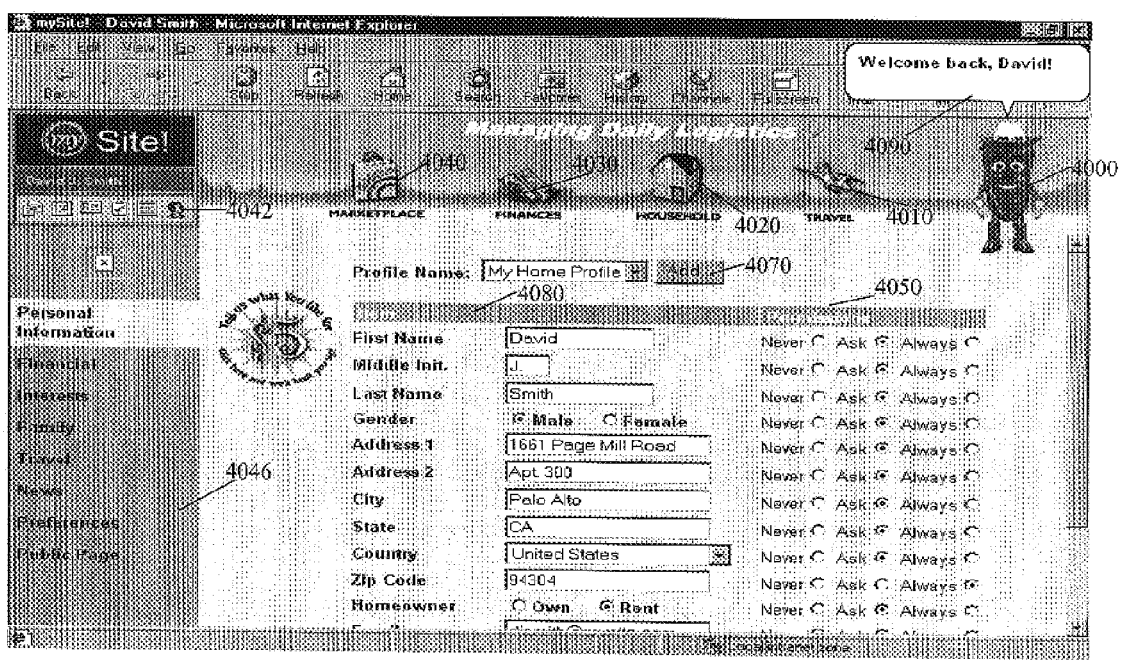
FIG. 40 illustrates a managing daily logistics display in accordance with an embodiment of the present invention.

FIG. 40 illustrates a managing daily logistics display in accordance with an illustrative embodiment of the present invention. A user is greeted by an animated agent 4000 with a personalized message 4090. The user can select from various activities based on requirements, including travel 4010, household chores 4020, finances 4030 and marketplace activities 4040. Icons 4042 for routine tasks such as e-mail, calendaring and document preparation are also provided to facilitate rapid navigation from one activity to another. Direct links 4046 are also provided to allow transfer of news and other items of interest. Various profiles can be selected based on where the user is located. For example, work, home or vacation. The profiles can be added 4070 as a user requires a new profile for another location. Various items 4080 of personal information are collected from the user to support various endeavors. Moreover, permissions 4050 are set for items 4080 to assure information is timely and current.

Figure 41:
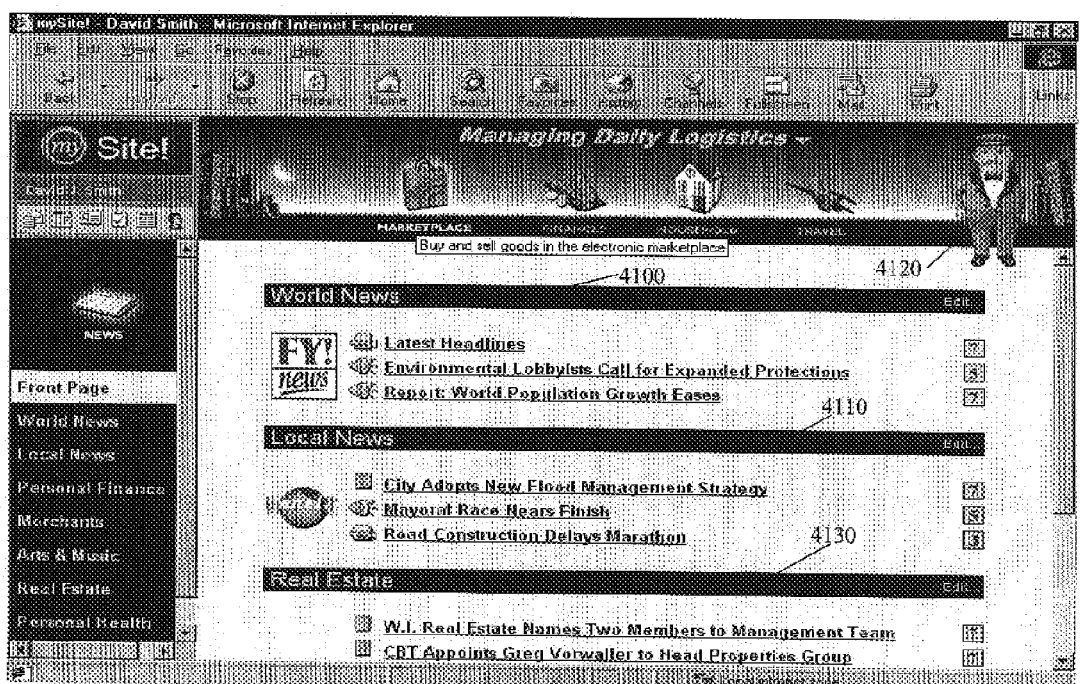
FIG. 41 illustrates a user main display in accordance with an embodiment of the present invention.

FIG. 41 illustrates a user main display in accordance with an illustrative embodiment of the present invention. World 4100 and local news 4110 is provided based on a user's preference. The user has also selected real estate 4130 as an item to provide direct information on the main display. Also, a different agent 4120 is provided based on the user's preference.

Figure 42:
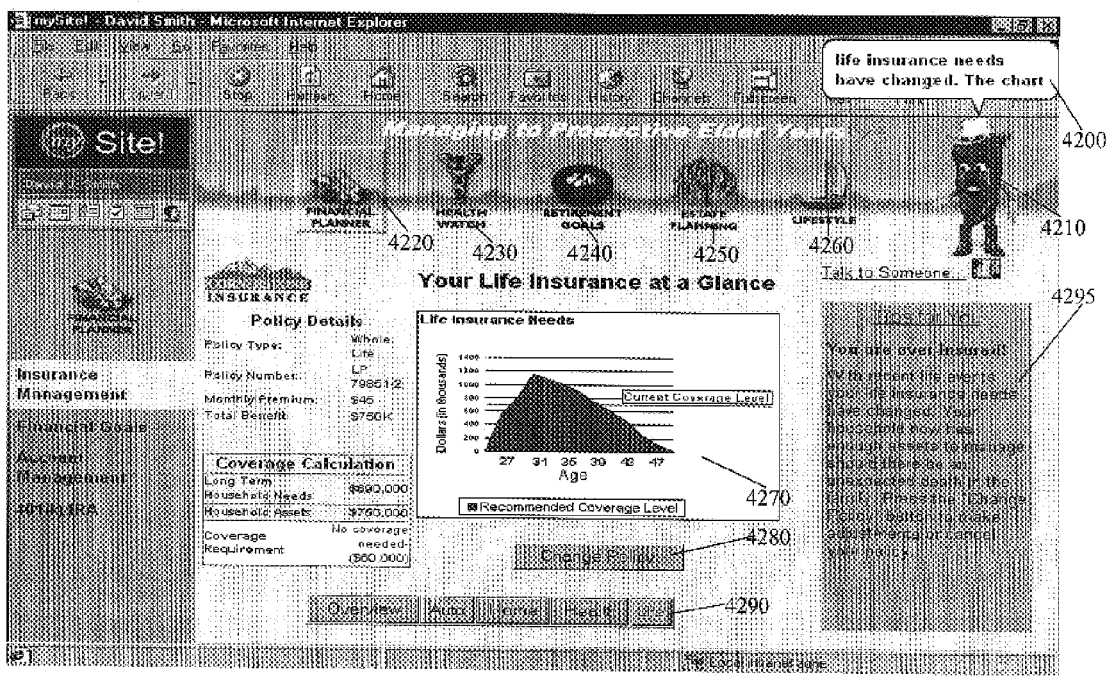
FIG. 42 illustrates an agent interaction display in accordance with an embodiment of the present invention.

FIG. 42 illustrates an agent interaction in accordance with an embodiment of the present invention. The agent 4210 is communicating information 4200 to a user indicating that the user's life insurance needs have changed and pointing the user to the chart that best summarizes the information for the user. Particular tips 4295 are provided to facilitate more detailed information based on current user statistics. A chart 4270 of the user's life insurance needs is also highlighted at the center of the display to assist the user in determining appropriate action. A button 4280 is provided to facilitate changing the policy and a set of buttons 4290 are provided to assist a user in selecting various views of the user's insurance requirements.

Event Backgrounder:

An Event Backgrounder is a short description of an upcoming event that is sent to the user just before an event. The Event Backgrounder is constantly updated with the latest information related to this event. Pertinent information such as itinerary and logistics are included, and other useful information, such as people the user knows who might be in the same location, are also included. The purpose of the Event Backgrounder is to provide the most up-to-date information about an event, drawing from a number of resources, such as public web sites and the user's calendar and contact lists, to allow the user to react optimally in a given situation.

Vicinity Friend Finder:

This software looks for opportunities to tell the user when a friend, family member or acquaintance is or is going to be in the same vicinity as the user. This software scans the user's calendar for upcoming events. It then uses a geographic map to compare those calendar events with the calendar events of people who are listed in his contact list. It then informs the user of any matches, thus telling the user that someone is scheduled to be near him at a particular time.

Information Overload/Info glut:

The term "information overload" is now relatively understood in both its definition as well as its implications and consequences. People have a finite amount of attention that is available at any one time, but there is more and more vying for that attention every day. In short, too much information and too little time are the primary factors complicating the lives of most knowledge workers today.

The first attempts to dynamically deal with information overload were primarily focused on the intelligent filtering of information such that the quantity of information would be lessened. Rather than simply removing random bits of information, however, most of these approaches tried to be intelligent about what information was ultimately presented to the user. This was accomplished by evaluating each document based on the user's interests and discarding the less relevant ones. It follows, therefore, that the quality was also increased.

Filtering the information is only a first step in dealing with information is this new age. Arguably, just as important as the quality of the document is having ready access to it. Once you have entered a meeting, a document containing critical information about the meeting subject delivered to your office is of little value. As the speed of business continues to increase fueled by the technologies of interconnectedness, the ability to receive quality information wherever and whenever you are becomes critical. This new approach is called intelligent information delivery and is heralding in a new information age.

An embodiment of the present invention demonstrates the intelligent information delivery theory described above in an attempt to not only reduce information overload, but to deliver high quality information where and when users' require it. In other words, the system delivers right information to the right person at the right time and the right place.

Figure 43:
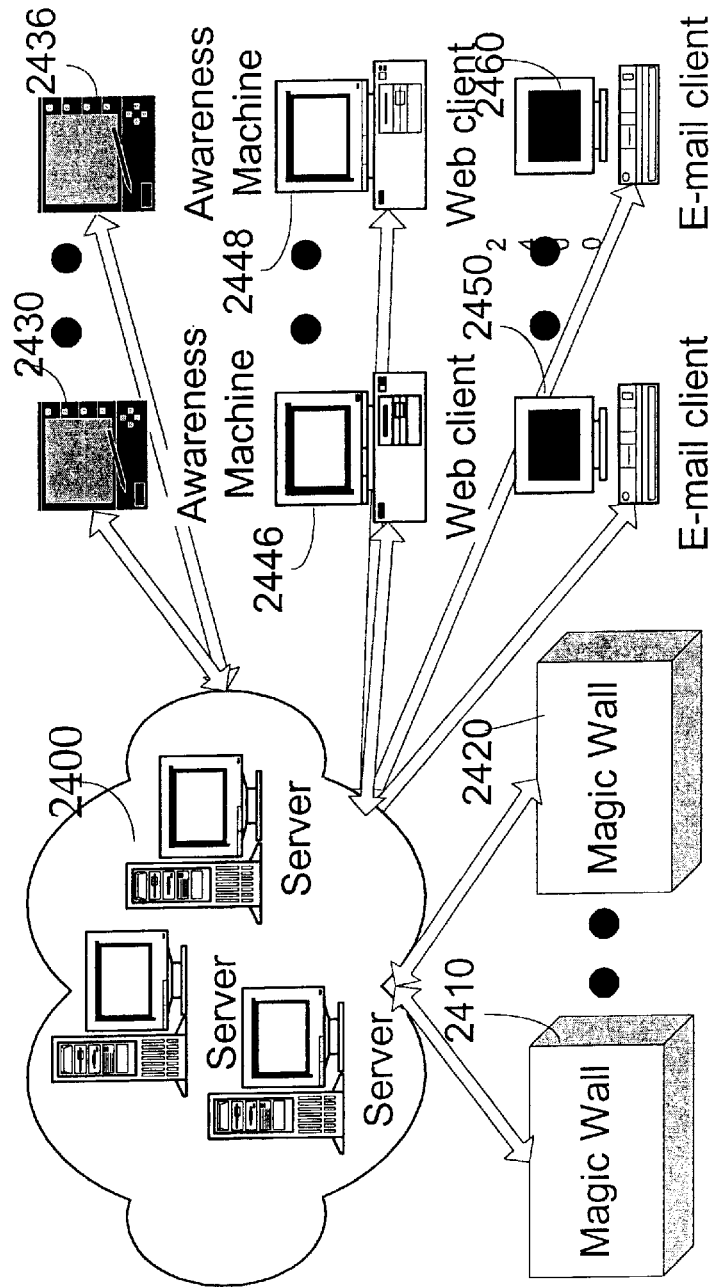
FIG. 43 is a block diagram of an active knowledge management system in accordance with an embodiment of the present invention.

Active Knowledge Management System Description:

FIG. 43 is a block diagram of an active knowledge management system in accordance with an embodiment of the present invention. The system consists of the following parts: back-end 2400 connection to one or more servers, personal mobile wireless clients (Awareness Machine) 2430, 2436, public clients (Magic Wall) 2410, 2420, web clients 2446, 2448, e-mail clients 2450, 2460.

Figure 44:
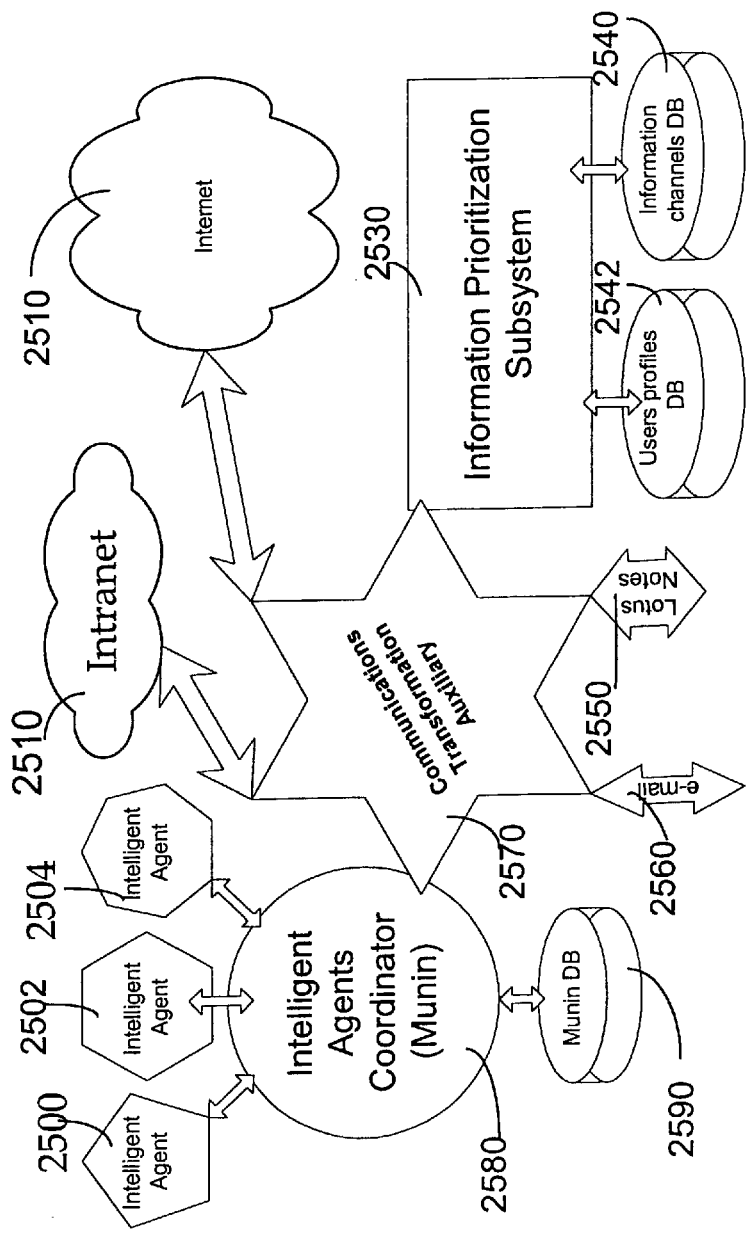
FIG. 44 is a block diagram of a back end server in accordance with an embodiment of the present invention.

Back-end Server (2400) Processes:

FIG. 44 is a block diagram of a back end server in accordance with an embodiment of the present invention. The back-end (2400 of FIG. 43) is a computer system that has the following software active: Intelligent Agents Coordinator (Munin) 2580, Information Prioritization Subsystem 2530, a set of continuously and periodically running information gathering and processing Intelligent Agents 2500, 2502 and 2504, User Profiles Database 2542 and supporting software, Information Channels Database 2542 and supporting software, communications software 2550, information transformation software 2560, and auxiliary software.

The Awareness Machine (2446 & 2448 of FIG. 43):

The Awareness Machine is a combination of hardware device and software application. The hardware consists of handheld personal computer and wireless communications device. The Awareness Machine reflects a constantly updated state-of-the-owner's-world by continually receiving a wireless trickle of information. This information, mined and processed by a suite of intelligent agents, consists of mail messages, news that meets each user's preferences, schedule updates, background information on upcoming meetings and events, as well as weather and traffic. The Awareness Machine is covered by another patent application.

Figure 45:
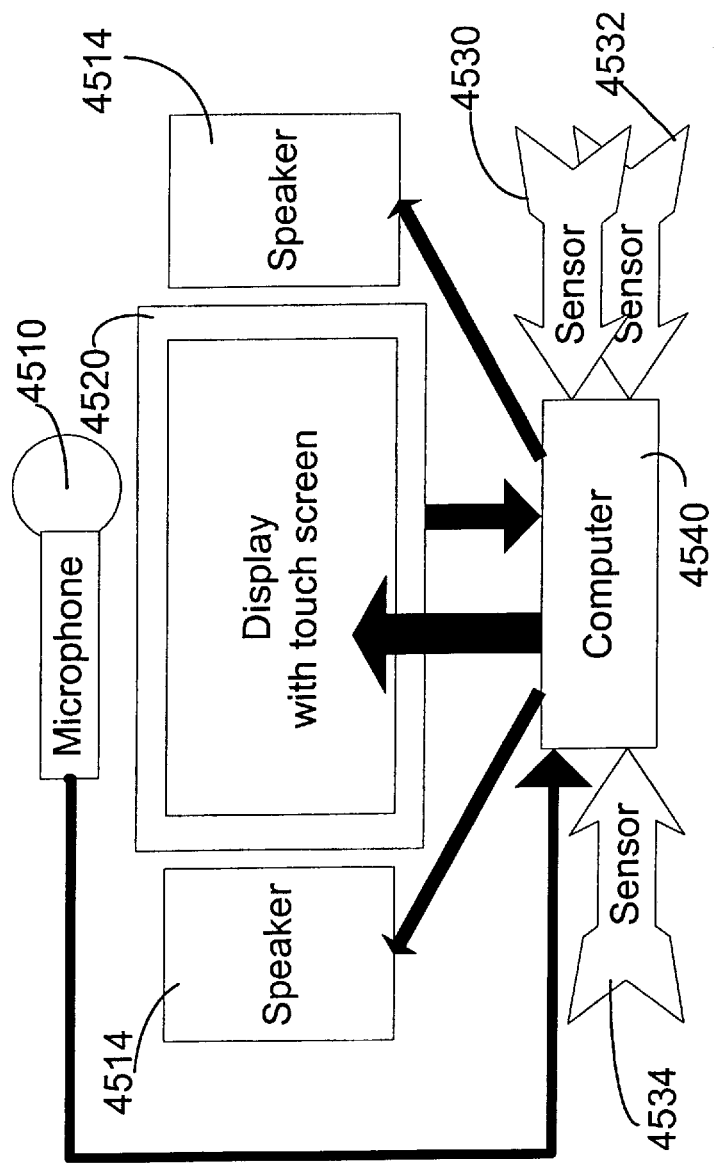
FIG. 45 is a block diagram of a magic wall in accordance with an embodiment of the present invention.

FIG. 45 is a block diagram of a magic wall in accordance with an embodiment of the present invention.

The Magic Wall:

The Magic Wall hardware includes:

Computer system 4540 connected to the back-end server

Sensor array 4534, 4530 and 4532 detects presence, position, and identity of a person Large touch-sensitive display 4520

Sound input 4510/output 4514 hardware

The Magic Wall software supports:

Multimedia output compatible with current Web standards

Speech recognition

Tactile input

Intelligent agents representations in the form of speech-enabled animated characters In an embodiment of the present invention, the Magic Wall operates as follows:

1. If a user appears in the vicinity of Magic Wall, the sensor array triggers "user here" event that sends an environmental cue containing the person's id and the location to the Intelligent Agent Coordinator.
2. User is identified based on the information returned by the sensor array.
3. The Magic Wall switches to "locked on the user" mode. If another user approaches, the system will notify him or her that it cannot serve another user while the current user is being served.
4. Intelligent Agent Coordinator is notified about the user presence.
5. The Intelligent Agent Coordinator decides if there is pertinent to that user and Magic Wall location time-sensitive information to show (e.g. traffic report, meeting reminder). If such information exists, it is prepared for delivery. If not, control is transferred to the Information Prioritization Subsystem.
6. Information Prioritization Subsystem decides what information is most relevant to the user based on their personal profile, freshness of the information, and the Intelligent Agent Coordinator's prior suggestions.
7. The page of information identified as the most relevant to the user at this time and place is shown. The act of the information delivery can also include animation and speech output of the intelligent agent representation.
8. If user desires so, he or she can ask Magic Wall to show a particular page.

The Magic Wall recognizes the speech fragment and then identifies and shows the requested page.

9. As the user departs from the Magic Wall area, the sensor array triggers "user left" event.
10. The Magic Wall switches back to the waiting state.

Other Clients:

The Web client may be a standard browser navigating to a set of Web pages which allow user to see the same information that is available via the Magic Wall.

The e-mail client may be any standard e-mail program.
Intelligent Agent Coordinator Description:

This piece of code is the coordinating agent (or meta-agent) for the Active Knowledge Management system. This means that all communications between the system and each user, as well as communication between the different minion agents are handled (coordinated) by the Intelligent Agent Coordinator. Examples of these minion agents are:

BackgroundFinder—an agent that parses meeting text determining important keywords and phrases and finds background information on the meeting for each user TrafficFinder—an agent that finds traffic information for each user based on where they live Several other agents that are responsible for doing statistical analysis of the data in each user's profile and updating fields pertinent to that data The Intelligent Agent Coordinator 2580 of FIG. 44 is also the user's "interface" to the system, in that whenever the user interacts with the system, regardless of the GUI or other end-user interface, they are ultimately dealing with (asking questions of or sending commands to) the Intelligent Agent Coordinator. The Intelligent Agent Coordinator has four primary responsibilities: 1) monitoring user activities, 2) handling information requests, 3) maintaining each user's profile, and 4) routing information to and from users and to and from the other respective agents.

Monitoring User Activities:

Anytime a user triggers a sensor the Intelligent Agent Coordinator receives an environmental cue." These cues not only enable the Intelligent Agent Coordinator to gain an understanding where users' are for information delivery purposes, but also to learn the standard patterns (arrival time, departure time, etc.) of each persons' life. These patterns are constantly being updated and refined in an attempt to increase the system's intelligence when delivering information. For instance, today it is not uncommon for a person to have several email accounts (work-based, home-based, mobile-based, etc.) as well as several different computers involved in the retrieval process for all of these accounts. Thus, for the Intelligent Agent Coordinator to be successful in delivering information to the correct location it must take into account all of these accounts and the times that the user is likely to be accessing them in order to maximize the probability that the user will see the information. This will be discussed further in another section.

Handling Information Requests:

The Intelligent Agent Coordinator handles information requests from other agents in order to personalize information intended for each user and to more accurately reflect each user's interests in the information they are given. These requests will commonly be related to the user's profile. For instance, if an agent was preparing a traffic report for a user it may request the traffic region (search string) of that user from the Intelligent Agent Coordinator. All access to the user's profile data is accessed in this method.

Maintaining User Profiles:

User profiles contain extensive information about the users. This information is a blend of user-specified data and information that the Intelligent Agent Coordinator has learned and extrapolated from each user's information and activities. In order to protect the data contained in the profiles, the Intelligent Agent Coordinator must handle all user information requests. The Intelligent Agent Coordinator is constantly modifying and updating these profiles by watching the user's activities and attempting to learn the patterns of their lives in order to assist in the more routine, mundane tasks. The Intelligent Agent Coordinator also employs other agents to lean meaning from each user's daily activities. These agents mine this data trying to discover indications of current interests, long-term interests, as well as time delivery preferences for each type of information. Another important aspect of the Intelligent Agent Coordinator's observations is that it also tries to determine where each user is physically located throughout the day for routing purposes.

Information Routing:

Most people are mobile throughout their day. The Intelligent Agent Coordinator tries to be sensitive to this fact by attempting to determine, both by observation (unsupervised learning) and from cues from the environment, where users are or are likely to be located. This is certainly important for determining where to send the user's information, but also for determining in which format to send the information. For instance, if a user were at her desk and using the web client, the Intelligent Agent Coordinator would be receiving indications of activity from her PC and would know to send any necessary information there. In addition, because desktop PCs are generally quite powerful, a full-featured, graphically intense version could be sent. However, consider an alternative situation: the Intelligent Agent Coordinator has received an indication (via the keycard reader next to the exit) that you have just left the building. Minutes later the Intelligent Agent Coordinator also receives notification that you have received an urgent message. The Intelligent Agent Coordinator, knowing that you have left the building and having not received any other indications, assumes that you are reachable via your handheld device (for which it also knows the capabilities) and sends the text of the urgent message there, rather than a more graphically-oriented version.

Inherent Innovations:

The Active Knowledge Management system represents some of the most advanced thinking in the world of knowledge management and human computer interaction. Some of the primary innovations include the following:

The Intelligent Agent Coordinator as illustrated above.

The development, demonstration, and realization of the theory of Intelligent Information Delivery Support for several channels of information delivery, all of which utilize a common back-end. For instance, if a user is in front of a Magic Wall the information will be presented in a multimedia-rich form. If the system determines that the user is mobile, the information will be sent by to their Awareness Machine in standard text. It facilitates delivery of information whenever and wherever a user requires the information.

Personalization of information based not only on a static user profile, but also by taking into account history of the user interactions and current real-time situation including "who, where, and when" awareness.

Utilization of fast and scalable Information Prioritization Subsystem that takes into account Intelligent Agents Coordinator opinion, user preferences, and history of user interactions. It takes the load of mundane decisions off the Intelligent Agents part therefore allowing the agents to be much more sophisticated and precise without compromising the system scalability.

Speech recognition and speech synthesis in combination with intelligent agent animated representation and tactile input provides for efficient, intuitive, and emotionally rewarding interaction with the system.

Supporting Code:

In accordance with an embodiment of the present invention, the following code is written and executed in the Microsoft Active Server Pages environment in accordance with an embodiment of the present invention. It consists primarily of Microsoft Jscript with some database calls embedded in the code to query and store information in the database.

Intention-Centric Interface
Create an Intention ASP Page ("intention_create.asp")

```
<%@ LANGUAGE = "JScript" %>
<%
Response.Buffer = true;
Response.Expires = 0;
%>
<html>
<head>
    <title>Create An Intention</title>
</head>
<body bgcolor="#FFE9D5" style="font-family: Arial" text="#000000">
<%
//Define some variables
up1 = Server.CreateObject("SoftArtisans.FileUp")
intention_name = up1.Form("intention_name")
intention_desc = up1.Form("intention_desc")
//intention_name = RequestForm("intention_name")
//intention_desc = Request.Form("intention_desc")
//intention_icon = Request.Form("intention_icon")
submitted = up1.Form("submitted")
items = new Enumerator(up1.Form)
%>
<%
//Establish connection to the database
objConnection = Server.CreateObject("ADODB.Connection")
objConnection.Open("Maelstrom")
%>
<%
//Check to see if the person hit the button and do the appropriate thing
if (submitted == "Add/Delete")
{
    flag= "false"
    //loop through all the inputs
    while(!items.atEnd( ))
    {
        i = items.item( )
        //if items are checked then delete them
        if(up1.Form(i) == "on")
        {
            objConnection.Execute("delete from user_intention where intention_id =" + i);
            objConnection.Execute("delete from intentions where intention_id =" + i);
            objConnection.Execute("delete from tools_to_intention where intention_id =" + i)
            flag = "true"
        }
        items.moveNext( )
    }
    // if items were not deleted then insert whatever is in the text field in the database
    if(flag == "false")
    {
        intention_name_short = intention_name.replace(/ /gi,"")
        objConnection.Execute("INSERT INTO intentions (intention_name,intention_desc,intention_icon)
values("" + intention_name + "," + intention_desc + "," + intention_name_short + ".gif" + ")")
        Response.write("the intention short name is " + intention_name_short);
        up1.SaveAs("E:development/asp_examples/"+ intention_name_short +".gif")
    }
}
        // Query the database to show the most recent items.
        rsCustomersList = objConnection.Execute("SELECT * FROM intentions")
%>
<input type="Submit" name="return_to_mcp" value="Go to Main Control Panel" onclick="location.href='default.asp'">
<form method="post" action="intention_create.asp" enctype="multipart/form-data" >
<TABLE border=0>
<tr><td colspan="2"><font face="Arial" size="+1"><b>Enter in a new intention</b></font></td></tr>
<tr><td><font face="Arial">Name:</font></td><td><INPUT TYPE="text" name="intention_name"></td></tr>
<tr><td><font face="Arial">Description:</font></td><td><TEXTAREA name="intention_desc"></TEXTAREA></td></tr>
<tr><td><font face="Arial">Icon Image:</font></td><td><INPUT TYPE="file" NAME="intention_icon"
size=40></td></tr>
<tr><td colspan="2"><INPUT type="submit" name="submitted" value="Add/Delete"></td></tr>
</TABLE>
<HR>
<font face="Arial" size="+1"><b>Current Intentions</b></font>
<TABLE>
    <tr bgcolor=E69780 align="center">
    <td>
        <FONT color="white">Delete</FONT>
    </td>
    <TD>
        <FONT color="white">Itention</FONT>
```

```
            </TD>
            <TD>
                <FONT color="white">Description</FONT>
            </TD>
            <TD>
                <FONT color="white">Image</FONT>
            </TD>
        </tr>
<%
// Loop over the intentions in the list
counter = 0;
while (!rsCustomersList.EOF)
{
%>
        <tr bgcolor="white" style="font-size: smaller">
            <td align=center>
                <INPUT type="checkbox" name="<%=rsCustomersList("intention_id")%>">
            </TD>
            <td>
                <%= rsCustomersList("intention_name")%>
            </td>
            <td>
                <%= rsCustomersList("intention_desc")%>
            </td>
            <td>
                <img src="..images/<%= rsCustomersList("intention_icon")%>">
            </td>
        </tr>
<%
counter++
rsCustomersList.MoveNext( )}
%>
</TABLE>
<hr>
Available Tools
</form>
</BODY>
</HTML>
Retrieve Intentions List ASP Page ("intentions_list.asp")
<!-- #include file="include/check_authentication.inc" -->
<HTML>
<HEAD>
    <TITLE>mySite! Intentions List</TITLE>
<SCRIPT LANGUAGE="JavaScript">
    function intentionsList ( ) {
        this.internalArray = new Array( );
        <%
        // establish connection to the database
        objConnection = Server.CreateObject("ADODB.Connection");
        objConnection.Open("Maelstrom");
        // create query
        intentionsQuery = objConnection.Execute("SELECT * FROM intentions ORDER BY intention_name asc");
%>
        // write out the options
<%
        numOptions = 0
        while (!intentionsQuery.EOF) {
                intentionName = intentionsQuery("intention_name");
                intentionIcon = intentionsQuery("intention_icon");
%>
            this.internalArray[<%= numOptions%>] = new Array(2);
            this.internalArray[<%= numOptions%>][0]= "<%= intentionName %>";
            this.internalArray[<%= numOptions%>][1]= "images/<%= intentionIcon %>";
<%          numOptions++; intentionsQuery.moveNext( );      %>
<%      }   %>
    }
    numIntentions = <%= numOptions%>;
    intentionArray = new intentionsList( ).internalArray;
    function selectIntention ( ) {
        for (i=0;i<numIntentions;i++) {
            if (IntentionsListSelect.options[i].selected) {
                intentionNameTextField.value = intentionArray[i][0];
                //intentionPicture.src = intentionArray[i][1];
                break;
            }
        }
    }
</SCRIPT>
```

-continued

```
</HEAD>
<BODY BGCOLOR="<%=Session("main_background")%>" style="font-family: Arial">
<CENTER>
<!--- <FORM NAME="intention_list"> --->
<TABLE FRAME="BOX" border=0 CELLPADDING="2" CELLSPACING="2">
<TR><TD COLSPAN="3" STYLE="font: 20pt arial" ALIGN="CENTER"><B>Add a mySite! Intention</B></TD></TR>
<TR><TD COLSPAN="3"> </TD></TR>
<TR>
    <TD width="100"><font size="-1">Please Select An Intention You Would Like to Add to Your List</font></TD>
    <TD colspan=2>
        <SELECT ID="IntentionsListSelect" NAME="IntentionsListSelect" SIZE="10" style="font: 9pt Arial;"
onClick="selectIntention( )">
        <%
        intentionsQuery.moveFirst( );
        for(j=0;j<numOptions;j++) { %>
            <OPTION VALUE="<%= intentionsQuery("intention_id") %>" <% if (j == 0) { %>
SELECTED <% } %>>
            <%= intentionsQuery("intention_name") %>
            <% intentionsQuery.moveNext( )
        }
        intentionsQuery.moveFirst( );
        %>
        </SELECT>
    </TD>
</TR>
<TR><TD COLSPAN="3"> </TD></TR>
<TR>
    <TD width="100"><font size="-1">Customize the Intention name</font></TD>
    <TD COLSPAN="2"><INPUT TYPE="text" NAME="intentionNameTextField" ID="intentionNameTextField"
SIZE="30" VALUE="<%= intentionsQuery("intention_name") %>"></TD>
</TR>
<TR><TD COLSPAN="3"> </TD></TR>
<TR>
    <TD COLSPAN="3" ALIGN="CENTER">
        <INPUT TYPE="button" NAME="intentionOKButton" VALUE=" OK "SIZE="10"
ID="intentionOKButton" onClick="javaScript:top.opener.top.navframe.addAnIntention( );">

<INPUT TYPE="button" NAME="intentionCancelButton" VALUE="Cancel" SIZE="10"
ID="intentionCancelButton" onClick="self.close( );">
    </TD>
</TR>
</TABLE>
<!--- </FORM> --->
</CENTER>
<% objConnection.Close( ); %>
</BODY>
</HTML>
Display User Intention List ASP Page (excerpted from "navigation.asp")
<DIV ID="intentionlist" style="position: absolute; width:210; height:95; left: 365pt; top: -5; visibility: hidden; font-family:
Arial; font-color: #000000; font: 8pt Arial ; ">
<DIV style= position absolute; top:7; left:7; height:78; width:210; z-index:2; background:
<%=Session("main_background")%>; border: solid 1pt #000000; padding: 3pt; overflow: auto; alink: black; link: black;">
<body LINK="#000000" ALINK="#000000" vlink="black">
        <%
        // create query
        intentionsQuery = objConnection.Execute("SELECT user_intention.* FROM user_intention,
user_intention_to_persona WHERE user_intention_to_persona.user_persona_id = " + Session("currentUserPersona") + "
AND user_intention_to_persona.user_intention_id = user_intention.user_intention_id" );
        numintentions = 0;
        Response.Write("<SCRIPT>numintentions=" + intentionsQueryRecordCount +
"</SCRIPT><TABLE cellpadding='0' width='100%' cellspacing='0'>");
        while (!intentionsQuery.EOF)
        {
        %>
        <TR><TD><a href="javascript:changeIntention('<%= intentionsQuery("user_intention_id")
%>','<%=numintentions%>')" onmouseover="mouseOverTab( )" onmouseout="mouseOutOfTab( )"><font color="Black"
face="arial" size="-2"><%= intentionsQuery("intention_custom_name") %></font></a></TD><TD><IMG align="right"
SRC="images/delete.gif" alt="Delete this intention" onClick="confirmDelete(<%= intentionsQuery("user_intention_id")
%>)"></TD></TR>
        <%numintentions++; intentionsQuery.moveNext( );     %>
        <%     }
        Response.Write("<SCRIPT>numintentions="+numintentions +"</SCRIPT>");
        %>
        <tr><td colspan="2"><hr></td></tr>
        <TR><td colspan="2"><a href="javascript:changeIntention('add
...',<%=numintentions%>);" onmouseover=" mouseOverTab( )" onmouseout="mouseOutOfTab( )"><font color="Black"
face="arial" size="-2">add ...</font></a></td></TR>
        </table>
</body>
```

-continued

```
</DIV>
<DIV style="position: absolute; top:0; left:-5; width: 230; height:105; z-index:1; "
onmouseout="intentionlist.style.visibility='hidden'" onmouseout="intentionlist.style.visibility='hidden'"
onmouseover="intentionlist.style.visibility='hidden'"></DIV>
</DIV>
</DIV>
```

While various embodiments have been described above, it should be understood that they have been presented by way of example only, and not limitation. Thus, the breadth and scope of an embodiment of the present invention should not be limited by any of the above described exemplary embodiments, but should be defined only in accordance with the following claims and their equivalents.

What is claimed is:

1. A method for allowing user selection of search filtering criteria prior to an initial search on a network, which comprises:
   (a) displaying a query field for entering a search query;
   (b) receiving the search query entered in the query field;
   (c) presenting a plurality of selection criteria applicable during a search on the network, wherein the plurality of selection criteria comprise at least one of a type of network, a network location, an information source, a user profile, and a time range;
   (d) allowing selection of at least one of the plurality of selection criteria
   (e) searching for information on the network relating to the search query;
   (f) generating a filtered result by excluding portions of the information based on the selected criteria;
   (g) outputting the filtered result of the searching; and
   (h) repeating the search of the search query at periodic intervals and comparing the filtered results of repeated searches to determine whether new information is available.

2. A method as recited in claim 1, wherein the plurality of selection criteria are pre-selected by the user and presented as default criteria for subsequent searches.

3. A method as recited in claim 1, further comprising outputting the filtered result of the search after each interval.

4. A method as recited in claim 3, further comprising:
   notifying a user that new information is available based on the comparison.

5. A method as recited in claim 4, further comprising allowing the user to delete portions of the filtered results.

6. A method as recited in claim 1, wherein the filtered result is output on a personalized information page on the network.

7. A method as recited in claim 6, wherein repeating the search at periodic intervals uses said plurality of selection criteria.

8. A method as recited in claim 7, further comprising:
   notifying a user when said new information is available based on the comparison.

9. A method as recited in claim 8, further comprising: allowing the user to delete portions of the filtered results.

10. A method as recited in claim 1, wherein said plurality of selection criteria includes a time range, and said filtered result consists of information having an age within the selected time range.

11. A method as recited in claim 1, wherein said information source includes a company, a publication, a newsgroup, a database, e-mail correspondence, and a user specified URL.

12. A method as recited in claim 11, wherein said information source is further limited by geographic location.

13. A method as recited in claim 1, wherein said type of network includes a local area network, an intranet, and the World Wide Web/Internet.

14. A computer program embodied on a computer readable medium for allowing user selection of search filtering criteria prior to an initial search on a network, which comprises:
   (a) code for displaying a query field for entering a search query;
   (b) code for receiving the search query entered in the query field;
   (c) code for presenting a plurality of selection criteria applicable during a search on the network, wherein the plurality of selection criteria comprise at least one of a type of network, a network location, an information source, a user profile, and a time range;
   (d) code for allowing selection of at least one of the plurality of selection criteria;
   (e) code for searching for information on the network relating to the search query;
   (f) code for generating a filtered result by excluding portions of the information based on the selected criteria;
   (g) code for outputting the filtered result of the searching; and
   (h) code for repeating the search of the search query at periodic intervals and comparing the filtered results of repeated searches to determine whether new information is available.

15. A computer program embodied on a computer readable medium as recited in claim 14, wherein the plurality of selection criteria are pre-selected by the user and presented as default criteria for subsequent searches.

16. A computer program embodied on a computer readable medium as recited in claim 14, further comprising code for outputting the filtered result of the search after each interval.

17. A computer program embodied on a computer readable medium as recited in claim 16, further comprising:
   code for notifying a user that new information is available based on the comparison.

18. A computer program embodied on a computer readable medium as recited in claim 17, further comprising code for allowing the user to delete portions of the filtered results.

19. A computer program embodied on a computer readable medium as recited in claim 14, wherein the filtered result is output on a personalized information page on the network.

20. A computer program embodied on a computer readable medium as recited in claim 19, wherein the code for repeating the search at periodic intervals uses said plurality of selection criteria.

21. A computer program embodied on a computer readable medium as recited in claim 20, further comprising:
    code for notifying a user when said new information is available based on the comparison.

22. A computer program embodied on a computer readable medium as recited in claim 21, further comprising: code for allowing the user to delete portions of the filtered results.

23. A computer program embodied on a computer readable medium as recited in claim 14, wherein said plurality of selection criteria includes a time range, and said filtered result consists of information having an age within the selected time range.

24. A computer program embodied on a computer readable medium as recited in claim 14, wherein said information source includes a company, a publication, a newsgroup, a database, e-mail correspondence, and a user specified URL.

25. A computer program embodied on a computer readable medium as recited in claim 24, wherein said information source is further limited by geographic location.

26. A computer program embodied on a computer readable medium as recited in claim 14, wherein said type of network includes a local area network, an intranet, and the World Wide Web/Internet.

27. A system embodied on a computer readable medium for allowing user selection of search filtering criteria prior to an initial search on a network, which comprises:
    (a) logic that displays a query field for entering a search query;
    (b) logic that receives the search query entered in the query field;
    (c) logic that presents a plurality of selection criteria applicable during a search on the network, wherein the plurality of selection criteria comprise at least one of a type of network, a network location, an information source, a user profile, and a time range;
    (d) logic that allows selection of at least one of the plurality of selection criteria;
    (e) logic that searches for information on the network relating to the search query;
    (f) logic that generates a filtered result by excluding portions of the information based on the selected criteria;
    (g) logic that outputs the filtered result of the searching; and
    (h) logic that repeats the search of the search query at periodic intervals and compares the filtered results of repeated searches to determine whether new information is available.

28. A system as recited in claim 27, wherein the plurality of selection criteria are pre-selected by the user and presented as default criteria for subsequent searches.

29. A system as recited in claim 27, further comprising logic that outputs the filtered result of the search after each interval.

30. A system as recited in claim 29, further comprising:
    logic that notifies a user that new information is available based on the comparison.

31. A system as recited in claim 30, further comprising logic that allows the user to delete portions of the filtered results.

32. A system as recited in claim 27, wherein the filtered result is output on a personalized information page on the network.

33. A system as recited in claim 32, wherein the logic that repeats the search at periodic intervals uses said plurality of selection criteria.

34. A system as recited in claim 33, further comprising:
    logic that notifies a user when said new information is available based on the comparison.

35. A system as recited in claim 34, further comprising: logic that allows the user to delete portions of the filtered results.

36. A system as recited in claim 27, wherein said plurality of selection criteria includes a time range, and said filtered result consists of information having an age within the selected time range.

37. A system as recited in claim 27, wherein said information source includes a company, a publication, a newsgroup, a database, e-mail correspondence, and a user specified URL.

38. A system as recited in claim 37, wherein said information source is further limited by geographic location.

39. A system as recited in claim 27, wherein said type of network includes a local area network, an intranet, and the World Wide Web/Internet.

* * * * *